United States Patent
Shigeta

(10) Patent No.: US 7,623,689 B2
(45) Date of Patent: Nov. 24, 2009

(54) IMAGE PICK-UP APPARATUS INCLUDING LUMINANCE CONTROL OF IRRADIATION DEVICES ARRANGED IN A MAIN SCAN DIRECTION

(75) Inventor: Kazuyuki Shigeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 754 days.

(21) Appl. No.: 10/985,965

(22) Filed: Nov. 12, 2004

(65) Prior Publication Data
US 2005/0105785 A1    May 19, 2005

(30) Foreign Application Priority Data
Nov. 18, 2003    (JP) ............... 2003-388416

(51) Int. Cl.
*G06K 9/00* (2006.01)
(52) U.S. Cl. ............... 382/124; 382/125; 382/126; 382/127; 382/115; 283/68; 356/71
(58) Field of Classification Search ......... 382/124, 382/125, 126, 127, 115; 283/68; 356/71
See application file for complete search history.

(56) References Cited

U.S. PATENT DOCUMENTS

| | | | |
|---|---|---|---|
| 5,751,835 A | 5/1998 | Topping et al. | 382/115 |
| 6,867,811 B2 * | 3/2005 | Nakamura et al. | 348/362 |
| 6,867,850 B2 * | 3/2005 | McClurg et al. | 356/71 |
| 7,245,745 B2 * | 7/2007 | Nagasaka et al. | 382/115 |
| 2003/0012451 A1 * | 1/2003 | Shigeta | 382/274 |
| 2003/0147550 A1 * | 8/2003 | Shigeta | 382/124 |
| 2003/0156744 A1 * | 8/2003 | Hashimoto | 382/124 |

FOREIGN PATENT DOCUMENTS

| | | |
|---|---|---|
| CN | 1424692 A | 6/2003 |
| JP | 10-143663 | 5/1998 |
| JP | 2002-216116 | 8/2002 |

* cited by examiner

*Primary Examiner*—Brian Q Le
*Assistant Examiner*—Edward Park
(74) *Attorney, Agent, or Firm*—Fitzpatrick, Cella, Harper & Scinto

(57) ABSTRACT

To provide an image pick-up apparatus, a fingerprint certification apparatus, and an image pick-up method capable of correcting a light volume unevenness by variation of the light volume in a plurality of light sources. An image pick-up device unit comprises pixels which are two dimensionally arranged, and images an object. A light source consists of a plurality of LEDs arranged in parallel to the main scan direction of the image pick-up device unit, and impinges a light on the object. A LED driving unit controls the luminance of a plurality of LEDs so that the light volume distribution of the center region of the main scan direction in the image pick-up device unit becomes more uniform.

4 Claims, 27 Drawing Sheets

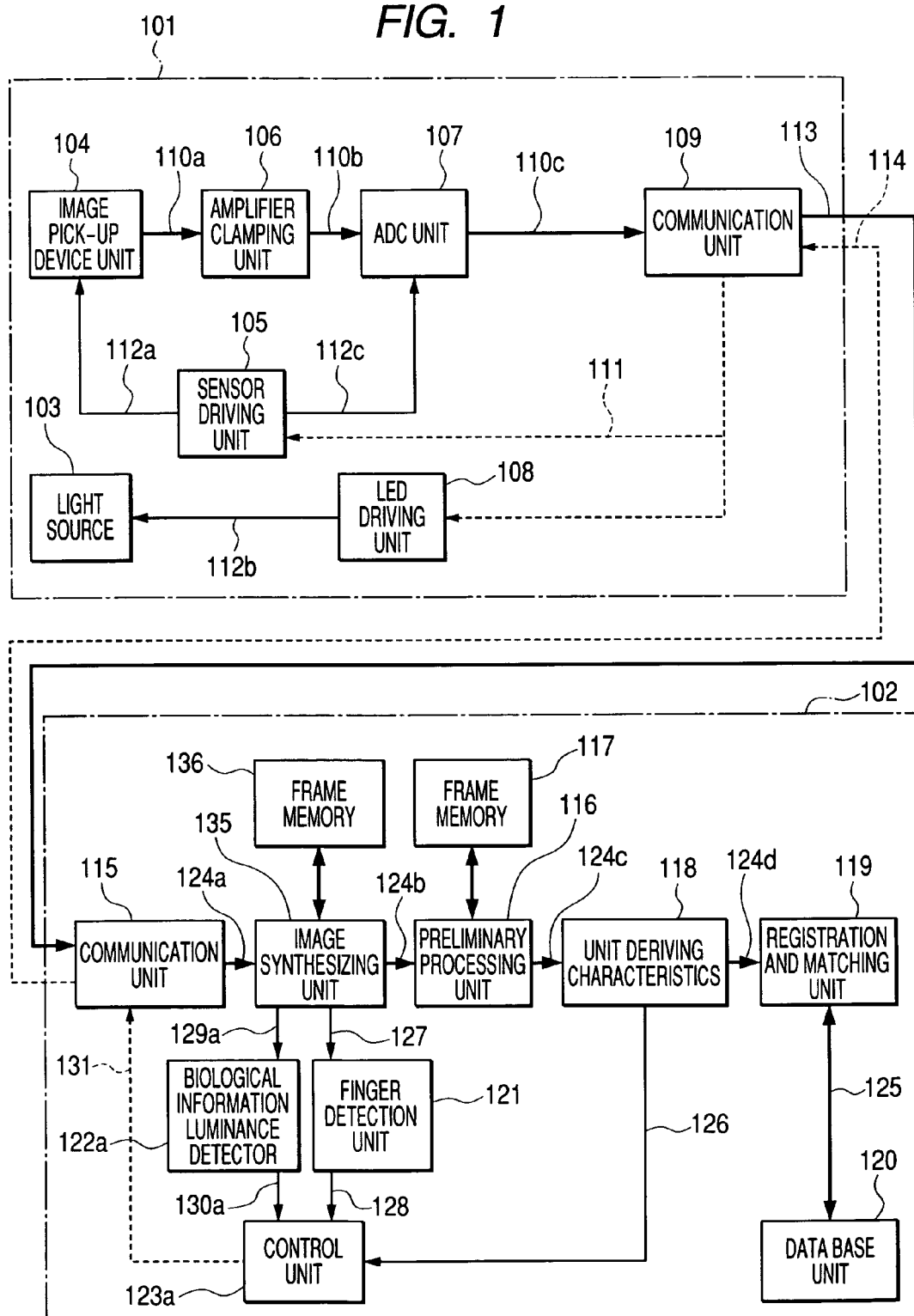

FIG. 3A9
FIG. 3A8
FIG. 3A7
FIG. 3A6
FIG. 3A5
FIG. 3A4
FIG. 3A3
FIG. 3A2
FIG. 3A1

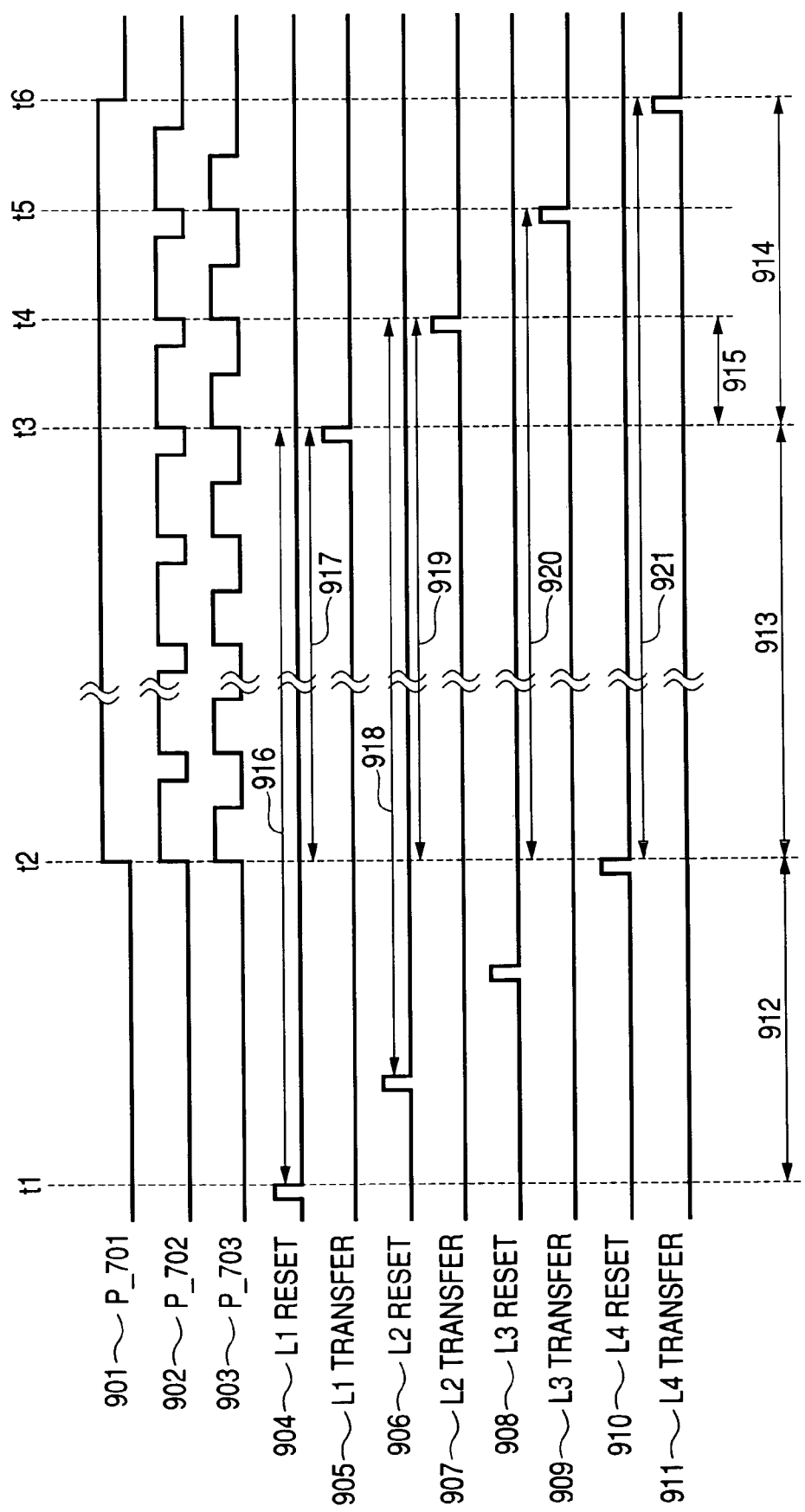

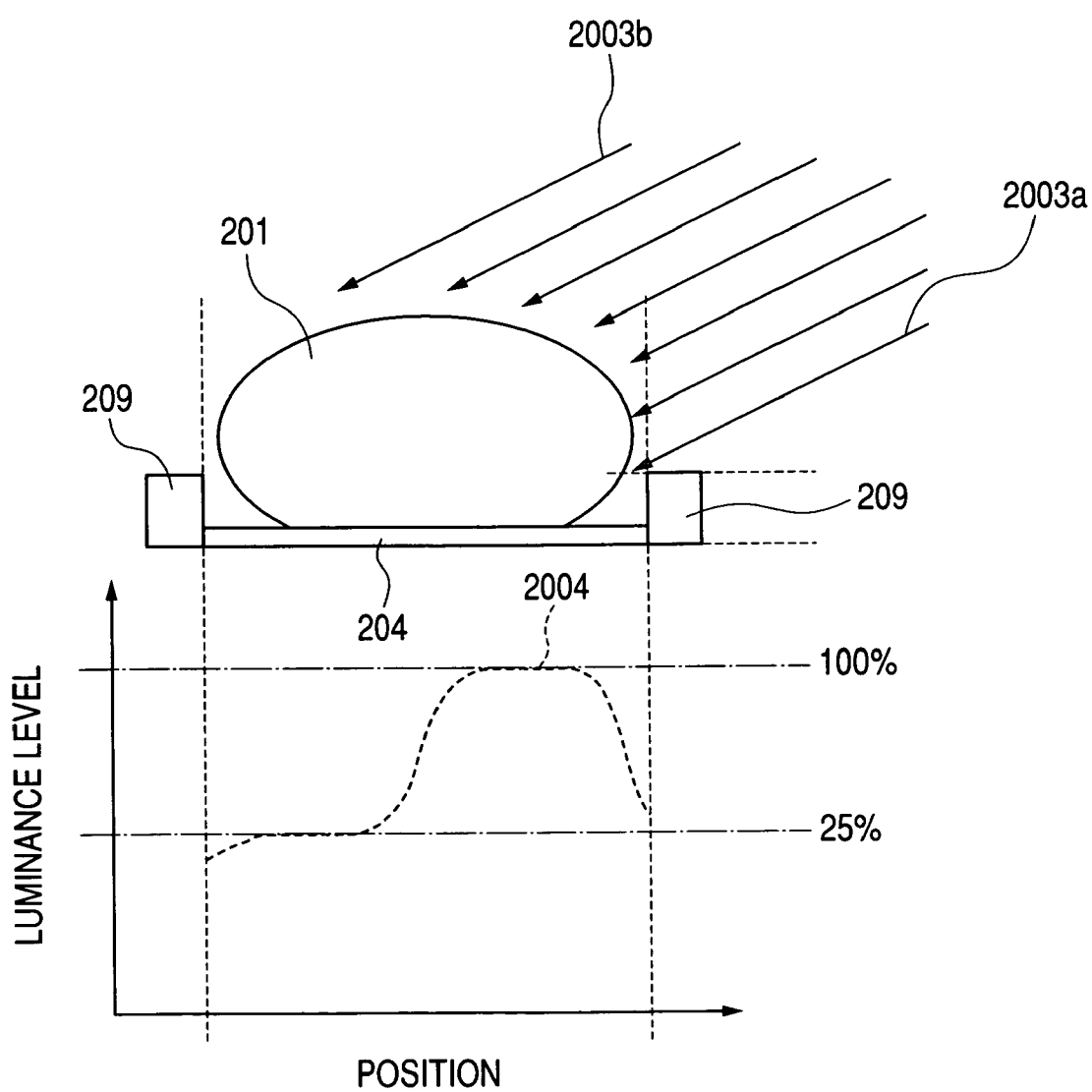

IMAGE PICK-UP APPARATUS INCLUDING LUMINANCE CONTROL OF IRRADIATION DEVICES ARRANGED IN A MAIN SCAN DIRECTION

BACKGROUND OF THE INVENTION

1. Field of the Invention

The present invention relates to an image pick-up apparatus for deriving an image of an object, a fingerprint certification apparatus using the image pick-up apparatus and an image pick-up method, and more in particular, it relates to an image pick-up apparatus suitably mounted on a biological certification system such as a fingerprint certification and the like, a fingerprint certification apparatus and an image pick-up method using the image pick-up apparatus.

2. Related Background Art

In recent years, to secure security for personal information and confidential information, a biological certification system such as a fingerprint certification apparatus and the like has come to attract attention, and its demand toward office equipment and portable device has been increasing. Such a biological certification using a fingerprint, a face, an iris, a palm pattern and the like derives an image of a living body from an image pick-up apparatus, performs a derivation of characteristics from the derived image, compares the information thus derived to the registered data to certify a person's identity.

Here, as a detection system of the image pick-up apparatus used in the biological certification system, there are available an optical system using an image pick-up device such as CCD, CMOS sensor and the like, an electric capacity system, a pressure detection system, a thermal sensitive system, an electric field detection system and the like. Further, as for another classification, there are available an area type for collectively deriving an object image by using a two dimensional area sensor, and an image pickup system called as a sweep type deriving a whole image by synthesizing the images of an object imaged in order in a sub-scanning direction by using a one dimensional line sensor or a band-shaped two dimensional sensor with the number of pixels being about five to twenty in a sub-scanning direction (for example, Japanese Patent Application Laid-Open No. 2002-216116).

Heretofore, in such a biological certification system, after having performed various image processings such as improvement of a contrast, an emphasis of edges and the like for the image derived by the image pick-up apparatus, a characteristic derivation processing for performing verification has been executed.

Further, a conventional art concerning an image input apparatus for performing an imaging by varying exposure conditions in different portions within a light receiving region has been disclosed (for example, see U.S. 2003 147550A1).

However, in the biological certification system, unless the original image itself has a sufficient image quality to a certain extent, a characteristic derivation level is downgraded, so that verification accuracy ends up being lowered. For example, in a fingerprint sensor of the optical system, a light source quality is an important factor to decide an image quality of the imaged image itself.

For example, in case a plurality of LED are turned into a light source, there arises a problem of non-uniformity of light volume of each light source (LED). For example, even if the LEDs are stratified according to a luminance rank, even in the case where there is a difference two times the same current value between the minimum value and the maximum value, such a difference is taken as within a tolerance level, and they are shipped out as the same products. That is, there exists large luminance unevenness for the same current value between the products.

In such a case, when a plurality of LEDs are taken as a light source, luminance unevenness appears as it is in a fingerprint image, and the maximum 50% of a dynamic range is occupied by non-uniformity of the light source, which bears heavily upon a signal component. This not only causes a lowering of a S/N but also makes the image processing for deriving characteristics of the imaged image such as background removal, ridge derivation and the like more difficult due to interference of the non-uniformity, and as a result, there arises a problem that the verification accuracy is lowered.

Further, particularly in the case of the optical type fingerprint sensor which induces a finger to adhere to the sensor, since the light source is arranged in the vicinity of the sensor, a light volume unevenness (shading) occurs, in which the light volume becomes uneven depending on a light receiving region on the sensor due to a distance relation between the light source and the sensor. In this case also, since the luminance difference appears as it is in an imaged fingerprint image, there arises a problem that the non-uniformity of the light source heavily bears upon a signal component as described above so as to lower the S/N and make the image processing such as background removal, ridge derivation, and the like difficult, thereby lowing the verification accuracy.

Particularly, in the case of the fingerprint sensor of a sweep type, there arise two peculiar problems as shown below due to an image quality deterioration of the imaged image. In the first place, there arises a problem of an image re-formation (processing for mutually joining partial images) becoming difficult. To re-form the image, after deriving the partial images of a finger (fingerprint) moving on the sensor, it is necessary to calculate a correlation between the partial images mutually neighbored up and down, and detect the same fingerprint region. At this time, when there exists a luminance difference due to a difference in the distance from the light source and a variation of the light source itself in the imaging region, the correlation is lowered by this much luminance difference, and therefore, there arises a problem that a detection of the same fingerprint region becomes difficult. This lowering of the correlation becomes remarkable particularly when the shading exists in a moving direction of the finger.

In the second place, there arises a problem that, when characteristic points of the fingerprint are derived from the image of the whole finger after the re-formation, erroneous characteristic points are detected or intrinsic characteristics are not detected, so that the verification accuracy ends up being lowered. In case there exists shading in a moving direction of the finger, a plurality of partial images having luminance difference are obtained in a column direction including a column having a high luminance (taken as a column which is read at first) and a column having a low luminance (taken as a column which is read at the last). When these partial images are to be continuously joined together, for example, a processing for joining the last column of the first partial image and the first column of the second partial image is performed. In this way, when an attempt is made to calculate the correlation between the last column (taken as a first column) of the first partial image and the first column (taken as a second column) of the second partial image and join the columns together, in case the luminance difference between the first column and the second column is large due to the shading, there arises a problem that a pseudo line is sometimes generated in the joined portion. There is also a problem that the same line appeared in the boundary for each partial image might be erroneously recognized as a pseudo line. In general, derivation of characteristic points of the fingerprint is performed by detecting the ridges of the fingerprint pattern, and discontinuous points and diverging points of the ridges are detected as characteristic points. Hence, if erroneously recognized as the pseudo fingerprint pattern, such discontinuous points and diverging points end up being generated, and the points which are not intrinsic characteristics are derived as the characteristic points. In this way, there arises a problem that the verification of the fingerprint is lowered.

Further, as a solution for these problems, though the correction of the derived imaged image by the image processing is considered, this correction often causes the deterioration of the S/N for the corrected portion or the side-effective deterioration of the image quality, and does not contribute to an essential solution.

Further, the optical sensor has a problem of being easily affected by an external light. In the case where the external light is weak inside the room or at night, and in the case where the object is impinged mainly by the light from a light source and the case where a strong incident light from the outside the room in the day time or a window impinges the object together with the light from the light source, the light volume and its distribution state sharply change, and the image derived ends up being sharply changed even if it is the same image.

For example, when it is optimized under a light volume condition at the in-door time, in case it is under a direct sunlight of midsummer, it does not enter a supposed dynamic range, but the image evaporates because of a strong light volume. On the contrary, when it is optimized under a bright environment, it turns brownish in case the light volume is too weak.

Further, in the case such as when the sunset light is incident obliquely from the window, and the like, when the light volume distribution within a plane sharply changes, a part of the image within the plane evaporates or turns brownish, so that an image range included in the dynamic range used for the image processing or the certification ends up being narrowed.

Because of the above described reasons, there arises a problem that the influence of the external light affects the computing time of the partial images, the computing result, the verification accuracy and the like.

Although a method for providing a light shielding cover to prevent the external light from entering the pixels of the sensor or providing an optical member for preventing the external light is considered, the light shielding cover and the optical member for preventing the external light invite an increase of enlargement of the external shape size and the cost thereof.

The present invention has been made in view of the above described circumstances, and solves at least one of the above described problems, and an object of the invention is to provide an image pick-up apparatus, a fingerprint certification apparatus and an image pick-up method, which can correct light volume unevenness due to variation of the light volume in a plurality of light sources.

Further, an object of the invention is to provide an image pick-up apparatus, a fingerprint certification apparatus and an image pick-up method, which can correct the shading generated due to a positional relation between the light source and the sensor.

Further, an object of the invention is to provide an image pick-up apparatus, a fingerprint certification apparatus and an image pick-up method, which detects and corrects the change and the non-uniformity of the light exposure due to the external light.

SUMMARY OF THE INVENTION

The present invention has been made to solve the above described problems, and an image pick-up apparatus according to the present invention comprises pixels arranged first or second dimensionally, and comprises image pick-up means for image pick-up of an object and light irradiation means for irradiating with a light the object, wherein the image pick-up means outputs partial images of the object when the object and the image pick-up means move relatively, and comprises control means for controlling an exposure within the partial image plane in the imaging means.

Further, the image pick-up apparatus according to the present invention comprises pixels arranged second dimensionally, image pick-up means for image pick-up of an object, a plurality of light irradiation means which are arranged in parallel to a main scan direction of the image pick-up means and image pick-up of an object, control means for controlling the luminance of a plurality of light irradiation means, and sub scan direction control means for controlling at least either of an electric charge accumulation period of the image pick-up means or the luminance of the light irradiation means, wherein the control means controls the light volume distribution of the main scan direction in the image pick-up means by controlling the luminance of a plurality of light irradiation means, and the sub scan direction control means controls at least either of the electric charge accumulation period of the image pick-up means or the luminance of the light irradiation means so that the luminance difference of the light irradiation means in the sub scan direction of the image pick-up means is corrected.

Further, the image pick-up apparatus according to the present invention is characterized by comprising image pick-up means for image pick-up of an object, light irradiation means for irradiation with a light the object, estimating means for estimating the external light state, and control means for controlling the exposure within the image plane in the image pick-up means according to the external light state estimated by the estimating means.

Further, the fingerprint recognition apparatus according to the present invention is characterized by comprising the image pick-up apparatus according to any one of claims.

Further, the image pick-up method according to the present invention is an image pick-up method for deriving an image by irradiating with a light the object by using the image pick-up means for image pick-up of the object, wherein the image pick-up means and the object are moved relatively so as to output a plurality of partial images of the object and an exposure within the partial image plane of the image pick-up means is controlled.

Further, the image pick-up method according to the present invention is an image pick-up method for deriving an image by irradiating with a light the object by using the image pick-up means for image pick-up of the object, wherein an exposure within the image plane in the image pick-up means is controlled according to the external light state.

BRIEF DESCRIPTION OF THE DRAWINGS

FIG. 1 is a block diagram showing a schematic configuration of a fingerprint certification apparatus of a sweep (scan) type adapting the present invention as a first embodiment of the present invention;

FIGS. 3A1, 3A2, 3A3, 3A4, 3A5, 3A6, 3A7, 3A8, 3A9, 3B and 3C are views showing a processing example for synthesizing the whole fingerprint image from a plurality of partial images in a sweep type fingerprint sensor;

FIG. 4 is a view showing a circuit configuration example of a sensor unit 6 of an image pick-up device unit 104 (image pick-up unit 204 of FIGS. 2A, 2B, 2C and 2D) of FIG. 1;

FIG. 5 is a view showing a configurational example of a pixel unit 41 shown in FIG. 4;

FIG. 7 is a view showing a definite circuit example of a light source 103 and a LED driving unit 108 shown in FIG. 1;

FIG. 8 is a view showing a circuit example of a control pulse preparation circuit for preparing a LED control pulse to be inputted to input terminals 701 to 703 shown in FIG. 7;

FIG. 9 is a timing chart showing the operations of the image pick-up device unit 104 and the LED driving unit 108 in the present embodiment;

FIG. 20 is an explanatory drawing in case the external light enters obliquely;

DESCRIPTION OF THE PREFERRED EMBODIMENTS

Figure 2A:
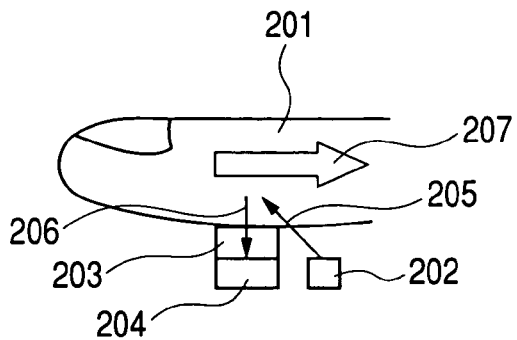
FIGS. 2A, 2B, 2C and 2D are views showing a schematic configuration and an operation principle of an optical type fingerprint sensor by using a system called as a sweep type in the present embodiment.

Embodiments of the present invention will be described with reference to the drawings.

First Embodiment

FIG. 1 is a block diagram showing a schematic configuration of a fingerprint certification apparatus of a sweep (scan) type adapting the present invention as a first embodiment of the present invention.

The fingerprint certification apparatus in the present embodiment comprises an image pick-up unit 101 and a certification unit 102. For example, the image pick-up unit 101 may be an imaging unit comprising an image sensor, and the certification unit 102 may be a combination of functions executed by a personal computer or the image pick-up unit 101 and the certification unit 102 may be combined into a fingerprint certification unit to be an independent. unit connected to an unillustrated personal computer.

First, the image pick-up unit 101 will be described. In the image pick-up unit 101 of FIG. 1, reference numeral 103 denotes a light source for illumination (light impinging means), which is a LED (Light Emitting Diode) in the present embodiment. Reference numeral 108 is a LED driving unit, which controls a luminance and a lighting timing of the LED.

Reference numeral 104 denotes an image pick-up device unit of a CMOS (Complementary Metal Oxide Semiconductor) or a CCD (Charge Coupled Device) type and the like, and is a first dimensional sensor or a band-shaped second dimensional sensor with the number of pixels in a sub-scan direction being about five to twenty, and is smaller than the area of the physical body, the image of which is to be derived. The image pick-up device unit 104 in the present embodiment is a sensor of the CMOS type, and is a band-shaped second dimensional sensor with the number of pixels being 521 in the main scan direction and 12 pixels in the sub-scan direction.

Reference numeral 105 denotes a sensor driving unit for controlling a sampling timing of the image pick-up device unit 104 and an AD (Analogue Digital) converter unit 107. Reference numeral 106 denotes an amplifier clamping unit for clamping an analogue output from the image pick-up device unit 104 into an adequate DC (Direct Current) level so as to be processed by the AD converter unit 107 of a subsequent stage and for performing an adequate amplification. Reference numeral 107 denotes an AD converter unit for converting an analogue signal from the image pick-up device unit 104 into a digital signal. Further, reference numeral 109 denotes a communication unit for performing communications with the certification unit 102.

Reference numerals 110a and 110b denote image data signal lines for propagating analogue signals outputted by the image pick-up device unit 104 and the amplifier clamping unit 106, respectively. Reference numeral 110c denotes an image data signal line for propagating the digital signal outputted by the AD converter unit 107. The reference numerals 112a and 112c denote a signal line of the driving pulse outputted to the image pick-up device unit 104 and the AD converter unit (ADC unit) from a sensor driving unit. Reference numeral 112b denotes a signal line of the driving pulse to be sent to the light source 103 from the LED driving unit 108. Reference numeral 111 denotes a signal line where the communication unit 109 receives and outputs a control signal from the certification unit 102, and this is a control line for transmitting a signal which performs a control of the sensor driving unit 105 and the LED driving unit 108.

Reference numeral 113 denotes a data signal line, in which the communication unit 109 outputs an image data signal inputted from an ADC unit 107 and transfers it to the certification unit 102. Reference numeral 114 denotes a control signal line which transfers a control signal from the certification unit 102 to the communication unit 109 of the image pick-up unit 101.

Next, the certification unit 102 will be described. In the certification unit 102, reference numeral 115 denotes a communication unit for performing communications with the image pick-up unit 101. Reference numeral 135 denote an image synthesizing unit for synthesizing images showing the object outputted by the image pick-up unit 101 having a band-shaped secondary sensor by using a plurality of image data imaged in order in the sub-scan direction. Reference numeral 136 denotes a frame memory unit used for performing the image processing by the image synthesizing unit 135.

Reference numeral 121 denotes a biological detection unit for detecting the placement of a finger on the image pick-up device unit 104 and the finger being genuine instead of being false by using the synthesized image data outputted by the image synthesizing unit 135. The biological detection unit 121 estimates whether or not the object within the image data is a living body by using color components and luminance alternation of the image data. Reference numeral 122a denotes a biological information luminance detector, and estimates a region including the biological information from among the synthesized image data outputted by the image synthesizing unit 135 and detects the luminance of the estimated biological information region. Reference numeral 123a denotes a control unit for receiving the information from each unit including the biological information luminance detector 122a and outputting a control signal for controlling the image pick-up unit 101 to the image pick-up unit 101 through the communication unit 115.

Reference numeral 116 denotes a preliminary processing unit for performing the image processing such as an edge emphasis and the like so as to derive a characteristic for the synthesized image outputted by the image synthesizing unit 135. Reference numeral 117 denotes a frame memory unit used for performing the image processing by the preliminary processing unit 116. Reference numeral 118 denotes a characteristic deriving unit for performing derivation of the characteristic from the image data processed by the preliminary processing unit 116. Reference numeral 119 denotes a registration and matching unit for comparing and matching a personal characteristic derived by the characteristic deriving unit 118 with the data registered or already registered in a data base unit 120. Reference numeral 120 denotes a data base unit for storing the personal data.

Reference numerals 124a, 124b, and 124c denote data lines for transmitting the image data. Reference numeral 125 denotes a data line and a control line between the data base 120 and the registration and matching unit 119. Reference numeral 126 denotes a signal line for transmitting a deriving state of the characteristic deriving unit 118 to the control unit 123a. Reference numerals 127 and 129a denote signal lines for transmitting the synthesized image date outputted by the image synthesizing unit 135 to the biological information luminance detector 122a and the finger detection unit 121. Reference numeral 128 denotes a signal line for transmitting a biological detection result to the control unit 123a, and reference numeral 130a denote a signal line for transmitting the biological information luminance detection result to the control unit 123a by the biological information luminance detector 122a. Reference numeral 131 denotes a signal line for transmitting a control signal for controlling the image pick-up unit 101 outputted by the control unit 123a by receiving a state of each unit to the communication unit 115.

The image pick-up unit 101 of the present embodiment checks in advance at the time of shipment a luminance unevenness of each LED element configuring the light source 103 and a non-uniformity (shading) of light volume decided by a positional relation between each LED and the image pick-up device unit 104 and the like, and the control unit 123a transmits a control signal to the sensor driving unit 105 and the LED driving unit 108 through the communication unit 115 so that the luminance unevenness and the non-uniformity match a correction value and an adjustment value calculated from the LED luminance distribution. The sensor driving unit 105 and the LED driving unit 108 control the operation of the image pick-up device unit 104 and the light volume of each LED of the light source 103 according to the control signal from the control unit 123a. The timing for calculating the correction value and the like from the LED luminance distribution is not limited to the shipping time, but, for example, by detecting the luminance unevenness of each LED of the light source 103 and the non-uniformity of the light volume decided by the positional relation between each LED and the image pick-up device unit and the like by the biological information luminance detector 122a, the luminance of the region where the finger is placed is estimated, and the control signal is transmitted in such a manner as to dynamically change the correction value and the adjustment value with the sensor driving unit 105 and the LED driving unit 108 controlled, so that the operation of the image pick-up device unit 104 and the light volume of each LED of the light source 103 may be controlled. Further, the control unit may be provided within the image pick-up apparatus.

By the correction and adjustment from the control unit 123a as described above, the image pick-up unit 101 enhances an uniformity of light volume of the light source which light-impinges a finger of the object and, at the same time, can control an exposure condition according to the shading, and perform the derivation of a fingerprint image while correcting the difference of illuminating conditions within the imaging plane.

Next, an optical type fingerprint sensor using a system called as a sweep type in the present embodiment will be described by using the drawings.

Figure 2B:
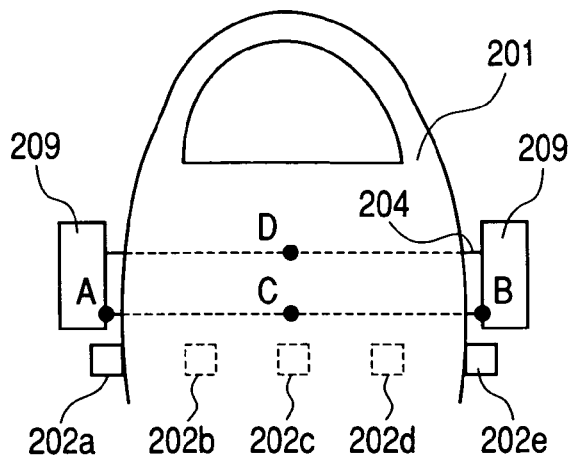
Figure 2C:
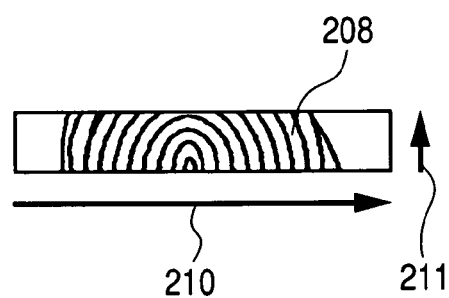
Figure 2D:
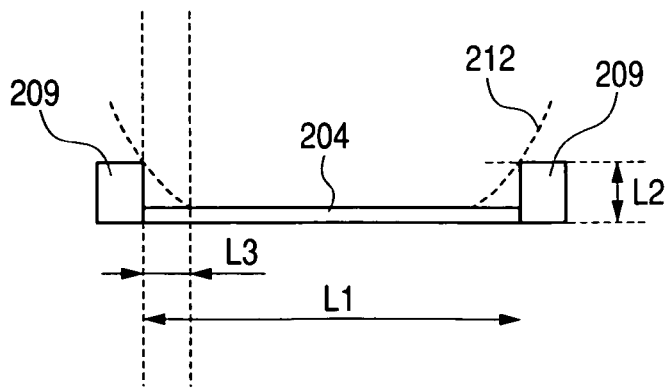

FIGS. 2A, 2B, 2C and 2D are views showing a schematic configuration and an operation principle of the optical type fingerprint sensor using the system called as the sweep type in the present embodiment. FIG. 2A is a schematic diagram of the optical type fingerprint sensor seen from the lateral direction of the finger, and FIG. 2B is a schematic diagram of the optical type fingerprint sensor seen from above the finger. Further, FIG. 2C shows one sheet of a fingerprint image example derived by a band-shaped second dimensional sensor. Further, FIG. 2D is a schematic diagram of the optical type fingerprint sensor seen from the top end of the finger.

In FIG. 2A, reference numeral 201 denotes a finger to become an object of fingerprint certification, and moves in a direction of an arrow mark 207. Reference numeral 202 denotes a LED as a light source. Reference numeral 203 denotes an optical member (hereinafter, referred to as an optical member), which guides an optical difference of the convexo concave patterns of the fingerprint to an image pick-up device 204 to be described later. Reference numeral 204 denotes a band-shaped second dimensional sensor with the number of pixels of the sub-scan direction being about five to twenty and, to be more specific, is a CMOS type image pick-up device. The LED 202 of FIG. 2A corresponds to the LEDs 202a to 202e of FIG. 2B and the LED 202 (202a to 202e) of FIG. 2B corresponds to the light source 103 of FIG. 1. Further, the optical member 203 and the image pick-up device 204 of FIGS. 2A, 2B and 2D correspond to the image pick-up device unit 104 of FIG. 1.

Reference numeral 205 denotes an outgoing direction of the light from the LED 202 to the finger 201. Reference numeral 206 denotes an incident direction of the light advancing to the optical member 203 and the image pick-up device 204 from the finger 201 after the light discharged from the LED 202 is scattered within the finger 201.

Further, in FIG. 2C, reference numeral 208 denotes a fingerprint pattern example in one sheet of the fingerprint image example derived by the band-shaped second dimensional sensor (image pick-up device 204) from the finger 201 which is the object. Further, in FIGS. 2B and 2D, reference numeral 209 denotes a guide mechanism to prevent blurring and displacement of the finger 201 in a vertical direction to a moving direction accompanied with the movement of the finger 201. In FIG. 2B, each point of points A, B, C and D denotes a position on the pixel of the image pick-up device 204. In FIGS. 2B and 2D, the optical member 203 on the image pick-up device 204 is omitted from the illustration.

Further, as shown in FIG. 2C, the arrow mark 210 is a main scan direction in the image pick-up device 204, and the arrow mark 211 is a sub scan direction in the image pick-up device 204. Here, the definition of the main scan direction and the sub scan direction in the present embodiment will be described later by using FIGS. 4 and 5. In the present embodiment, as shown in FIG. 2B, the LED 202a to 202e as the light sources are arranged in parallel to the main scan direction shown by the arrow mark 210.

In FIG. 2D, reference numeral 212 denotes a contour of the finger 201 when this guide mechanism 209 hits against the finger 201. L1 denotes a width of the image pick-up device 204, and L2 denotes a height of the guide mechanism 209. As shown in FIG. 2D, when the guide mechanism 209 is installed at both ends of the image pick-up device 204, there exists a region in which the finger 201 as shown by L3 is not in contact with or difficult to contact the imaging plane of the image pick-up device 204. To be more specific, when L2 is 1.5 mm and L1 is 15 mm, about 20% of the region in the imaging plane of the image pick-up device 204 does not contact or is difficult to contact the finger 201. Here, assuming that an appropriate height of the guide mechanism 209 is taken as 1.5 to 2.5 mm, the region of 10 to 16.5% from both ends has an insufficient contact of the finger 201 comparing to the center portion of the finger 201.

The region that can expect an uniform state of the image quality as a result of the study of such an ordinary sensor configuration as well as the experimental work thereof is a region of about 67 to 80% (2/3 to 4/5) of the center of the imaging plane of the image pick-up device 204 contacting sufficiently the finger 201. Further, the region of both ends of the imaging plane is often used as a region rather than for the purpose of deriving the intrinsic fingerprint image, but for playing a role of assisting to derive the fingerprint of the center region from the change of a ridge pattern in the fingerprint of the lateral side of the finger 201 or role of calculating an adequate exposure condition and signal level by detecting the external light environment (being outdoors or indoors now or a nighttime or a daytime) from the light incident from the outer surface of the finger 201 for deriving the information for interpolating the derived image of the region of 67 to 80% of the center.

Next, a processing for synthesizing an image of the whole fingerprint from a plurality of partial images shown in FIG. 2C in the sweep type fingerprint sensor will be described.

Figure 3B:
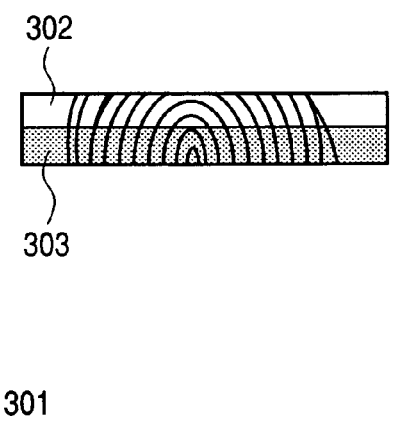
Figure 3C:
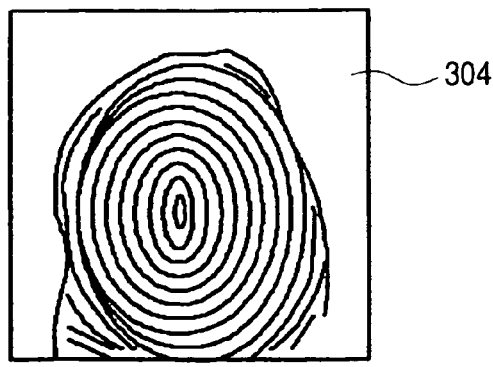

FIGS. 3A1, 3A2, 3A3, 3A4, 3A5, 3A6, 3A7, 3A8, 3A9, 3B and 3C are views showing a processing example for synthesizing the image of the whole fingerprint from a plurality of partial images. FIGS. 3A1, 3A2, 3A3, 3A4, 3A5, 3A6, 3A7, 3A8 and 3A9 show partial images of the fingerprint continuously derived by the image pick-up device 204 of the fingerprint sensor when the finger 201 is moved in a direction of an arrow mark 207 of FIG. 2A. FIG. 3B is one of those partial images, and corresponds to FIG. 3A6. Here, a portion 301 of FIG. 3A1, for example, shows a partial image initially derived by the image pick-up unit 101 for the same finger 201 included also in the image of FIG. 3A5. FIG. 3C shows one sheet of the fingerprint image example acquired by synthesis by the image synthesizing unit 135 based on the partial images of FIGS. 3A1, 3A2, 3A3, 3A4, 3A5, 3A6, 3A7, 3A8 and 3A9 derived by the image pick-up unit 101 including the image pick-up device unit 204.

Figure 4:
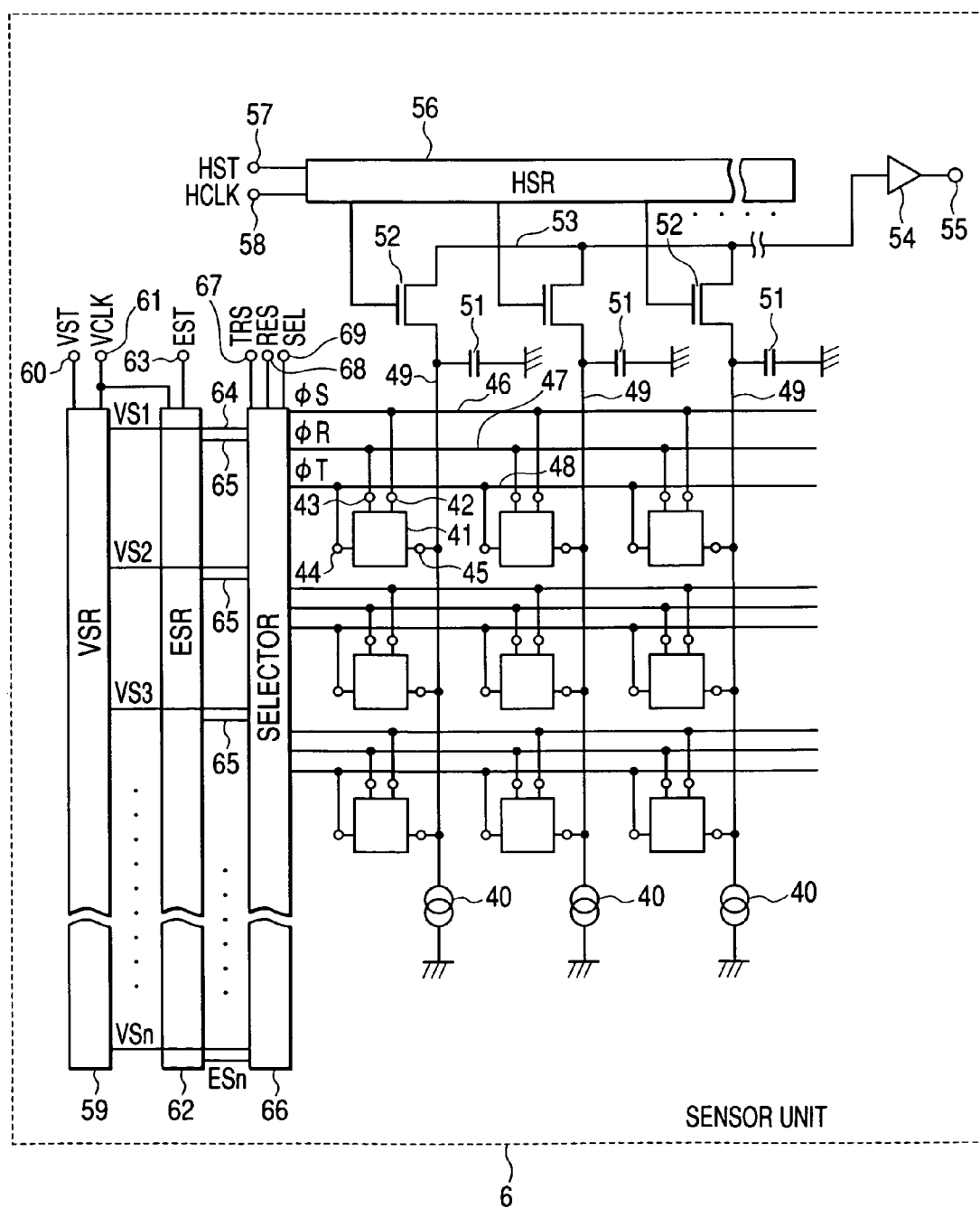
Figure 5:
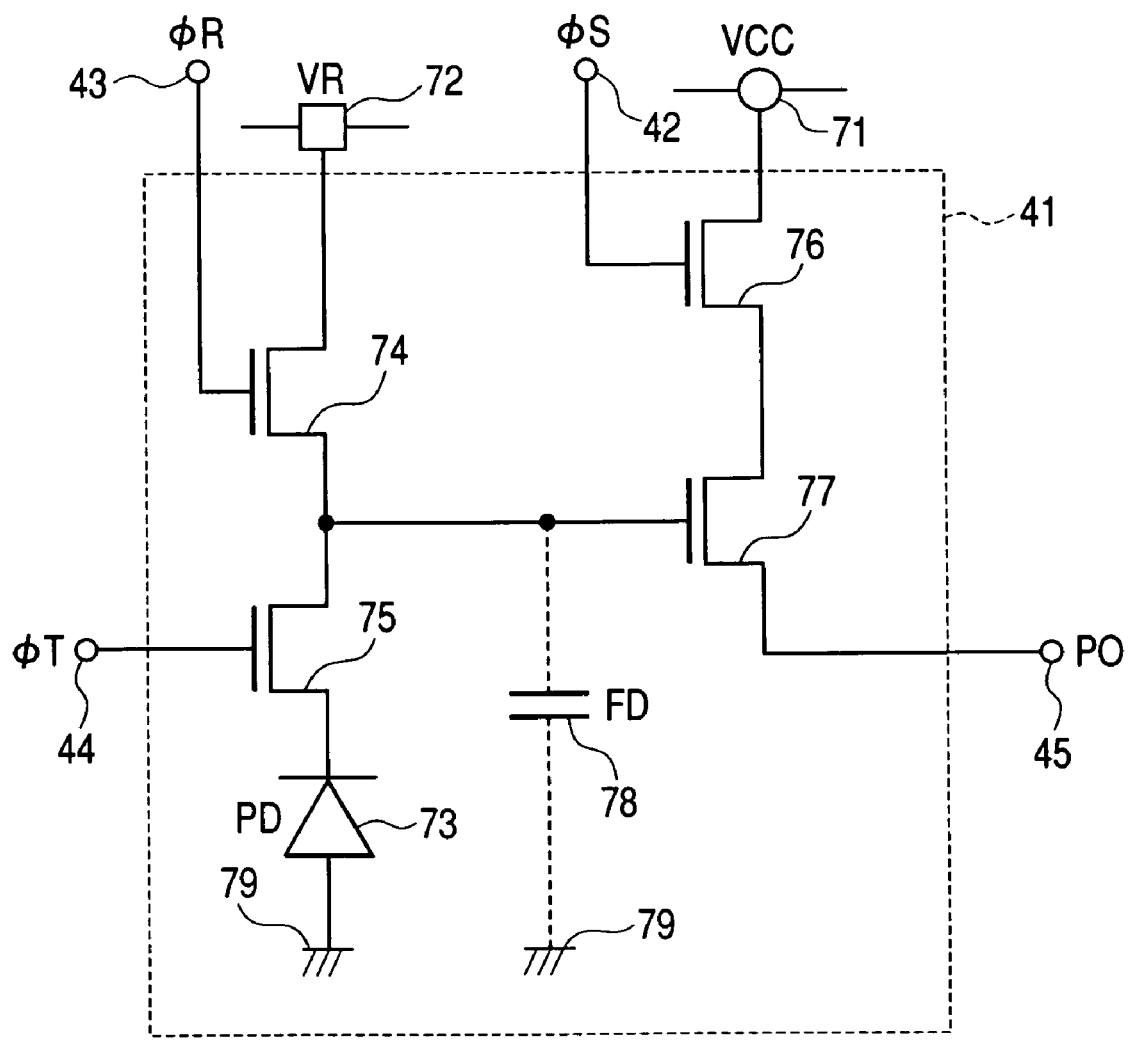
Figure 6A:
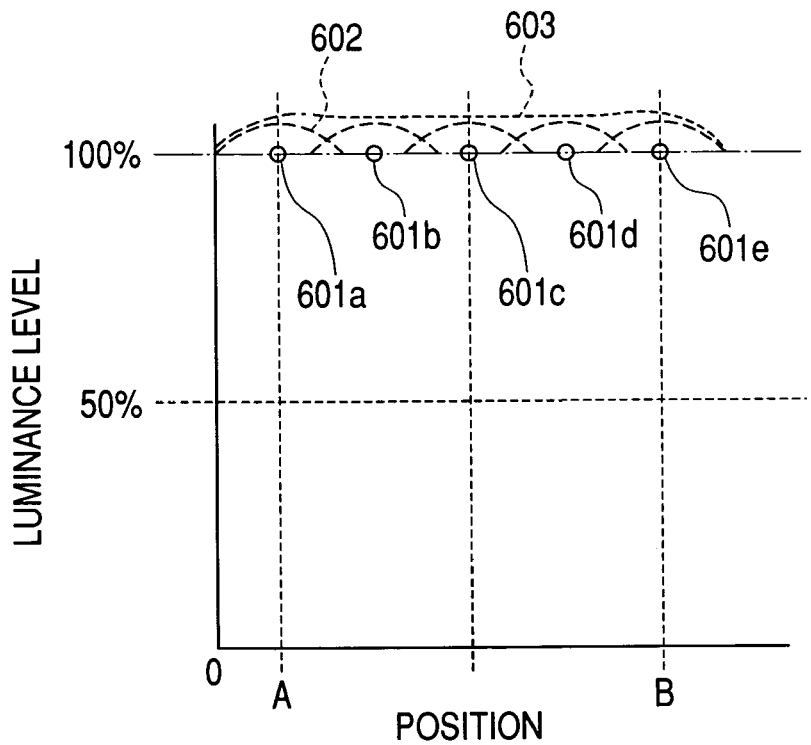
FIGS. 6A and 6B are views showing a luminance distribution in a direction (main scan direction of the sensor) from a point A to a point B in FIG. 2B.
Figure 6B:
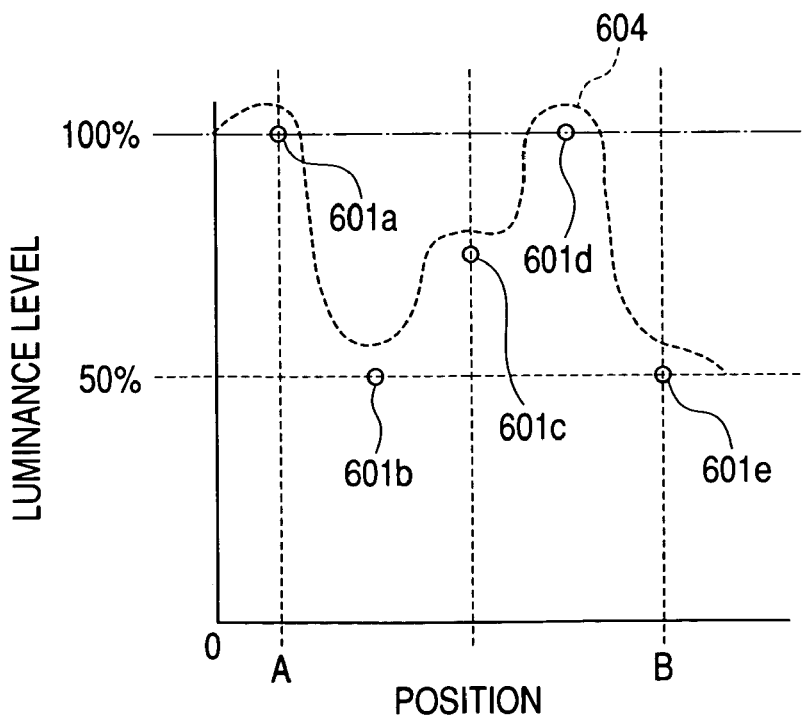
Figure 6C:
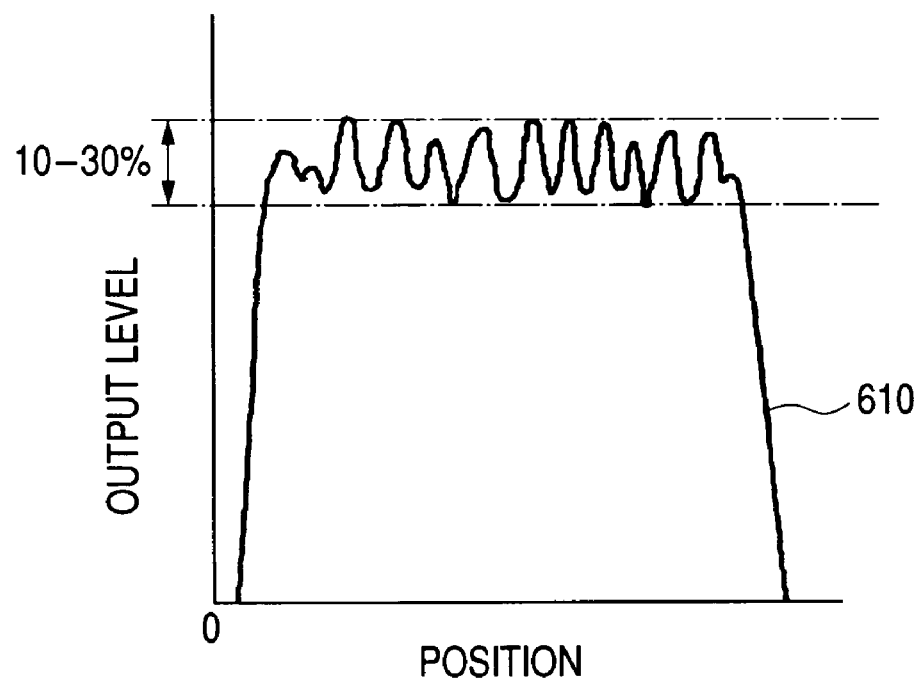
FIGS. 6C and 6D are views showing an output level of a fingerprint image in a state of having no luminance unevenness of the light source itself.
Figure 6D:
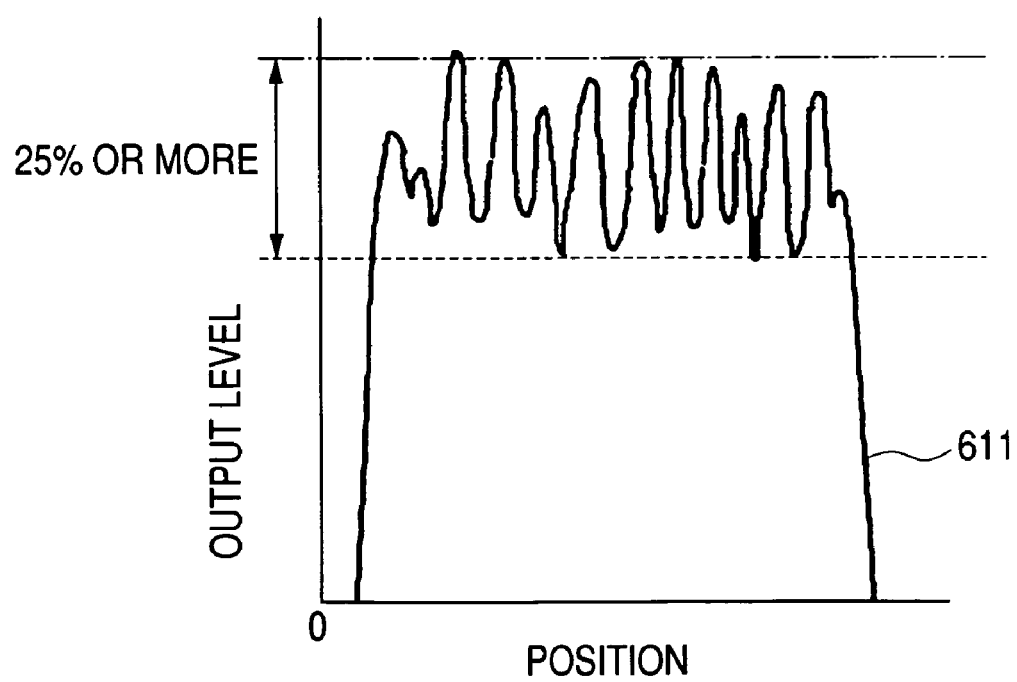
Figure 6E:
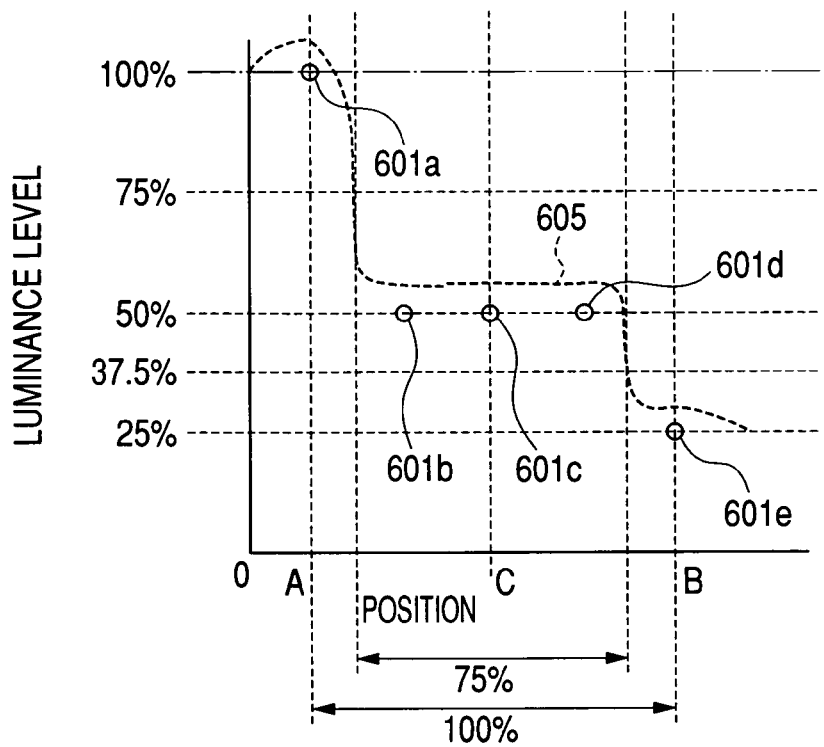
FIGS. 6E and 6F are views showing the luminance distribution in case of correcting the luminance unevenness shown in FIG. 6B and the luminance distribution in a direction from a point C to a point D in FIG. 2B.
Figure 6F:
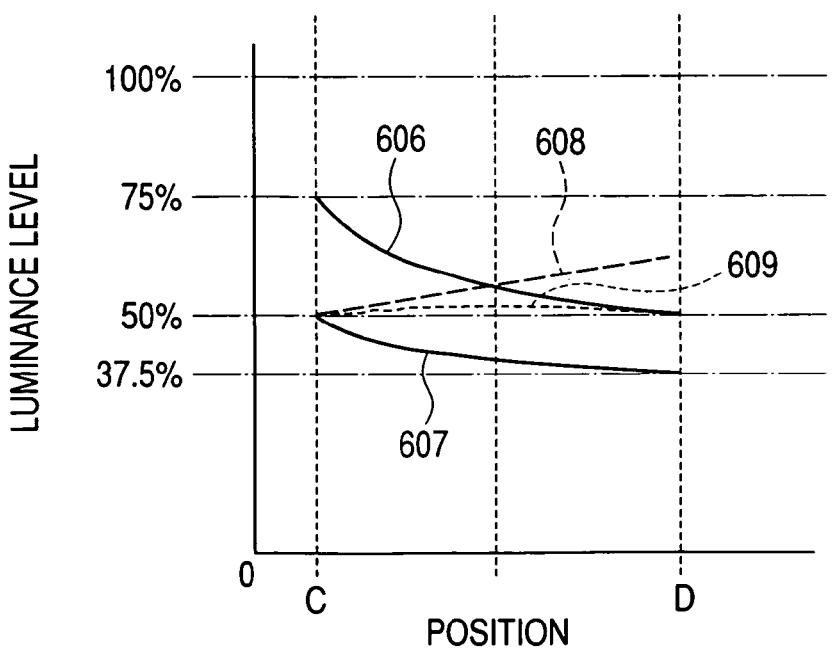
Figure 7:
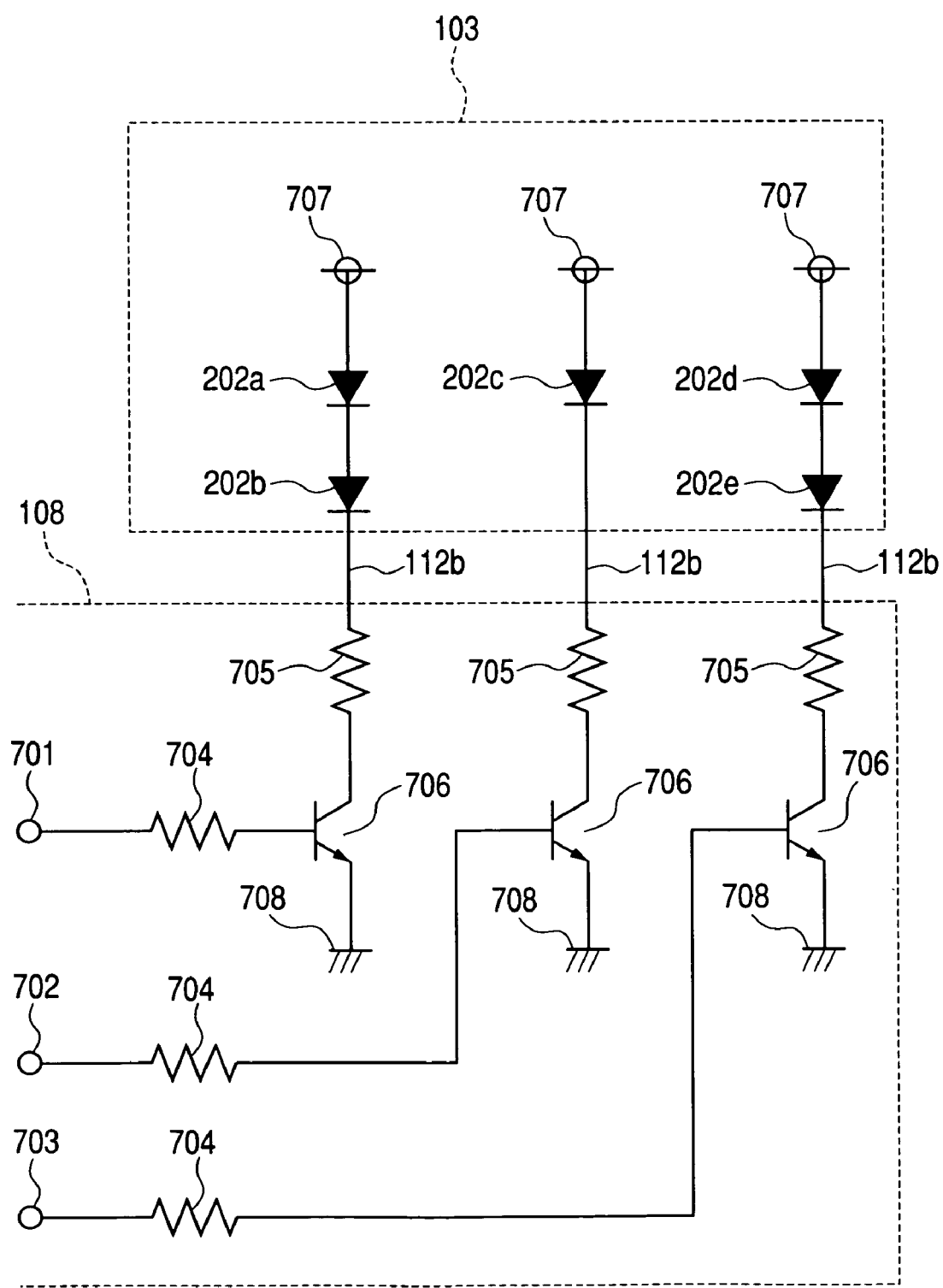

In the partial images of the fingerprint imaged and derived in order in the sub-scan direction while the finger 201 is moved on the image pick-up device 204 as shown in FIGS. 2A, 2B, 2C and 2D, there exist regions being high in correlation in a portion 302 of FIG. 3B (=FIG. 3A6) and the lower half portion of FIG. 3A7 or in the continuous images like a portion 303 of FIG. 3B and an upper half portion of FIG. 3A5. The image synthesizing unit 135 estimates these portions being high in correlation to be the same region of the finger 201 and joins them together so as to synthesize the fingerprint image shown in FIG. 3C from the partial images shown in FIGS. 3A1, 3A2, 3A3, 3A4, 3A5, 3A6, 3A7, 3A8 and 3A9.

Next, a circuit configuration example of a sensor unit 6 provided for the image pick-up device 204 (image pick-up device unit 104) of the CMOS type in the present embodiment will be described.

FIG. 4 is a view showing the circuit configuration example of the sensor unit 6 of the image pick-up device unit 104 (image pick-up device 204 of FIGS. 2A, 2B, 2C and 2D) of FIG. 1. The image pick-up device unit 104 of the present embodiment is a band-shaped second dimensional sensor where the number of pixels is about five to twenty in the sub scan direction. By this band-shaped image pick-up device unit 104, a fingerprint sensor called as a sweep type is configured, in which a whole image is derived by synthesizing the images of the finger 201, which is an object, imaged in order in the sub-scan direction.

In the present embodiment, a horizontal scan direction in a common image pick-up device is a main scan direction, and a vertical scan direction is a sub scan direction. The image pick-up device unit 104 of an ordinary CMOS type first selects one column (for example, the upper most column) and reads the pixels in order (for example, from the topmost left side to the right side) from one end in the horizontal direction of the column toward the opposite side end of the same column. After that, the next column in the vertical direction is selected, and the pixels are similarly read in order from one end in the horizontal direction to the opposite side end in the same column. By reading each column in the vertical direction in this way, the pixels of the whole image are derived.

Hence, in the image pick-up device unit 104 of the present embodiment, the scan in the horizontal direction is taken as a main scan, and the scan in the vertical direction is taken as a sub scan.

In FIG. 4, reference numeral 41 denotes a pixel unit configuring one pixel in the sensor unit 6. Reference numeral 42 denotes an input terminal of a read pulse (ΦS) in the pixel unit 41. Reference numeral 43 denotes an input terminal of a reset pulse (ΦR) in the pixel unit 41. Reference numeral 44 denotes an input terminal of a transmission pulse (ΦT) in the pixel unit 41. Reference numeral 45 denotes a signal read terminal (P0) in the pixel unit 41. Reference numeral denotes a signal line for sending the read pulse (ΦS) to each pixel in a horizontal direction from a selector unit 66 to be described later, and reference numeral 47 denotes a signal line for sending the reset pulse (ΦR) to each pixel in a horizontal direction from the select unit 66, and reference numeral 48 denotes a signal line for sending the transfer pulse (ΦT) to each pixel in a horizontal direction from the selector 66. Reference numeral 49 denotes a vertical signal line, reference number 40 denotes a current generator, and reference numeral 51 denotes a capacitor coupled to a vertical signal line 49. Reference numeral 52 denotes a transfer switch in which the gate is connected to a horizontal shift resistor 56, and the vertical signal line 49 and an output signal line 53 are connected to the source drain. Reference numeral 54 denotes an output amplifier connected to an output signal line 53. The output of the output amplifier 54 is outputted to an output terminal 55. This output terminal 55 is the output terminal of the sensor unit 6.

Further, reference numeral 56 denotes a horizontal shift resistor (HSR), reference numeral 57 denotes an input terminal of the start pulse (HST) thereof, and reference numeral 58 denotes an input terminal of the transfer clock (HCLK) thereof. Further, reference numeral 59 denotes a vertical shift resistor (VSR), reference numeral 60 denotes an input terminal of the start pulse (VST) thereof, and reference numeral 61 denotes an input terminal of the transfer clock (VCLK) thereof. Further, reference numeral 62 denotes an electronic shutter shift resistor (ESR) of the type called as a rolling shutter to be described later, reference numeral 63 denotes an input terminal of the start pulse (EST) thereof, reference numeral 64 denotes an output line of the vertical shift resistor (VSR) 59, and reference numeral 65 denotes an output line of the electronic shutter shift resistor (ESR) 62. Further, reference numeral 66 denotes a selector unit for outputting the read pulse (ΦS), the reset pulse (ΦR), and the transfer pulse (ΦT) for controlling the operation of the pixel unit 41, reference numeral 67 denotes an input terminal of an original signal TRS of the transfer pulse, reference numeral 68 denotes an input terminal of an original signal RES of the reset pulse, and reference numeral 69 denotes an input terminal of an original signal SEL of the read pulse. In FIG. 4, though reference numerals 41 to .45 are attached to one pixel only, and reference numerals to other pixels are omitted for the sake of easy to see convenience, in the following description, all the pixels of the sensor unit 6 are to be attached with reference numerals 41 to 45.

FIG. 5 is a view showing a configurational example of the pixel unit 41 shown in FIG. 4. In FIG. 5, reference numeral 71 denotes a power supply voltage (VCC), reference numeral 72 a reset voltage (VR), reference numeral 73 a photo diode, reference numerals 74 to 77 a switch comprising a MOS transistor, reference numeral 78 a parasitic capacity (FD), and reference numeral 79 a ground. The above described switch 74 is a reset switch, and a switch 76 is a read switch.

Here, the operation of photoelectric conversion in the image pick-up device unit 104 will be described with reference to FIGS. 4 and 5.

First, with the reset switch 74 in FIG. 5 and a switch 75 connected to a photo diode 73 in a state of being turned off, an accumulation of electrical charge by an incident light is performed in the photo diode 73.

After that, with the switch 76 in a state of being turned off, the switch 74 is turned on, so that the parasitic capacity 78 is reset. Next, the switch 74 is turned off and the switch 76 is turned on, so that the electrical charge in a reset state is read by a signal read terminal 45.

Next, with the switch 76 in an off state, the switch 75 is turned on, so that the charge stored in the photodiode 73 is transferred to the parasitic capacity 78. Next, the switch 75 is turned off and the switch 76 is turned on, so that the electrical charge in a reset state is read by the signal read terminal 45.

The driving pulses (ΦS), (ΦR) and (ΦT) of each MOS transistor, as to be described later, are prepared by the vertical shift resistors 59 and 62 and the selector unit 66, and are supplied to input terminals 42 to 44 of the pixels by each of the signal lines 46 to 48. The signals TRS, RES and SEL are inputted to input terminals 67 to 69 for one pulse each, respectively, for one pulse of the clock signal inputted from an input terminal 60, and hence, the driving pulses (ΦS), (ΦR) and (ΦT) are outputted in synchronization with the signals TRS, RES, and SEL, respectively. As a result, the driving pulses (ΦS), (ΦR) and (ΦT) are supplied to the input terminals 42 to 44.

Further, the signal read terminal 45 is connected to the current generator 40 by the vertical signal line 49 and, at the same time, is connected to the vertical signal line capacity 51 and the transfer switch 52, and a charge signal is transferred to the vertical signal line capacity 51 through the vertical signal line 49, and after that, the transfer switches 52 are scanned in order according to the output of the horizontal shift resistor 56, and the signals of the vertical signal line capacities 51 are read in order by the output signal line 53, and are outputted to the output terminal 55 through the output amplifier 54. Here, the vertical shift resistor (VSR) 59 starts a scan by the start pulse (VST) 60, and the transfer clock (VCLK) 61 is transferred in order to VS1, VS2, ... VSn through the output line 64. Further, the electronic shutter shift resistor (ESR) 62 starts the scan by the start pulse (EST) inputted from the input terminal 63, and the transfer clocks (VCLK) inputted from the input terminal 61 is transferred in order to the output line 65.

The reading sequence of each pixel unit 41 first selects the first column above a vertical direction, and selects and outputs the pixel units 41 for one column portion connected to each row from the left to the right accompanied with the scan of the horizontal shift resistor 56. When the output of the first column is completed, the second column is selected, and a signal charge subjected to the photoelectric conversion by the pixel units 41 connected to each row from the left to the right accompanied with the scan of the horizontal shift resistor 56 is selected and outputted.

Then, similarly according to the sequential scan of the vertical shift resistor 59, the columns are scanned from top to bottom from the columns 1, 2, 3, 4, 5 ..., and the image output of a whole image is performed. Now, an exposure period in the sensor unit 6 is decided by an accumulation period during which each pixel unit 41 accumulates the electrical charge of the light and a period during which the light from the object is incident on the imaging plane of the sensor unit 6. To describe more in details, the sensor of the CMOS type is different from a CCD element of an IT (interline transfer) type and a FIT (frame-interline transfer) type, and does not comprise a shielded buffer memory unit, and therefore, even during the period when the signals derived from the pixel unit 41 are read in order, the pixel unit 41 which is not yet read still continues to be exposed. Consequently, in case the image output is continuously read, the exposing time thereof becomes approximately equal to the reading time of the image. Further, when the LED is used as a light source, and the external light is prevented from entering by a light shielding member and the like, the only period in which the LED is turned on can be controlled as the exposing period.

Further, as another method for controlling the exposing period in the sensor of the CMOS type, a driving method called as a rolling shutter to perform the vertical scans both at the start and at the end of the electrical charge accumulation is performed as an electronic shutter (focal plane shutter). In this way, the exposing period can be set by a unit of the number of vertical scan lines at the start and at the end of the electrical charge accumulation. In FIG. 4, the ESR 62 is the vertical scan shift resistor to reset the pixel and start the accumulation, and the VSR 59 is the vertical scan shift resistor to transfer the electrical charge and completes the accumulation. In case of using the electronic shutter function, the ESR 62 is scanned prior to the VSR 59, and a period equivalent to that scan interval becomes the exposing period.

In this way, by adapting the accumulation method by the rolling shutter, the area sensor of the CMOS type resets the electrical charge of the pixel by one column unit in the vertical direction, and reads the electrical charge of the pixel by one column unit, and therefore, the sensor is characterized by being able to control the electrical charge accumulation by the column unit in the vertical scan, that is, the column unit of the sub scan direction.

The fingerprint certification apparatus in the present embodiment utilizes the fact that the electrical accumulation can be controlled by this column unit by the sub scan direction and that the exposure of the pixel of the sensor unit 6 is decided by the relation between the illumination condition of the light source and the accumulation period of the sensor.

The operation of the fingerprint certification apparatus of the present embodiment will be described by using FIGS. 6A, 6B, 6C, 6D, 6E, 6F, 7, 8 and 9. FIGS. 6A to 6C show a luminance distribution by the light source (LED 202a to 202e) for the position of each point A, B, C and D shown in FIG. 2B. FIGS. 6A and 6B are views showing the luminance distribution (the main scan direction of the sensor) from the point A to the point B in FIG. 2B. In FIGS. 6A and 6B, 601a to 601e schematically show the center of the luminance distribution of each of the LEDs 201a to 201e shown in FIG. 2B. Here, in case the luminance of each of the LEDs 201a to 201e ideally has no unevenness at all, the luminance distribution thereof is shown as FIG. 6A. In FIG. 6A, an actual luminance distribution of the LED 201a is shown by a broken line 602, and a whole luminance distribution by five LEDs 201a to 201e is as shown by a broken line 603. As shown in FIG. 6A, the luminance level of each of the LEDs 201a to 201e is ideally 100%, and the broken line 603 showing the whole luminance distribution is also uniform in the direction of the point A to the point B.

However, in the case of the actual LED, even if the stratification of the LED is made according to the rank scale of the luminance by the maker, in general, the unevenness of the LED is generally large to such an extent that the maximum value of the luminance is about double the minimum value in the same driving current. An unevenness example of the luminance in such a case is shown in FIG. 6B. Here, when 601a and 601d are at 100% of a luminance level, 601c is at 75% of the luminance level and 601b and 601e are at 50%. The whole luminance distribution by the five LEDs 201a to 201e in this case can be represented by a broken line 604.

In such a case, since the luminance distribution fluctuates nearly 50% up and down across the region of the points A to B, the fingerprint image imaged by using this light source also ends up fluctuating nearly 50% across the region of the points A to B in the output distribution. Such a non-uniformity of the derived image brings about an derivation error, a lowering of S/N, a deficiency of dynamic range, and the like when an image processing is executed so as to perform an derivation of ridges of the fingerprint, a background removal, and an derivation of characteristics for the image after deriving the fingerprint image, and ends up lowering a certification accuracy. In the midst of the image processing also, the removal of the light source unevenness by correction is performed, but the correction by such an image processing cannot effectively remove the unevenness unless it is a simple change in the light source unevenness, and results in the generation of a false contour and the like.

Here, a light-intensity difference=contrast by the fingerprint pattern in case of deriving the fingerprint by an ordinary optical image pick-up device will be described. FIG. 6C is a view showing an output level of the fingerprint image in a state where there is no luminance unevenness in the light source itself. As shown in the output level 610 of FIG. 6C, it is known that a contrast of about 10% to 30% can be obtained according to the fingerprint patterns (except for a dried finger and the like). The output level 610 of FIG. 6C is presumed to be about 10% when the contrast is the lowest. The contrast required for an image computing to derive the ridge pattern of the fingerprint is 25% or more of a full scale, and when it is 25% or less, sufficient certification accuracy cannot be derived.

Consequently, as described above, in case the contrast of the fingerprint pattern portion of the fingerprint image derived by the image pick-up device is 10%, as shown in the output level 601 of FIG. 6D, 2.5 times gain is applied so as to turn the contrast of 10% into that of 25%. Now, though FIG. 6D shows an output level 611 of the fingerprint image in a state where there is no luminance unevenness in the light source itself, when considered that 25% of the output level 611 is a signal component showing the fingerprint pattern, it is necessary to control the luminance unevenness of the light source at least within the remaining 75%. Here, since the gain is 2.5 times, it is evident that the luminance unevenness of the light source must be controlled at least within 30%.

Hence, the present embodiment is configured such that the LEDs 202a to 202e shown in FIG. 2B are divided into a total of three systems such as one system comprising the LEDs 202a and 202b, one system comprising the LED 202c, and one system comprising the LEDs 202d and 202e, and the luminance level of the LED of the three systems is individually controlled, so that the luminance distribution of the center region becomes flat. By this configuration, the luminance difference can be controlled at least within 30%. For example, a luminance distribution example in case of controlling the luminance level for the luminance unevenness shown in FIG. 6B is shown in FIG. 6E. As shown in FIG. 6E, the image pick-up unit 101 lowers the luminance by controlling the LED driving unit 108 so that the luminance of the LED 202c is changed to 50% from 75% while the system of the LEDs 202a and 202b does not change the luminance as it is. Further, the image pick-up unit 101 reduces by half the luminance of the system of the LEDs 202d and 202e. By the above described control, the whole luminance distribution in the points A to B of the LEDs 202a to 202e becomes as shown by a broken line 605.

In this way, though the luminance of the LED 202a is 100% while the luminance of the LED 202e is 25% with the luminance difference thereof increased, since the luminance of the LEDs 202b, 202c and 202d becomes approximately equal, an uniformity of luminance can be enhanced for the center region of about 75% of the points A to B. In this way, the image pick-up unit 101 of the present embodiment can control the light volume unevenness of the region of 60 to 80% of the center required for the image for the fingerprint certification, thereby improving the quality of the derived image. With the improvement of the quality of the fingerprint image derived by the image pick-up unit 101, the certification unit 102 can also improve the accuracy of the image processing for the fingerprint portion of the center region so as to smoothly derive the ridges and characteristics of the fingerprint, thereby improving the certification accuracy. Although the luminance difference is increased in the region of end sides in the vicinity of the points A and B, the processing required here is, for example, a processing for estimating a boundary region between the finger and the background and for deriving the contour of the finger and the like such as a background removal, the detection of a position of finger and the like, and such a processing can be sufficiently executed by adjustment of a threshold value even if the luminance difference is large compared to the derivation of the fingerprint pattern itself.

As shown above, the image pick-up unit 101 in the fingerprint certification apparatus of the present embodiment, when deriving the fingerprint image, separates a region where a high quality image is required, and can adjust the luminance of the LED to become a light source according to that region. That is, the image pick-up unit 101 controls the LEDs 202a to 202e by dividing them into three systems so as to prevent the luminance unevenness of the center region. In this way, the image pick-up unit 101 can realize an effective improvement of the luminance unevenness of the LED suitable to acquire the fingerprint image of a good image quality by the minimum possible number of adjustment systems of the LED.

Next, an exposure control (luminance control) of the sub scan direction will be described. FIG. 6F is a view showing the luminance distribution example in the direction to the point D from the point C (sub scan direction of the sensor) in FIG. 2B. A solid line 606 of FIG. 6F shows a change of the luminance level in the direction to the point D from the point C of the LED 202c prior to the adjustment of the luminance unevenness shown in FIG. 6B. Further, a solid line 607 of FIG. 6F shows a change of the luminance level in the direction of the point D from the point C of the LED 202c subsequent to the adjustment of the luminance unevenness shown in FIG. 6E. As shown in these sold lines 606 and 607, the luminance lowers toward the direction of the point D from the point C, and at the point D, the luminance is lower 25% than at the point C, thereby generating the shading. This shading is generated due to the fact that, since the point D rather than the point C is positionally isolated from the LED 202c, the light volume distribution is lowered.

When the finger 201 is allowed to approach the fingerprint sensor, it is generally known by a simulation that the lowering of the luminance in the direction (sub scan direction) of the point D from the point C is about 10 to 30%. The lowering of the luminance (=shading) in this direction, particularly in the case of the sweep type sensor, causes a problem that, when a correlation between the images is calculated, the correlation is lowered, and the images are unable to join together. Further, even when joined, a luminance fluctuation remains in the synthesized image in the shape of a narrow paper tablet, and so the fluctuation is processed as a pseudo contour to become false fingerprint information, and this leads to the lowering of the certification accuracy.

In the present embodiment, the correction of the shading of the sub scan direction of the image pick-up device 204 is realized by performing the control of the exposure by using a lag time of the exposure timing in each column of the sub scan direction of the image pick-up device 204. To be more specific, there are two methods available, one method of which is for changing the accumulation time of the electrical charge in each pixel according to the shading amount by a column unit, and the other method is for adjusting the lighting time of the LEDs 202a to 202e according to a time lag of the exposure timing in the column of each pixel, and these two methods may be combined. By the above described control of the exposure, the exposure of each column is increased in the sub scan direction so that the luminance level is increased according to the ratio as shown by a broken line 608 in FIG. 6F. In this way, by the combination of the lowered change (straight line 607) of the luminance by the shading and the change of the luminance level (broken line 608) by the control of the exposure in the column direction, the total exposure is approximately uniformized in the sub scan direction as shown by a broken line 609.

Particularly, by performing the shading correction of the sub scan direction upon performing the adjustment of the luminance unevenness of each of the LEDs 202a to 202e across the main scan direction of the image pick-up device 204, the uniformity of the exposure condition of the center region necessary for the fingerprint certification can be realized, and in this way, the uniformity of the luminance level of the partial images (the images derived by the scan at one time by the image pick-up device 204) can be realized. In this way, the luminance difference-even in the joining boundary between the partial images is not generated, and a failure of synthesis and a generation of noise by the synthesis and the like in case of synthesizing the partial images can be prevented, and the lowering of the accuracy of the fingerprint certification can be prevented. As described above, the image pick-up unit 101 in the present embodiment performs the correction of the exposure matched to the characteristics of the main scan direction and the sub scan direction, so that the control of the exposure difference of the light source in the imaging plane within 30% is realized.

Particularly in the case of the sweep type fingerprint sensor, there are often the cases where the finger 201 is moved for the image pick-up device 204 toward the top end from the root of the finger 201. Hence, with respect to each pixel of the sub scan direction of the image pick-up device 204 which is the same direction to the moving direction of the finger 201, it is most required to correct the shading so as to have the same exposure. Further, in the case of the positional relation between the image pick-up device and the light source as shown in FIGS. 2A, 2B, 2C and 2D, since the shading generated from the LEDs 202a to 202e, which are the light sources, to the sub scan direction is mainly caused by the positional relation (distance relation) in the sub scan direction between the light source (LEDs 202a to 202e) and the pixel unit 41 of the image pick-up device 204, the change of the shading volume becomes simple such as a simple decrease and a simple increase (in case the light source is arranged at one side of the sensor long side) and the like. Hence, a rate of change of the shading volume is predictable by using a function and the like. Even when the light source is placed at both sides of the long side of the image pick-up device 204, a rate of change of the shading volume becomes a quadratic functional change, and similarly to the above described, the rate of change is predictable.

In the meantime, it is important that the direction (direction of the points A to B) orthogonal to the moving direction of the finger 201 is light-impinged as uniformly as possible since the thickness of the cross section of the finger 201 is different by nature, and the conditions such as transmittivity and scattering coefficient of light within the finger 201, a sneak light from the side surface of the finger 201, and the like are different. Particularly, the uniformity of the light volume of the center region where the characteristic points of the fingerprint are expected may be attached with importance, but the uniformity of the light volume at the end regions (in the vicinity of the points A and B) is not attached with so much importance. Further, the light volume unevenness in this case changes sharply and individually by the unevenness of the light source (the LEDs 202a to 202e), a size of the finger 201, a position in which the finger is placed, a pushing pressure of the finger 201, the external light environment of the surrounding area and the like. Particularly, the unevenness of the light source such as the individual unevenness of each of the LEDs 202a to 202e exerts a great influence. Consequently, the luminance change in the direction (main scan direction) orthogonal to the moving direction of the finger 201 is complicated, and its rate of change of the luminance is difficult to predict.

Consequently, in the sweep type fingerprint sensor shown in FIGS. 2A and 2B, the execution of the control of the exposure amount in each column of the sub scan direction by matching the sub scan direction of the image pick-up device 204 to the same direction of the moving direction of the finger 201 is better adapted to the correction of the shading in view of the characteristic of the control, which is easy to change the exposure amount in a linear function wise. Further, since there is no need to change the correction condition in view of the sensor being not reliant on the individual unevenness and the environment, the control of the exposure amount is easily performed. That is, the sub scan direction of the image pick-up device 204 and the direction in which the shading is generated due to the difference of the distance from the light source are matched, so that the shading amount is predicted so as to control the exposure in each column of the sub scan direction, thereby realizing an appropriate shading.

Since the image pick-up device unit 104 (of the image pick-up device 204) of the present embodiment is used for the sweep type fingerprint sensor, it is band-shaped with the number of pixels of the sub scan direction being about five to twenty. However, for example, even in the case of the fingerprint sensor using the area sensor with the number of pixels of the sub scan direction being the same number or more of pixels of the main scan direction, because of the influence of the shading due to a difference of distance from the light source, the dynamic range and contrast at the time of deriving the fingerprint are lowered, thereby bringing about the lowering of the certification accuracy. Even in this case, similarly to the present embodiment, the direction in which the shading (lowering of the luminance) is generated and the sub scan direction of the image pick-up device (CMOS sensor) are matched, so that the exposure timing in each column is controlled to be corrected by the shading, thereby taking necessary measures. The fingerprint certification apparatus using the area sensor will be described later as a second embodiment. In the present embodiment, though the control of both the main scan direction and the sub scan direction are performed, the control of either one only may be performed. Although main scan direction control means for controlling the main scan direction and sub scan direction control means for controlling the sub scan direction are shown integrally as the control unit 123a of FIG. 1, these means may be separately provided or the control unit may have the function of either means only.

Next, as a configuration for controlling the light volume of the LEDs 202a to 202e which are divided into three systems, a definite circuit example of the light source 103 (=LEDs 202a to 202e of FIG. 2B) shown in FIG. 1 and the LED driving unit 108 will be described.

Figure 8:
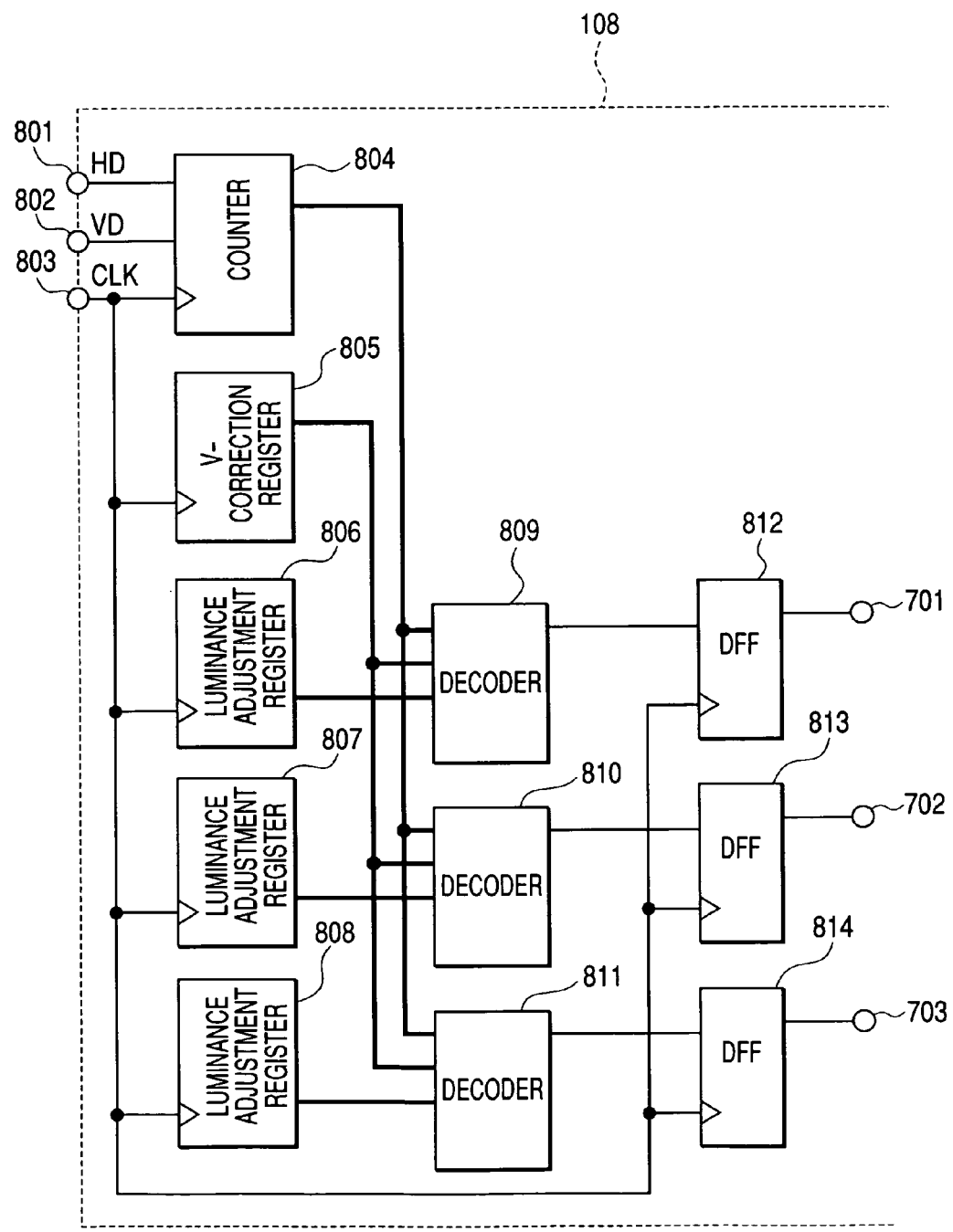

FIGS. 7 and 8 are drawings to show definite circuit examples of the light source 103 and the LED driving unit 108. As shown in FIG. 7, the light source 103 is configured by a total three systems comprising one system for the LEDs 202a and 202 (hereinafter referred to as a first system), one system for the LED 202c (hereinafter referred to as a second system), and one system for the LEDs 202d and 202e (hereinafter referred to as a third system). The LED driving unit 108 light-controls the LEDs 202a to 202e of these three systems by turning on/off a transistor 706. Reference numerals 701 to 703 of FIG. 7 denote input terminals, to which a LED control pulse being a signal for light-controlling the LEDs having three systems is inputted. As shown in FIG. 7, the input terminal 701 is inputted with the LED control pulse for controlling the first system, and the input terminals 702 and 703 are similarly inputted with the LED control pulses for controlling the second and third systems. Reference numerals 704 and 705 denote resistance elements, and reference numeral 706 a transistor, reference numeral 707 a power supply, and reference numeral 708 a GND (ground).

As shown in FIG. 7, in the LED driving unit 108, the collector terminal of the transistor 706 where the input terminal 701 is connected to the base terminal through the resistance element 704 is connected to the LEDs 202b and 202a of the first system through the resistance element 705 and a signal line 112b. The collector terminal of the transistor 706 where the input terminal 702 is connected to the base terminal through the resistance element 704 is connected to the LED 202c of the second system through the resistance element 705 and the signal line 112b. The collector terminal of the transistor where the input terminal 703 is connected to the base terminal through the resistance element 704 is connected to the LEDs 202d and 202e of the third system through the resistance element 705 and the signal line 112b. Further, the emitter terminal of each transistor 706 is connected a GND A708.

In the light source 103, between the power supply 707 and the signal line 112b (line for transmitting the signal from the input terminal 701), the LEDs 202a and 202b as the first system are connected in series so as to emit a light when the current flows to the signal line 112b. Similarly, the LED 202c as the second system is connected between the power supply 707 and the signal line 112b (line for transmitting the signal from the input terminal 702), and the LEDs 202d and 202e as the third system are connected in series between the power supply 707 and the signal line 112b (line for transmitting the signal from the input terminal 703).

By the configuration as shown above, the LED driving unit 108 pulse-width-controls the on/off time of each transistor 706 according to the LED control pulse inputted to the input terminals 701 to 703, so that the driving pulse is outputted to the three signal lines 112b connected to the LEDs of the three systems, respectively. In this way, according to the driving pulse inputted to the LEDs of the three systems from the three signal lines 112b, a ratio of flashing on and off of each LED is adjusted, and the luminance of the three systems are controlled.

Next, a circuit example of a control pulse preparation circuit for preparing the LED control pulse to be inputted to the input terminals 701 to 703 shown in FIG. 7 will be described. The control pulse preparation circuit is a circuit provided for the LED driving unit 108.

FIG. 8 is a view showing the circuit example of the control pulse preparation circuit for preparing the LED control pulse to be inputted to the input terminals 701 to 703 shown in FIG. 7. In FIG. 8, reference numeral 801 denotes an input terminal of a horizontal synchronization signal as a trigger of the sub scans direction. Reference numeral 802 an input terminal of a vertical synchronization signal as a trigger of the sub scan direction. Reference numeral 803 a clock terminal. Reference numeral 804 a counter for counting a clock with the horizontal synchronization signal and the vertical synchronization signal taken as a trigger. Reference numeral 805 a resistor to store a correction value for the shading correction of the above described sub scan direction. According to this correction value, the more the pixel of the column is isolated in a distance from the LEDs 202a to 202e, the more flashing on and off time of the LEDs 202a to 202e is controlled so as to increase the exposure.

Reference numerals 806 to 808 denote resistors to store the adjustment value of the luminance ratio in the LEDs of the three systems. When the light volume of the LEDs 202a to 202e is adjusted according to this adjustment value, it reaches the luminance level shown in FIG. 6E. That is, it is the adjustment value for controlling the light volume of the LEDs of the center region vicinity so that the center region reaches an averaged luminance level. The resistors 806 to 808 correspond to the above described first to third systems.

Reference numerals 809 to 811 denote decoders which read a correction value for the shading correction of the sub scan direction from the resistor 805, and reads the adjustment value of the luminance ratio of the LEDs separately for the three systems from the resistors 806 to 808, and prepares the control pulse by decoding the output of the counter 804. Reference numerals 812 to 814 denote flip flops for synchronizing the control pulses inputted from the decoders 809 to 811 with the clock signal and outputting the same.

From the above described configuration, the LED driving unit 108 can make a control such that the light source impinges the light in the imaging plane of the image pick-up device 104 by the uniform luminance level which eliminates the luminance difference of the center region in the main scan direction, and moreover, can adjust the lighting time of the LEDs 202a to 202e of the light source 103 so that the shading generated in the sub scan direction is corrected. That is, the LED driving unit 108 performs the adjustment of the luminance for every LED of the three systems and, at the same time, generates a control pulse for realizing the shading correction of the common sub scan direction, and can output it to the light source 103.

Next, by using a timing chart, the control of the exposure in the image pick-up device unit 104 and the LED driving unit 108 will be described.

FIG. 9 is a timing chart showing the operations of the image pick-up device unit 104 and the LED driving unit 108 in the present embodiment.

In FIG. 9, reference numeral 901 denotes a control pulse P_701 to be inputted to the input terminal 701 of FIG. 7 which controls the first system of the LEDs 202a and 202b. Reference numeral 902 a control pulse P_702 to be inputted to the input terminal 702 of FIG. 7 which controls the second system of the LED 202c. Reference numeral 903 a control pulse P_703 to be inputted to the input terminal 703 of FIG. 7 which controls the third system of the LEDs 203d and 202e. The period during which the control pulses P_701•901 to P_703•903 are "H (high)" is the lighting period of the LEDs. In this way, by changing the pulse width "H" which is the lighting period of the respective control pulses P_701•901 to P_703•903 (hereinafter referred to as control pulses 901 to 903), the luminance of the respective LEDs can be adjusted.

Further, reference numeral 904 shows a timing in which the pixel (L1) of the first column of the sub scan direction is reset. To be more specific, it denotes a rest pulse ΦR, which resets the parasitic capacity 78 shown in FIG. 5. Reference numeral 905 denotes a timing where the electrical charge accumulated in the pixel of the first column of the sub scan direction is transferred to the parasitic capacity (the parasitic capacity 78 of FIG. 5). To be more specific, it denotes the transfer pulse ΦT, which transfers the electrical charge from the photo diode 73 shown in FIG. 5 to the parasitic capacity 78.

Consequently, a period 916 from a time t1 to a time t3 shows the electrical charge accumulation period of the photo diode 73 in L1. Here, as shown in the control pulses 901 to 903, during the period 912 till the time t2, the lighting of the LED is not performed. Hence, a substantial electrical charge accumulation period of the pixel (L1) of the first column of the sub scan direction is a period 917 from the time t2 to the time t3.

Similarly, reference numeral 906 shows a timing, where a pixel (L2) of a second column is reset in the sub scan direction, and reference numeral 907 shows a timing, where the electrical charge accumulated in the pixel (L2) of the sub scan direction is transferred to the parasitic capacity 78. Consequently, a period 918 shows an electrical accumulation period of a photo diode 73, and a period 919 shows a substantial electrical accumulation period in a second column of the sub scan direction. Further, reference numeral 903 shows a timing, where a pixel (L3) of a third column of the sub scan direction is reset, and reference numeral 909 a timing, where the electrical charge accumulated in the pixel (L3) of the third column of the sub scan direction is transferred to the parasitic capacity 78. Consequently, the period 920 is a substantial electrical charge accumulation period in the pixel of the third column of the sub scan direction.

Reference numeral 910 shows a timing, where a pixel (L4) of a fourth column of the sub scan direction is reset. Reference numeral 911 shows a timing, where the electrical charge accumulated in the pixel (L4) of the fourth column of the sub scan direction is transferred to the parasitic capacity 78. Consequently, reference numeral 921 is a substantial electrical charge accumulation period in the pixel of the fourth column of the sub scan direction.

In this way, with respect to the electrical charge accumulation period in the pixel within the imaging plane of the image pick-up device unit 104, there exist a period in which the electrical charge is accumulated commonly by a plurality of columns (L1 to L4 of FIG. 9) and a period in which the electrical charge accumulation process is different for every column as shown in the periods 912 and 914. As shown in FIG. 9, between each column neighbored in the sub scan direction, the electrical charge accumulation period is different by the period 915. In the present embodiment, by using this shift by each column of the accumulation period, the length of the electrical charge accumulation period can be made different as shown in the periods 917, 919, 920, and 921. That is, the control of the exposure of a column unit can be made according to the shading of the sub scan direction.

As shown in FIG. 9, during the period 912 till each column is reset without lighting the LED, the LED is lighted after the completion of the reset of each column, so that the column slower in the timing of reset can greatly increase the electrical charge accumulation time (=exposure). In contrast, in case the LED is lighted during the periods 912 and 913, the column slower in the timing of rest can greatly decrease the electrical charge accumulation time (=exposure). Further, in case the LED is lighted during the periods 912 to 914, the exposure of a column unit can be also changed by changing the LED luminance during the periods 912 or 914.

Further, by changing a ratio of the period 913 (electrical charge accumulation period common to each column) and the period 914 (electrical charge accumulation period different by each column), an increasing (decreasing) rate of the exposure can be changed. Alternately, by changing the pulse width also during the periods 913 and 914, the increasing (decreasing) rate of the exposure can be changed.

As shown above, by using a time lag of the electrical charge accumulation period of the column unit intrinsic to the CMOS sensor, the shading in the LEDs of the three systems which are adjusted in the luminance can be corrected, and the uniformity of the exposure particularly in the center region within the imaging plane in the image pick-up device unit 104 can be further enhanced. If it is an image sensor different in the electrical charge accumulation period by each column unit, even the image sensor other than the CMOS sensor can adopt the present invention.

As described above, it is extremely difficult for the biological certification apparatus such as the fingerprint sensor or a physical body recognition apparatus such as a bar code reader to uniform the exposure within the plane. Particularly, in the case of the optical sensor which approaches the object and impinges it with the light of the light source such as the fingerprint sensor of the type which adheres the object to a sensor, the image read unit of the bar code reader, and the like, a difference of the exposure within the imaging plane due to the luminance distribution difference by the positional relation between the unevenness of the light source itself and the image pick-up device unit ends up appearing largely.

The fingerprint certification apparatus in the present embodiment is characterized in that such a difference of the exposure is second dimensionally corrected aiming at the center region necessary for the biological certification and the physical body recognition. To be more specific, a plurality of light impinging elements (light sources) are arranged in parallel to the main scan direction of the image pick-up device (CMOS sensor), and at the same time, the luminance of the light impinging element is controlled so that the uniformity of the exposure from the light impinging element is increased in the center region of the main scan direction, and the electrical charge accumulation timing of the image pick-up device and the luminance and a lighting timing of the light impinging element are controlled so that the uniformity of the exposure in the sub scan direction is increased.

Further, in addition to the adjustment of the unevenness (luminance unevenness) of the light impinging element in the sub scan direction, the electrical charge accumulation timing of the image pick-up device accompanied with the sub scan of the imaging element and a ratio of the exposure decided by the luminance of the light impinging element are uniformly maintained and changed in the sub scan direction, so that the correction of the two different points of the luminance unevenness of the light impinging element and the exposure difference (shading) due to the positional relation between the light impinging element and the image pick-up device can be further effectively eliminated. Particularly, as the processing for the correction of the shading, since it is only to change the driving pulse of the light source and the image pick-up device, the circuit scale and the size of the outward form thereof do not become large due to the addition of the correction function, and the increase of the cost of production by addition of the correction function can be also controlled. Further, the cost of providing a separate light source for preventing the generation of the shading can be saved. Further, the control of the sub scan direction alone may be performed.

Since the fingerprint certification apparatus of the present embodiment is, as described above, a technique of correcting the luminance unevenness of the light source and the shading by the control of the lighting timing of the light source, the control of the luminance, and the control of the electrical charge accumulation time of the image pick-up device, there is the advantage of causing no side effect by the lowering of the S/N and the correction, compared to the case where the luminance unevenness of the light source and shading is corrected by the signal processing. For example, in case of using the fingerprint certification apparatus outside the room and the like, the external light rather than the brightness of the LED is brighter, and though this becomes a main factor for the adjustment of the exposure, in this case, no luminance unevenness occurs as a matter of fact. However, in the conventional fingerprint certification apparatus where a certain correction processing is performed for the luminance unevenness by the image processing, there is a problem that an unnecessary correction is performed unless it is determined whether it is indoors or outdoors. Alternatively, in the conventional fingerprint certification apparatus where the external light enters partially in the room, there have been negative effects that an over correction took place in the region of the external light outside the room. In the fingerprint certification apparatus of the present embodiment, since the exposure itself is changed by the luminance of the light source, the control of light emitting timing, and the control of the electrical charge accumulation time of the image pick-up device, even when the apparatus is exposed to the external light outside the room, the exposure can be maintained constant, and no over correction occurs. Further, since it is not the correction by computing processing, there is no problem of the lowering of bit accuracy and the like due to the computing processing.

As described above, in the present embodiment, while, as a certification method of the fingerprint, the synthesis of the whole fingerprint image from partial images and the derivation of characteristic points from the synthesized image have been illustrated, the present invention has described the means and the method for improving the quality of the derived image when performing the fingerprint certification, and whatever of the method for deriving characteristic information using the partial images, the types of the characteristic information, the algorithm of the certification and the like will do.

Further, while the fingerprint certification apparatus in the present embodiment has been described as above, the present invention is also applicable to the control of the exposure in the image pick-up device for physical body recognition and the like such as a bar code reader, a industrial robot and the like. Further, the invention is also applicable to a physical body recognition apparatus and the like, which recognizes a physical body from the characteristic of the image by impinging the light on it. Further, while the present embodiment has been described with the fingerprint certification apparatus from among the biological certification apparatuses as an example, for example, the invention is also applicable to the biological certification apparatus in which a hand, a finger, a face, an eye and the like are impinged with the light so as to derive and match the characteristic information of the object. Here, what is meant by the characteristic information of the object is, for example, information such as a palm pattern, a blood flow such a vein and the like, an iris, a facial-recognition and the like. Further, in the above described embodiment, while the LED has been cited as light impinging means, if it is a light source such as a fluorescent tube, an EL, a laser, whatever will do.

Further, though a configuration having both of the control means of the sub scan direction and the main scan direction is preferable, the configuration may have only either one from both of them. In the present embodiment, as the sensor for picking up the partial image, the two-dimensional sensor of a strip shape having 5 to 20 pixels arranged in the sub scan direction is disclosed as an example. One-dimensional sensor may also be used. The control means for the main scan direction is provided to control the exposure quantity within the partial image derived, thereby improving the whole image quality of the object similar to the two-dimensional sensor.

Second Embodiment

An area type fingerprint certification apparatus will be described as a second embodiment of the present invention by using FIGS. 10A, 10B, 11A, 11B, 11C, 12 and 13. Here, what is meant by an area type fingerprint certification apparatus is, similarly to the above described first embodiment, an apparatus for reading a fingerprint and performing a certification by only placing a finger on a predetermined position without requiring the finger to sweep. Since the schematic configuration of the fingerprint certification apparatus in the second embodiment is the same as the configuration of the first embodiment shown in FIG. 1, the description thereof will be omitted. Similarly, the internal configuration of an image pick-up device unit 104 is the same as the configuration shown in FIGS. 4 and 5 in the first embodiment, and what is different from the first embodiment is the number of pixels of the sub scan direction.

Figure 10A:
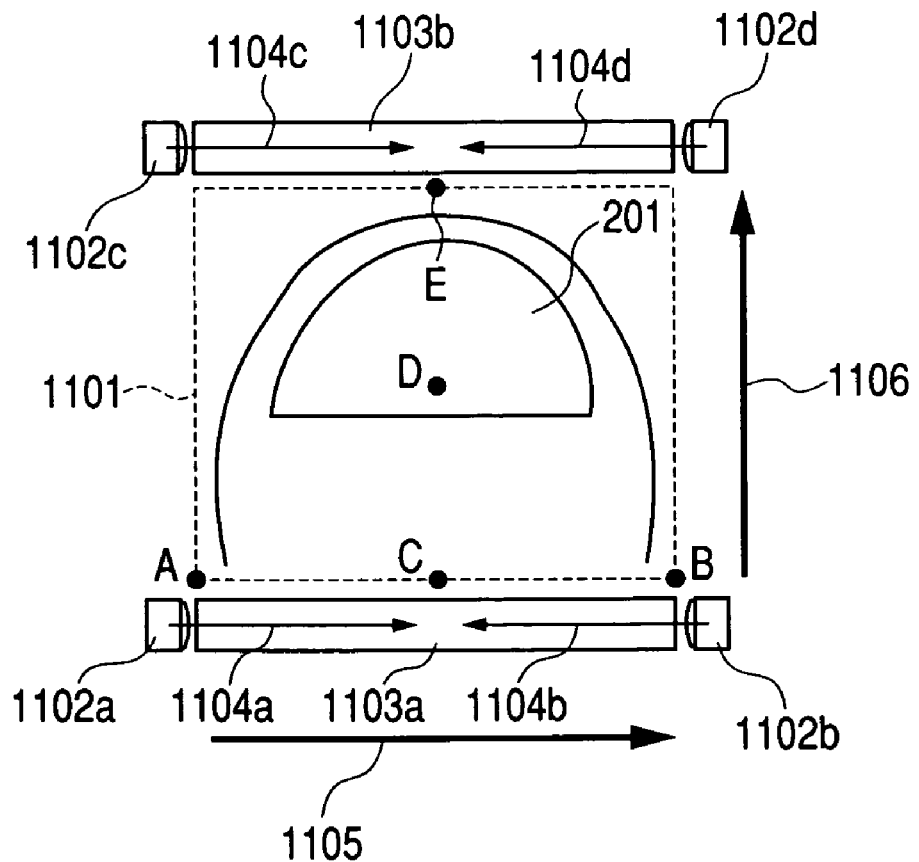
FIGS. 10A and 10B are views showing a positional relation between a light source and the image pick-up device in an area type fingerprint certification apparatus.
Figure 10B:
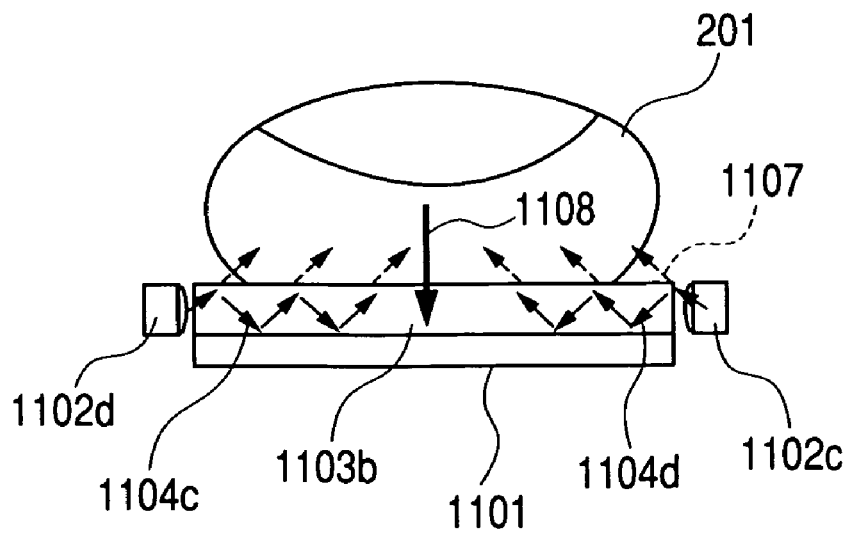

FIGS. 10A and 10B are view showing a positional relation between a light source and an image pick-up device in the area type fingerprint certification apparatus. FIG. 10A is a schematic diagram of the fingerprint certification apparatus seen from the upper surface direction of the finger, and FIG. 10B is a schematic diagram of the fingerprint certification apparatus seen from the upper side direction in FIG. 10A.

In FIG. 10A, reference numeral 201 denotes a finger, and reference numerals 1102a to 1102d denote a LED as a light source. Here, arrow marks 1104a to 1104d show an outgoing direction of the light from the LEDs 1102a to 1102d. Reference numerals 1103a and 1103b denote an optical member such as a light guider and the like, which guides a light from the LEDs 1102a to 1102d to be diffused or reflected in the undersurface and emitted to the upper surface. Reference numeral 1101 denotes a second dimensional sensor for deriving a fingerprint of the finger 201 at a plane, and here it is a CMOS type image pick-up device. Further, an arrow mark 1105 denotes a main scan direction of the sensor, and an arrow mark 1106 denotes a sub scan direction of the sensor. The definition of the main scan direction and the sub scan direction of the sensor is as described in the first embodiment by using FIGS. 4 and 5. Each point of the points A, B, C, D, and E is for showing the position of the image pick-up device 1101 on an imaging plane. Here, the LEDs 1102a to 1102d and the optical members 1103a and 1103b correspond to the light source 103 of FIG. 1, and the image pick-up device 1101 is included in the image pick-up device unit 104 of FIG. 1.

As shown above, in the present embodiment, the optical members 1103a and 1103b, which are the light guiders, are arranged as the light source 103 in parallel to the main scan direction. In FIG. 10B, an arrow mark 1107 of a broken line shows the outgoing direction of the light toward the finger 201 from the optical member 1103b. Further, the arrow mark 1108 shows an incident direction of the light diffused in the finger 201 toward the image pick-up device 1101.

As shown in FIGS. 10A and 10B, in the imaging plane of the image pick-up device 1101, there is a portion in which the finger 201 does not contact or is difficult to contact in the region of the periphery of the finger 201 due to a curvature of the finger 201. Further, because of the height of the optical member 1102, similarly to the first embodiment, a certain region from both ends does not sufficiently contact the finger 201, compared to the center region of the finger 201. Further, similarly to the first embodiment, the region where a uniform exposure state can be expected in an image quality wise is a region of about 67 to 80% of the center. The region of the periphery, rather than used for an object of deriving the primary fingerprint image, is used for deriving the information for interpolating the derived image of the region of 67 to 80% of the center by playing a role of assisting the derivation of the fingerprint of the center region from the change of the ridge pattern in the fingerprint of the lateral side of the finger 201 or a role of detecting the external light environment (now, whether being indoors or outdoors, the night or the daytime) by the light incident from the outside of the finger and computing an adequate exposure condition and a signal processing level, and the like.

Figure 11A:
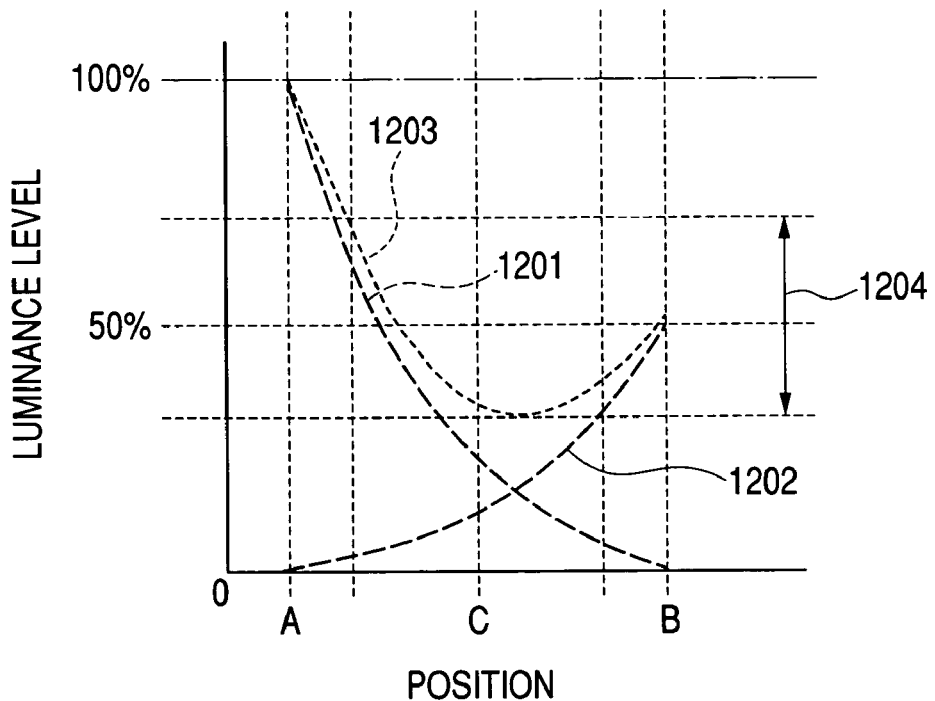
FIGS. 11A and 11B are views showing the luminance distribution in the direction (main scan direction of the sensor) from a point A to a point B.
Figure 11B:
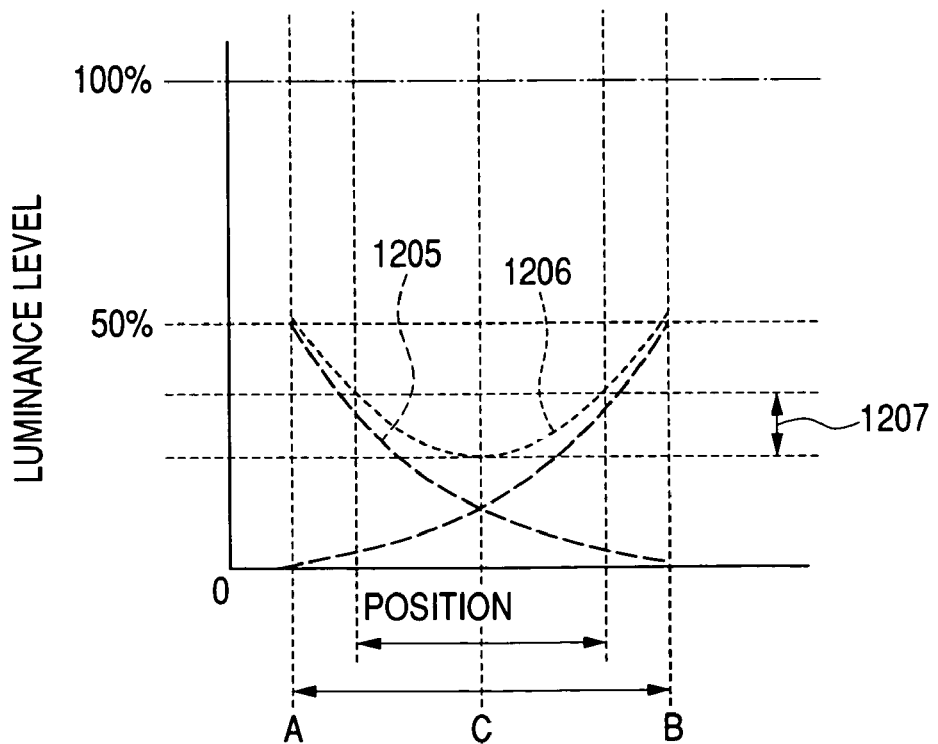
Figure 11C:
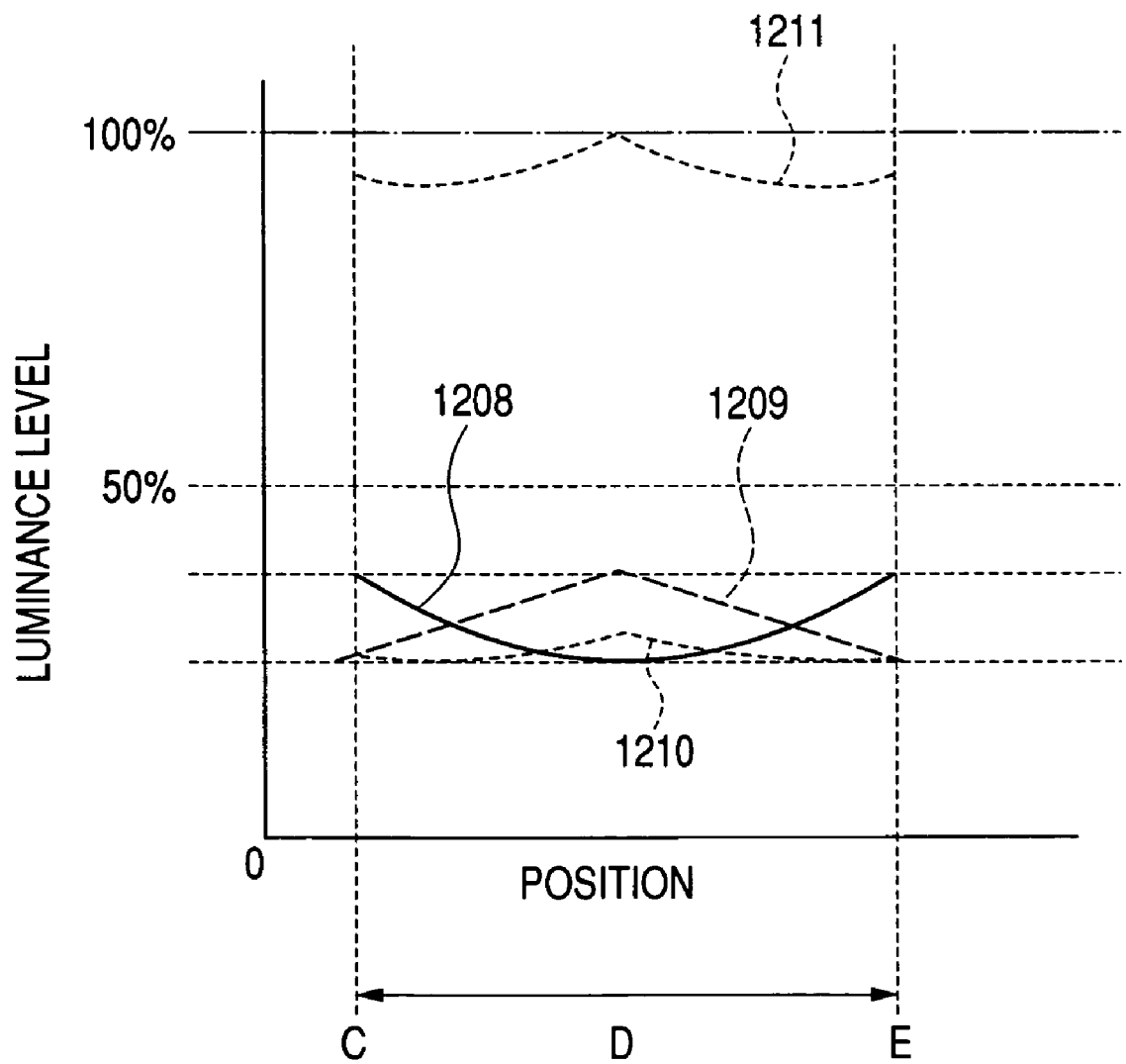
FIG. 11C is a view showing the luminance distribution in the direction (sub scan direction of an image pick-up device 1101) from a point C to a point E in FIG. 10A.

Next, a luminance distribution among each point A to E shown in FIG. 10A in the imaging plane will be described and, at the same time, a luminance unevenness and the correction of a shading will be described. FIGS. 11A, 11B and 11C are views showing the luminance distribution by the light source for the points A to E shown in FIG. 10A. Among these drawings, FIGS. 11A and 11B are views showing the luminance distribution of a direction (main scan direction of the sensor) toward the points B from the point A. To be more specific, the luminance distribution through the optical member 1103a, which is the light guider, from the LED 1102a is shown by a solid line 1201, and the luminance distribution through the optical member 1103a, which is the light guider, from the LED 1102b is shown by a broken line. 1202.

First, the luminance unevenness occurred in the main scan direction of the image pick-up device 1101 and its correction will be described. FIG. 11A illustrates the case where the LED 1102a is at 100% of the luminance level due to the luminance variation of the LED, while the LED 1102b is at 50% of the luminance level. In this case, by the variation of the two LEDs 1102a and 1102b and the attenuation of the light by the optical member 1103a which is the light guider, the whole luminance distribution is represented by a broken line 1203.

In such a case, since the luminance distribution shown by the broken line 1203 across the region of the points A to B moves up and down about 70%, and moreover, even in the luminance distribution of the center region, as shown by an arrow mark 1204, a luminance difference of about 50% between the maximum value and the minimum value occurs. The fingerprint image imaged by this light source also ends up changing about 50% in its output distribution across the center region. Such a non-uniformity of the exposure at the image pick-up time brings about a derivation error, a lowering of the S/N, a deficiency of dynamic range, and the like when the image processing is performed for the image after deriving the fingerprint image and performs the derivation of the ridges of the fingerprint, the removal of the background, and the derivation of the characteristic points, and eventually brings about the lowering of the certification accuracy.

Although the removal of the light source unevenness by the correction is performed in the midst of the image processing, such a correction by the image processing is unable to perform an effective removal unless it is a simple light source unevenness, and ends up causing a false contour and the like.

Hence, in the present embodiment, a LED driving unit 108 is configured in such a way as to take the LEDs 1102*a*, 1102*b*, 1102*c*, and 1102*d* as one system each, respectively, and divide them into a total of four systems, and control the systems individually, so that the luminance distribution of the center region becomes uniformed. For example, the LED driving unit 108, as shown in FIG. 11B, performs a control in such a way as to lower the luminance level of the LED 1102*a* from 100% to 50%. By this control, the luminance level of the LED 1102*a* is lowered to 50%, and becomes equal to the luminance level of the LED 1102*b*. The luminance level through the optical member 1103*a*, which is the light guider, from the LED 1102*a* is shown by a broken line 1205. Further, the luminance distribution of the whole optical member 1103*a* by the impinging from the two LEDs 1102*a* and 1102*b* is shown by a broken line 1206.

In this way, as shown in FIG. 11B, the luminance difference of the broken line 1206 across the whole distance of the points A to B can be shrunk compared to the luminance difference of the broken line 1203. Particularly, with respect to the center region, as shown in an arrow mark 1207, the luminance difference is improved up to about 25%, thereby enhancing the uniformity of the luminance. As described also in the first embodiment, since the exposure unevenness of the center region necessary for the image for the fingerprint certification can be controlled, the quality of the derived image is enhanced, and the accuracy of the image processing for the fingerprint portion of the center region is improved, thereby smoothly performing the derivation of the ridges and the characteristics of the fingerprint. As a result, the certification accuracy is enhanced. In this way, by dividing the region to acquire the-fingerprint image and adjusting the luminance, an effective improvement of the light volume unevenness suitable for deriving the fingerprint image is realized by the minimum possible number of adjustment system of the LEDs. In the optical member 1103*b* also which is light-impinged by the LEDs 1102*c* and 1102*d*, the similar correction of the light volume unevenness is performed.

Next, the shading occurred in the sub scan direction of the image pick-up device 1101 and its correction will be described. FIG. 11C is a view showing the luminance distribution of the direction (the sub scan direction of the image pick-up device 1101) toward the points E from C shown in FIG. 10A. As shown in a solid line 1208 of FIG. 11C, by the above described adjustment of the LED 1102*a*, though its luminance distribution is lowered, the shading occurs in which the luminance is further lowered from the point C toward the center D, and from the points D toward E, the luminance is increased.

This is because the point D rather than the points C and E is positionally isolated from the optical members 1103*a* and 1103*b* and the light volume is lowered. The lowering of the luminance in this direction can be predicated and measured by a simulation and an actual measurement. As previously described, the lowering of the luminance (shading) in this direction leads to a lowering of dynamic range and contract in the derivation of the fingerprint, and brings about a lowering of certification accuracy.

In the present embodiment, similarly to the first embodiment, a correction of shading is realized by performing a control of exposure by using a time lag of exposure timing of each column which is the sub scan direction of the image pick-up device 1101. By the ratio as shown in the broken line 1209 of FIG. 11C, the lighting period and the change of the luminance of the LEDs 1102*a* to 1102*d* are increased. In this way, when the luminance change by the shading shown in the solid line 1208 and the lighting period and the change of the luminance of the LEDs 1102*a* to 1102*d* shown by a broken line 1209 are synthesized, the total exposure is uniformed in the sub scan direction as shown in the broken line 1210. Further, by applying a gain to the output, an identical output can be obtained similarly to the case where the light of the luminance level shown in a broken line 1211 is Light-impinged.

In this way, upon performing the adjustment of the luminance unevenness by a plurality of LEDs in the sub scan direction of the image pickup device 1101, the correction of the shading of the sub scan direction is performed, so that the uniformization of the exposure of the center region necessary for the fingerprint certification can be realized. In this way, even in the joining synthesis processing between the partial images outputted by the scan at a time by the image pick-up device 1101, no luminance difference occurs in the joined portion, and it is possible to prevent the lowering of the accuracy of the fingerprint certification from occurring due to deterioration of the image quality by failure of the joining synthesis of the image and side effect of the joining synthesis.

Figure 12:
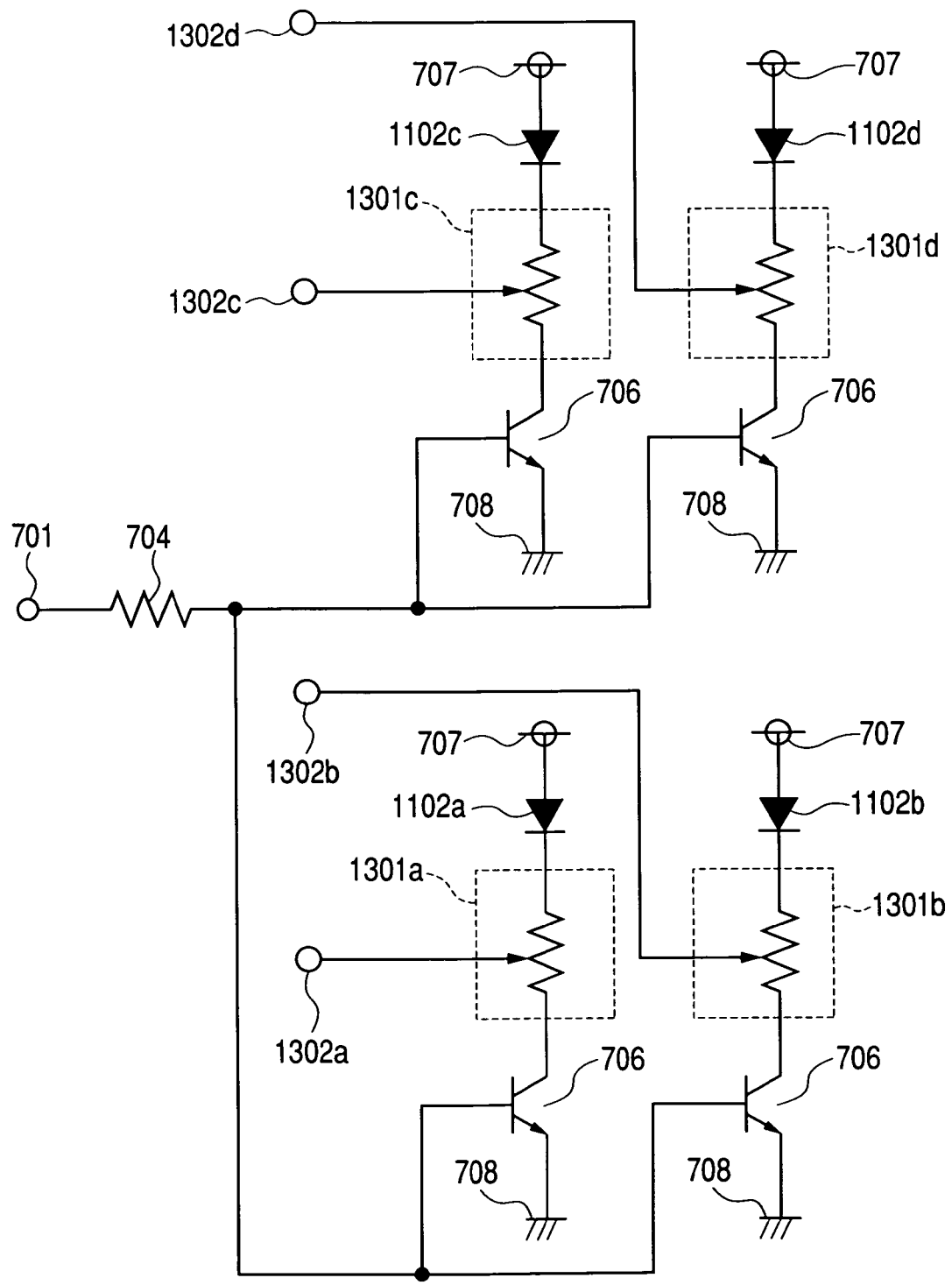
FIG. 12 is a view showing a circuit example for light-controlling the LEDs 1102a to 1102d shown in FIG. 10A by dividing them into a total of four systems with each LED taken as one system by turning on/off a transistor.
Figure 13:
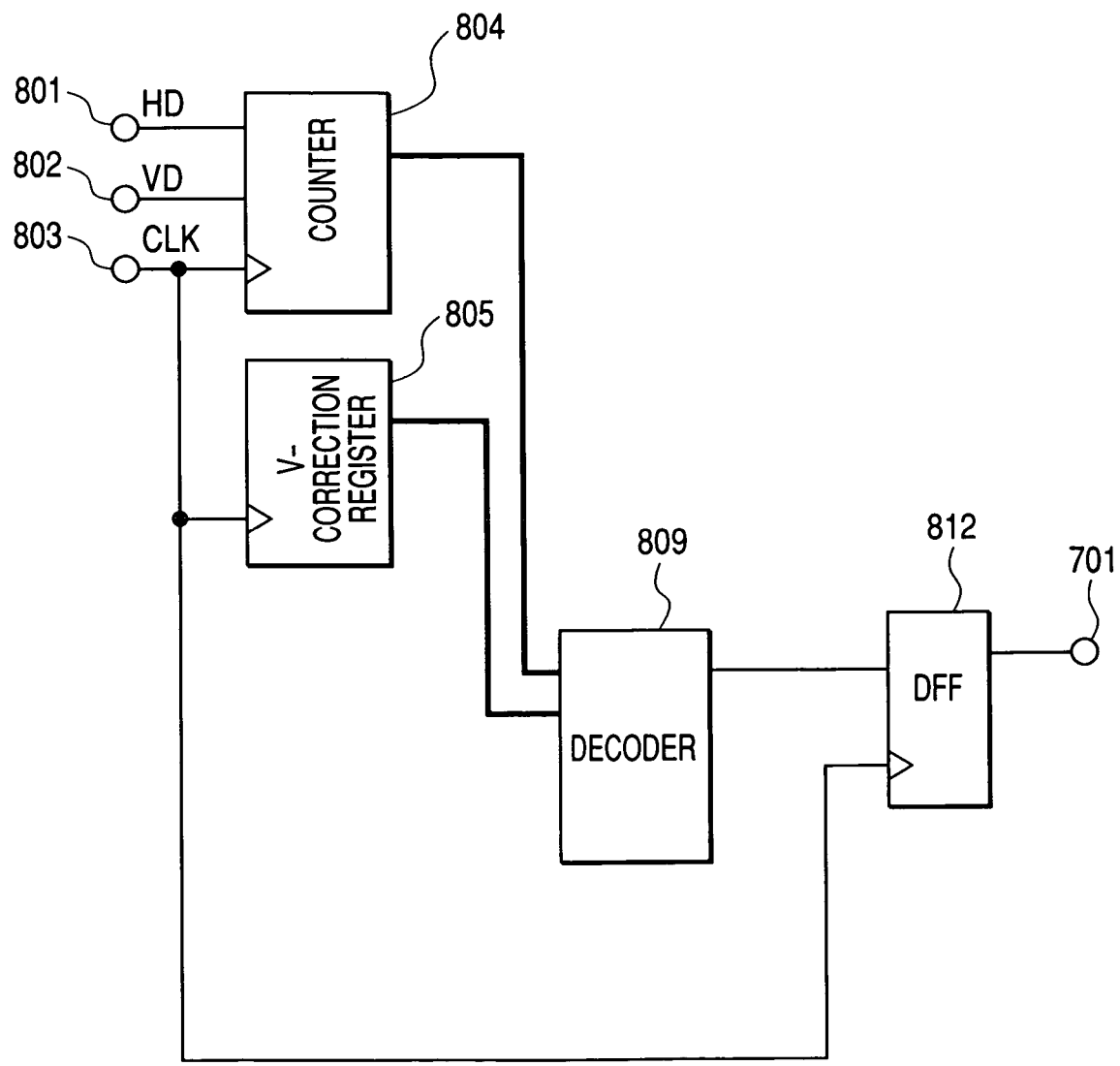
FIG. 13 is a view showing a control pulse preparation circuit for preparing a control pulse to be inputted to an input terminal 701 shown in FIG. 12.

FIGS. 12 and 13 show definite circuit examples of the light source 103 and the LED driving unit 108 shown in FIG. 1 in the present embodiment.

FIG. 12 is a view showing a circuit example for dividing the LEDs 1102*a*, 1102*b*, 1102*c*, and 1102*d* shown in FIG. 10A into a total of four systems with each LED taken as one system and light-controlling them by turning on/off a transistor. Here, the current value flowing to each LED system is decided by variable resistors 1301*a* to 1301*d*, and each resistance value of these variable resistors 1301*a* to 1301*d* is controlled by adjustment terminal 1302*a* to 1302*d*. These adjustment terminals 1302*a* to 1302*d* may be adjusted by manual operation at the shipping time or may be adjusted by a micro computer in the system through a DA converter and the like.

Reference numeral 701 denotes an input terminal of a LED control pulse. Reference numerals 704 and 705 resistance elements, reference numeral 706 a transistor, reference numeral 707 a power source, and reference numeral 708 a GND. The luminance unevenness of the LEDs 1102*a* to 1102*d* of the four systems is adjusted by the current. To be more specific, by pulse width-controlling on/off of the transistor 706, a flashing on/off ratio of the LEDs 1102*a* to 1102*d* is adjusted so as to correct the luminance unevenness. Further, the adjustment of the flashing on/off ratio of the LEDs 1102*a* to 1102*d* for the shading correction of the sub scan direction is performed by maintaining a ratio of flashing on/off period among the four systems after the adjustment of the luminance unevenness.

Next, a circuit example of a control pulse preparation circuit for preparing the LED control pulse to be inputted to the input terminal 701 shown in FIG. 12 will be described. The control pulse preparation circuit is a circuit provided for the LED driving unit 108.

FIG. 13 is a view showing the control pulse preparation circuit for preparing the control pulse to be inputted to the input terminals 701. In FIG. 13, reference numeral 801 denotes an input terminal of a horizontal synchronization signal (HD) as a trigger of the sub scan direction. Reference numeral 802 an input terminal of a vertical synchronization signal (VD) as a trigger of the sub scan direction. Reference numeral 803 a clock terminal to be inputted with a clock signal (CLK). Reference numeral 804 a counter for counting a clock with the horizontal synchronization signal and the vertical synchronization signal taken as a trigger. Reference numeral 805 a resistor to store a correction value for the shading correction of the above described sub scan direction. Reference numeral 809 a decoder for reading a correction value for the shading correction of the sub scan direction from the resistor 805 and preparing the control pulse by decoding the count value outputted by the counter 804. Reference numeral 812 a flip-flop for synchronizing the control pulse inputted from the decoder 809 with the clock signal and outputting the same.

By the above described configuration, the LED driving unit 108 can make a control to allow the LEDs 1102a to 1102d to impinge the light by the uniformed light volume eliminating the luminance unevenness of the center region in the main scan direction-in the imaging plane of the image pick-up device 104, and moreover, can adjust the lighting time of the LEDs 1102a to 1102d so as to correct the shading occurred in the sub scan direction. That is, the LED driving unit 108 performs the adjustment of the luminance for each LED of the four systems and, at the same time, can control the on/off of the LEDs 1102a to 1102d so as to realize the common correction of the shading of the sub scan direction.

Figure 14:
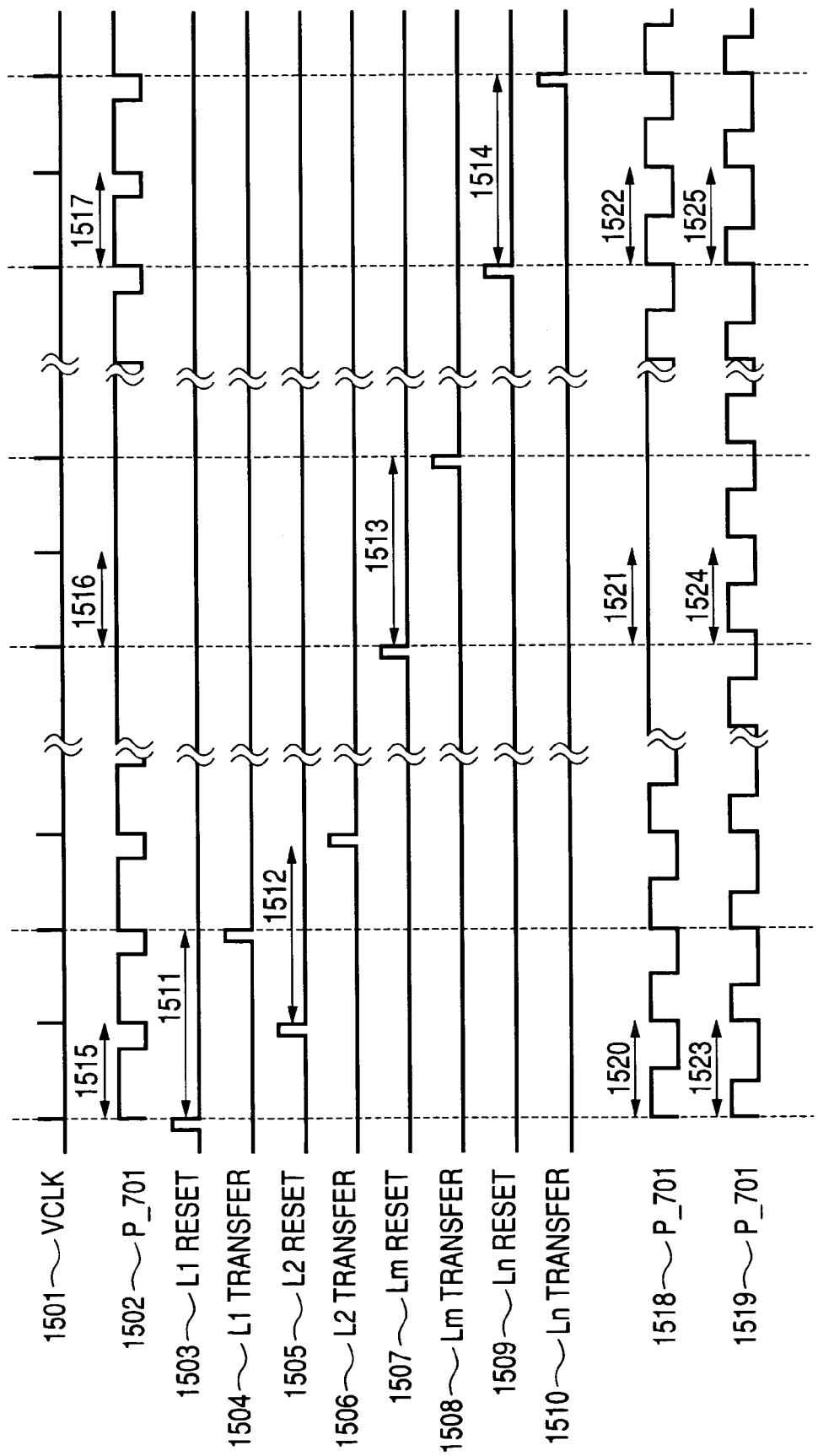
FIG. 14 is a timing chart showing the operation. of the image pick-up device unit 104 and the LED driving unit 108 in a second embodiment.

Next, a control of exposure in the image pick-up device unit 104 and the LED driving unit 108 in the present embodiment will be described by using a timing chart. FIG. 14 is a timing chart showing the operations of the image pick-up device 104 and the LED driving unit 108 in the present embodiment.

In FIG. 14, reference numeral 1501 denotes a transfer clock of a shift resistor of the sub scan direction, where a pulse is applied at a time for every one sub scan period. Reference numeral 1502 shows a control pulse to be inputted to the input terminal 701, which is common to the LEDs 1102a to 1102d. In this control pulse 1502, a period of "H" is lighting period of the LED. In this way, by changing a pulse width of the lighting period 1516 for the periods 1515 and 1517, the luminance of the LEDs 1102a to 1102d can be adjusted.

Further, reference numeral 1503 shows a timing, where the charge accumulated in a pixel (L1) of the first column of the sub scan direction is reset. To be more specific, the numeral 1503 shows a reset pulse ΦR, which resets a parasitic capacity 78 shown in FIG. 5. Reference numeral 1504 shows a timing, where the charge accumulated in the pixel of the fist column of the sub scan direction is transferred to the parasitic capacity 78 (parasitic capacity 78 of FIG. 5). To be more specific, it shows a transfer pulse ΦT which transfers the electrical charge from the photo diode shown in FIG. 5 to the parasitic capacity 78.

Similarly, reference numeral 1505 shows a timing, where the pixel (L2) of the second column of the sub scan direction is reset, and reference numeral 1506 shows a timing, where the electrical charge accumulated in the pixel of the second column is transferred to the parasitic capacity 78. Further, reference numeral 1507 shows a timing, where the pixel (Lm) of the mth column of the sub scan direction is reset, and reference numeral 1508 shows a timing, where the electrical charge accumulated in the mth column of the sub scan direction is transferred to the parasitic capacity 78. Reference numeral 1509 shows a timing, where the pixel (Ln) of the nth column of the sub scan direction is reset, and reference numeral 1510 shows a timing, where the charge accumulated in the pixel of the nth column of the sub scan direction is transferred to the parasitic capacity 78.

In FIG. 14, periods 1511 to 1514 show charge accumulation periods of the pixels (L1 to Ln) of each column as described above. As shown in FIG. 14, periods 1511 to 1514 are equal to the period performing the sub scan for two column portions. However, with respect to the lighting period of the LEDs 1102a to 1102d, as shown in a period 1515, since 100% of the sub scan period is not lighted, the substantial accumulation period of the sub scan direction is a period where the periods 1511 to 1514 are multiplied by a lighting ratio of the LEDs 1102a to 1103d. Consequently, the exposure is different among the periods 1512, 1513 and 1514, and the exposure of the period 1513 becoming the center region becomes large in the sub scan direction, and the exposure of the periods 1512 and 1514 becoming both end regions becomes small in the sub scan direction, thereby realizing the exposure control shown in the broken line 1209 of FIG. 11C. As shown above, by inputting the control pulse shown in the control pulse 1502 to the input terminal 701, the shading is prevented so that the exposure is corrected in the sub scan direction.

Further, when the control pulse shown in reference numeral 1518 is inputted to the input terminal 701 instead of the above described control pulse 1502, the exposure can be controlled as follows. A control pulse 1518 has a small lighting ratio of the LEDs 1102a to 1102d in the both end regions, compared to the control pulse 1502. When compared specifically, the period 1521 which is the center region has 100% of the lighting ratio similarly to a period 1516. However, the lighting ratio of a period 1520 is small as against the lighting ratio in the period 1515. Similarly, the lighting ratio of a period 1522 is also small as against the lighting ratio of a period 1517. By so doing, the inclination of the broken line 1209 shown in FIG. 11C can be made large, and the application of the correction to the shading can be made sharply.

Further, when the control pulse shown in reference numeral 1519 is inputted to the input terminal 701 instead of the above described control pulse 1502, the exposure can be controlled as follows. The control pulse 1519 has a small lighting ratio of the LEDs 1102a to 1102d as a whole, compared to the control pulse 1502. When compared specifically, the lighting ratio in periods 1523, 1524 and 1525 is half of the lighting ratio in the periods 1515, 1516 and 1517. By so doing, without changing the inclination of a broken line 1209 shown in FIG. 11C, the absolute value of a broken line 1210 can be halved. That is, while a rate of the difference of the lighting ratio in the sub scan direction of the LEDs 1102a to 1102d is maintained, the lighting ratio is halved in the all pulses, so that the luminance can be uniformly halved with the amount of the shading correction remained the same. In this way, by using a time lag of the exposure period, the shading of the LED of the four systems in which the luminance is adjusted can be corrected by a common ratio.

The fingerprint certification apparatus of the present embodiment has an advantage of having no occurrence of the side effect arising from a lowering of S/N and a correction as against the case where the correction of the shading is performed by the signal processing since the correction of the signal source is performed by using the lighting ratio of the light source and the accumulation time of the sensor. For example, when the apparatus is used outside the room, though the brightness of the external light rather than the brightness of the LED becomes a main factor, in this case, there is no occurrence of the luminance unevenness. However, when a certain correction is performed by the image processing, there are often the cases where the correction is performed in reverse unless it is determined whether or not it is in the room or outside the room. Alternately, when the light enters partially even if it is in the room, though there have been the negative effects that an over correction took place in the region of the external light, the fingerprint certification apparatus of the present embodiment, while removing these negative effects, controls the luminance unevenness of the region necessary for the fingerprint certification with the small number of light sources provided, and realizes a low cost and. highly accurate fingerprint certification.

While the fingerprint certification apparatus in the present embodiment has been described as above, the present invention is applicable to an image input apparatus for recognizing a physical body from the characteristic of the image by impinging the light on it such as a physical body recognition image pick-up device such as a barcode reader, an industrial robot and the like. Further, while the present embodiment has been described with the fingerprint certification apparatus as an example from among the biological certification apparatuses, it is applicable, for example, similarly to the biological certification apparatus for impinging the light on a hand, a finger, a face, an eye and the like and deriving and synthesizing and checking the characteristic information of the object. Here, what is meant by the characteristic information of the object is, for example, the information such as a palm pattern, a blood flow such as a vein, an iris, a facial recognition and the like. Further, in the above described embodiment, while the LED has been cited as light impinging means, it may be a light source such as a fluorescent tube, an EL, a laser and the like.

Third Embodiment

The present embodiment shows a control of exposure unevenness within a plane under a direct outdoor sunlight and under an indoor light, and a control of a non-uniformity of the exposure within a plane by the external light incoming obliquely from the lateral side which is generated by the light and the like from the sunset and windowsills. Here also, the basic configuration is similar to the first and second embodiments, wherein a plurality of light impinging elements are arranged in parallel to a main scan direction of the image pick-up device and, at the same time, the luminance of the light impinging element is controlled so that a uniformity of light volume from the light impinging element is enhanced, and moreover, the change and non-uniformity of the exposure are detected, thereby controlling the correction thereof. Further, though the present embodiment spares a configuration which controls the charge accumulation timing of the image pick-up device and the luminance and the lighting timing of the light impinging element so that the uniformity of the exposure in the sub scan direction is enhanced, by executing both of the controls together, the shading generated due to the positional relation between the light source and the image pick-up device can be eliminated, and therefore, this is effective for the impinging light from the light source lighted to correct the influence of the external light as described in the present embodiment, and its effectiveness is increased for both of the controls together.

In an optical sensor, the quality of the light source is a great factor to decide the image quality of the imaged image itself, and particularly, the uniformization of the exposure within a plane is important. In the first and second embodiments, a difference of the exposure within the imaging plane by a luminance distribution difference (shading) due to the positional relation between the unevenness of the light source itself and the image pick-up device unit has been illustrated, and by aiming at the region necessary for a biological certification and a physical body recognition, the correction of such a difference of the exposure has been illustrated. To be more specific, a plurality of light impinging elements (light sources) are arranged in parallel to the main scan direction of the image pick-up devices (CMOS sensors) and, at the same time, the luminance of the light impinging element is controlled so that the uniformity of the light volume distribution from the light impinging element is enhanced in the center region of the main scan direction. Further, the electrical charge accumulation timing of the image pick-up device and the luminance and the lighting timing of the light impinging element are controlled so that the uniformity of the exposure in the sub scan direction is increased. However, with respect to a factor for preventing the uniformity of the exposure within the plane, the present embodiment is effective not only for the luminance distribution difference due to the variation of the light source itself and the positional relation with the image pick-up device unit, but also for other factors for preventing the uniformity of the exposure.

Figure 15:
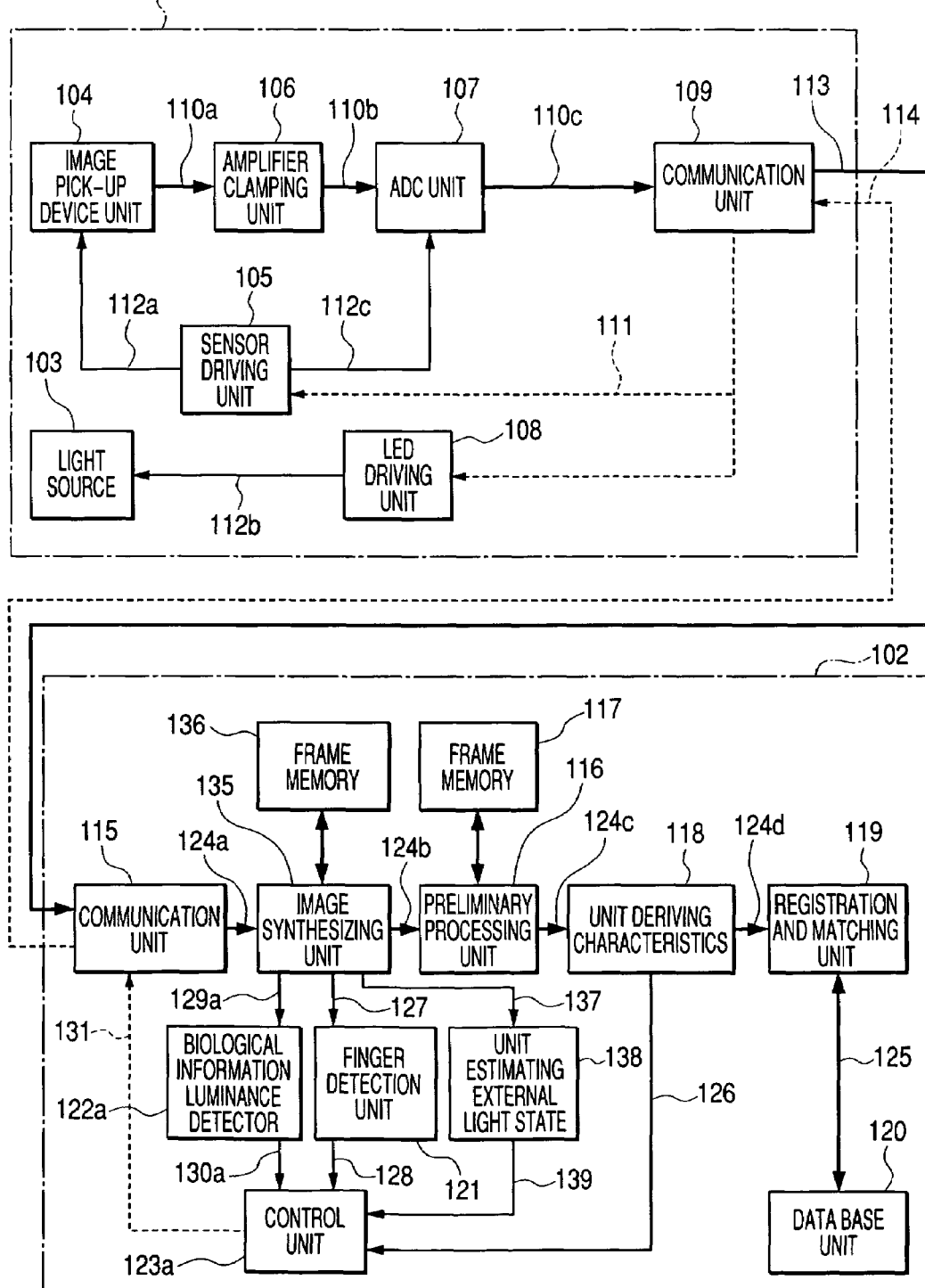
FIG. 15 is a block diagram showing the schematic configuration of a sweep (scan) type fingerprint certification apparatus adapting the present invention as a third embodiment of the present invention.

FIG. 15 is a block diagram showing a schematic configuration of a sweep (scan) type fingerprint certification apparatus as the present embodiment. Those having the same function as the first embodiment will be attached with the same reference number, and the detailed description thereof will be omitted. In FIG. 15, reference numeral 138 denotes an external light state estimating unit, which is estimating means for performing the estimation of the amount or the ratio of the signal component by the impinging light from the light source as well as the signal component from the external light by the imaged image signal, and the estimation of the light volume distribution state of each light within the plane. Here, though a signal is outputted from an image synthesizing unit, it does not matter whether the estimation is made from an image after synthesizing the image or from a signal prior to synthesizing the image.

As an example of the specific estimating operation of the external light state estimating unit 138, since an approximate amount of the signal component by the impinging light from the light source controlled by a certification unit 102 itself can be predicted in advance, compared to that signal amount, an increased portion of the signal of the actually derived image is calculated as the amount or the ratio of the signal component by the external light. Further, the incident direction of the external light (direct sunlight and afterglow of a sunset, or the like), the periphery environment (indoors or outdoors) and the like can be estimated from the in-plane distribution of that increased portion. Reference numeral 123a is a control unit, which receives information from a biological information luminance detector 122a and the external light state estimating unit 138 including each unit and outputs a control signal for controlling a sensor driving unit 105 of an image pick-up unit 101 and the LED driving unit 108 to the image pick-up unit 101 through a communication unit 115.

Reference numeral 137 denotes a signal line, which transfers the synthesized image data outputted by an image synthesizing unit 135 to the biological information luminance detector 122a, a finger detection unit 121, and the external light state estimating unit 138.

Reference numeral 139 denotes a signal line, by which the external light state estimating unit 138 transfers an external light state estimation result to the control unit 123a. Reference numeral 131 a signal line, which receives a state of each unit and transfers a control signal for controlling the image pick-up unit 101 outputted by the control unit 123a to the communication unit 115.

In the image pick-up unit 101 of the present embodiment, similarly to the first embodiment, the control unit 123a transmits the control signal to the sensor driving unit 105 and the LED driving unit 108 through the communication unit 115 so that the luminance unevenness of each LED element configuring the light source 103 and the non-uniformity (shading)

of the light volume decided by the positional relation between each LED and the image pick-up device unit 104 and the like become the correction value and the adjustment value calculated from the LED luminance distribution.

The sensor driving unit 105 and the LED driving unit 108 control the operation of the image pick-up device unit 104 and the light volume of each LED of the light source 103 according to the control signal from the control unit 123*a*.

Further, in the image pick-up unit 101 of the present embodiment, the control unit 123*a* transmits a control signal to the sensor driving unit 105 and the LED driving unit 108 through the communication unit 115 so that the image to be derived of the object becomes uniform within the plane or the area for an adequate exposure can be taken as large as possible from the light environment (indoors or outdoors or under strong direct sunshine, or the like) of the periphery estimated by the external light state estimating unit 138 by using the luminance distribution of the derived image and the incident state of the external light (whether or not the light is incident obliquely, or the like). The sensor driving unit 105 and the LED driving unit 108 control the operation of the image pick-up device unit 104 and the light volume of each LED of the light source 103 according to the control signal from the control unit 123*a*.

By the above described correction and adjustment from the control unit 123*a*, the image pick-up unit 101 controls the light source 103 which light-impinges a finger of the object, and corrects the difference of the light-impinging condition within the imaging plane even when the external light is applied to the finger so that the uniformity of the exposure within the plane is enhanced and, at the same time, even when the finger is light-impinged by both the external light and the light from the light source, adjusts the accumulation condition of the image pick-up device so that an adequate exposure can be maintained, thereby deriving a fingerprint image.

The image pick-up device in the present embodiment, similarly to the first embodiment, is an optical type fingerprint sensor called as a sweep type, and its configuration is previously described in FIGS. 2A, 2B, 2C, 2D to 5.

Similarly to the first embodiment, the fingerprint certification apparatus in the present embodiment utilizes the fact that the exposure of the pixel of the sensor unit is decided by the relation between the light-impinging condition of the light source and the accumulation period of the sensor.

The operation of the fingerprint certification apparatus of the present embodiment will be described by using FIGS. 16A, 16B, 17A, 17B, 17C, 18A, 18B, 19A, 19B, 20, 21A, 21B, 22A and 22B.

Figure 16A:
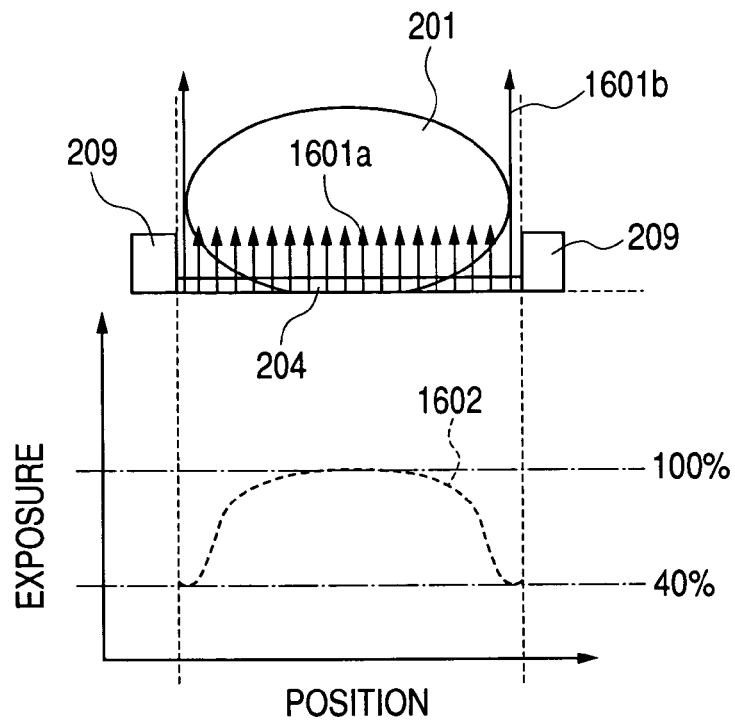
FIGS. 16A and 16B are views for explaining the relation between an illumination light and an exposure in the case of being indoors and outdoors.
Figure 16B:
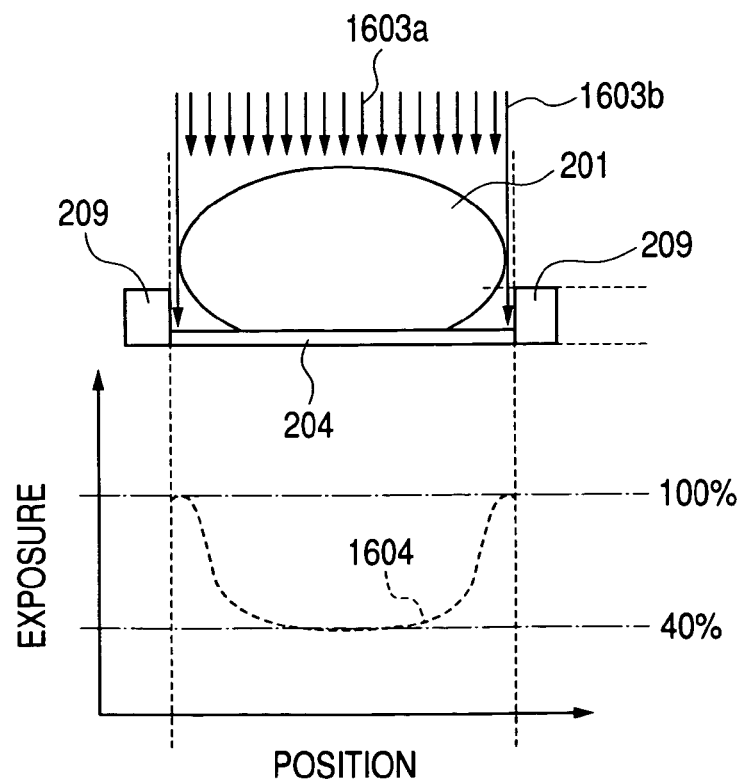

FIGS. 16A and 16B show schematic diagrams of the light which impinges the object when being indoors and outdoors and the exposure state at that time. FIG. 16A shows the case where there exists scarcely the external light component such as the case of the room interior or the night time and the finger is impinged almost by the light from the LED light source. FIG. 16B shows the case where strong direct sunshine pours on direct from above outside the room and the like, and where the external light is a main component which light-impinges the finger.

Here, FIGS. 16A and 16B, similarly to FIG. 2D, are schematic diagrams of the finger at a cross section, and reference numeral 201 denotes a finger, reference numeral 204 an image-pickup device, and reference numeral 209 a guide mechanism. Here also, an optical member 203 on the image pick-up device 204 is omitted. Arrow marks 1601 show the impinging light outgoing to the finger from the LED light source to the arrow mark direction. A dotted line 1602 shows the exposure distribution of the image pick-up device 204 at this time, and an axis of abscissas shows a position of the finger according to its cross section, and an axis of ordinates shows an exposure amount. Arrow marks 1603 show direct sunshine impinging the finger from direct above in the arrow direction as the external light. A dotted line 1604 shows the exposure distribution of the image pick-up device 204 at this time, and an axis of abscissas shows a position of the finger according to its cross section, and an axis of ordinates shows an exposure amount.

As shown in FIG. 16A, in the case of the room interior and the night time, since the light is the impinging light from the imaging plane side where the finger contacts, the exposure in the image pick-up device 204 is prone to be large at the center region where the finger contacts and to be small at both end region close to the lateral side of the finger where the finger does not contact (here, the exposure at the both end region is illustrated as 40%, while the exposure in the center region is illustrated as 100%).

In the meantime, as shown in FIG. 16B, in case the strong external light is incident outside the room, since the light is the impinging light from the opposite side of the imaging plane, the exposure in the image pick-up device 204 is large at both end region in the vicinity of the lateral side of the finger where the finger does not contact, and ends up to be small at the center region where the finger contacts. This is because the both end region close to the lateral side of the finger, even when contacted with the finger, is high in transmissivity of the light since the thickness thereof is thin, compared to the center region (here, it is illustrated that the exposure in the center region is 100%, while the exposure at the both end region is 40%).

In both of the above cases, since the exposure difference is large at both end region in the vicinity of the center region and the lateral side, it is extremely difficult to maintain an adequate exposure across the whole region of the finger, and there are often the cases where either of one end region is saturated and speckled white, while the other end where the exposure is small turns brownish.

As discussed in the first embodiment also, to secure the difference of the light intensity contrast for 25% or more by the fingerprint pattern in case of deriving the fingerprint image by the optical image pick-up device, which is necessary for performing an image calculation to derive the ridge pattern of the fingerprint, a gain must be applied, and therefore, such an exposure difference is required to be controlled along with the luminance difference of the impinging light. When uncontrollable, since the gradation is allotted by corresponding to the large exposure difference at the center region and both end region, the gradation property of the signal component is lowered, and therefore, the contrast cannot be secured sufficiently, and a S/N is reduced, and certification accuracy is lowered. It is possible for the present embodiment to detect a state of the external light, and change a lighting state of the light source and the accumulation condition of the image pick-up device according to that state, so that the uniformity of the exposure distribution within the imaging plane is enhanced and, at the same time, by maintaining an adequate exposure, an area of the fingerprint image derivable is enlarged and, at the same time, the gradation property of the signal component is enhanced, thereby improving the certification accuracy.

Figure 17A:
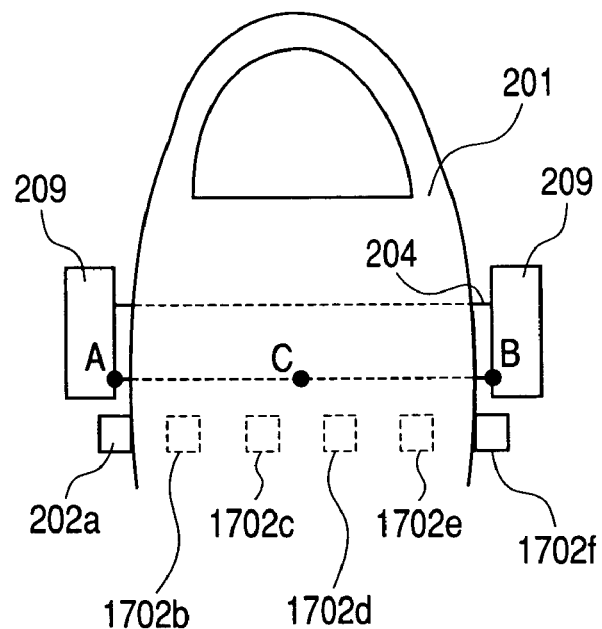
FIG. 17A is a view showing a positional relation among the image pick-up device, the light source and a finger in the third embodiment of the present invention.
Figure 17B:
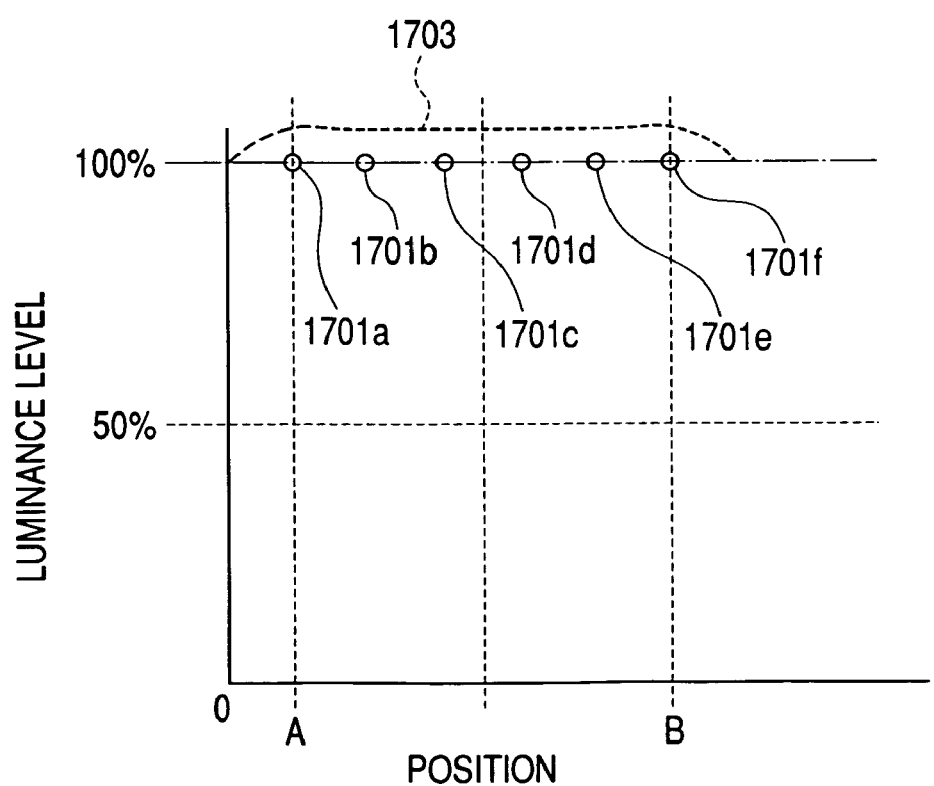
FIG. 17B is a view showing the luminance of the LED at 100% lighting time in the third embodiment of the present invention.
Figure 17C:
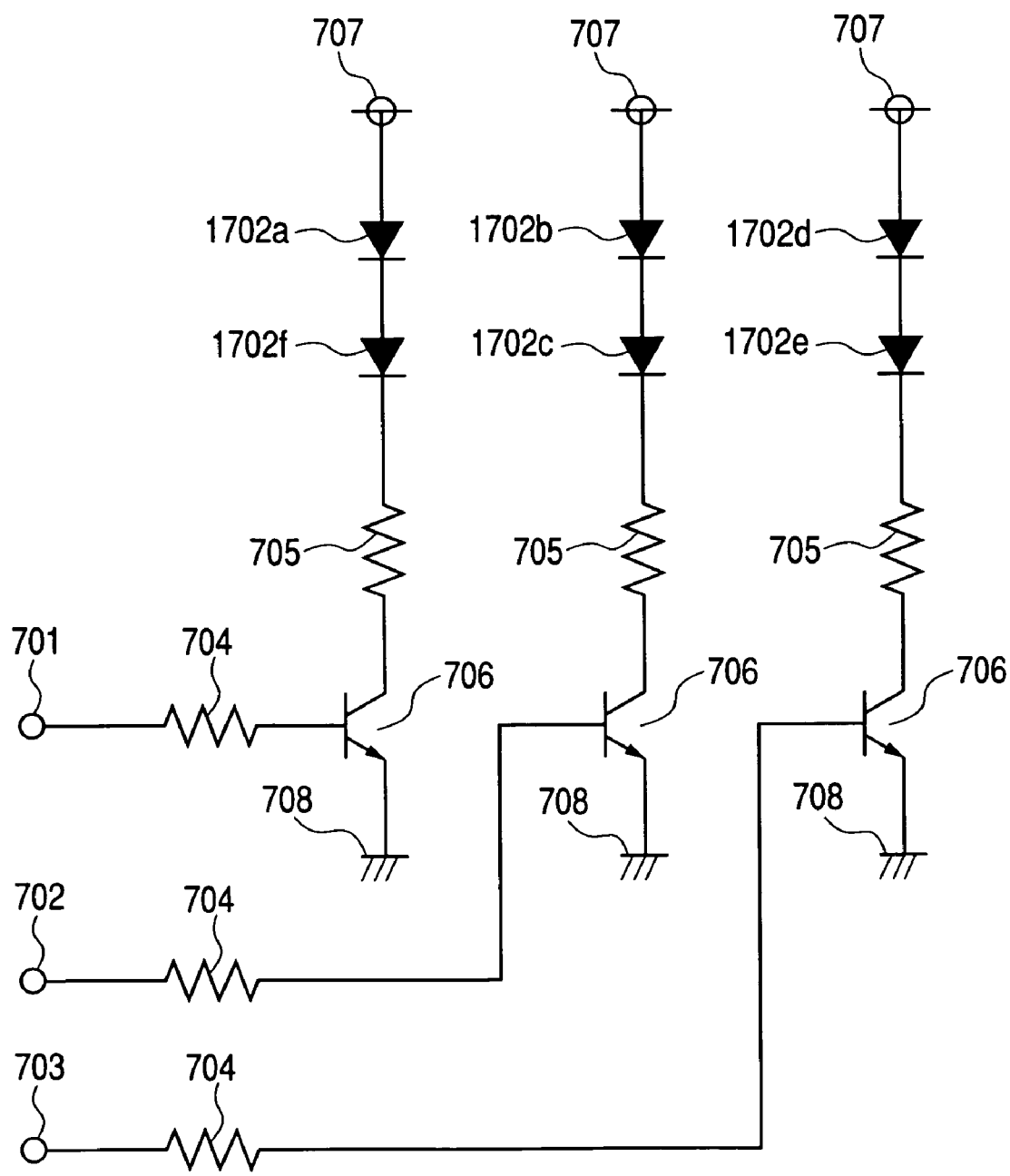
FIG. 17C is a view showing a control circuit example of the light source in the third embodiment of the present invention.

FIGS. 17A, 17B and 17C are views showing a schematic configuration of the optical type fingerprint sensor of the sweep type in the present embodiment.

FIG. 17A is a schematic diagram of the optical type fingerprint sensor seen from above the finger. Further, FIG. 17B is a view showing the luminance level when the impinging light of six pieces of the LEDs 1702*a* to 1702*f* in FIG. 17A is lighted 100%. Further, FIG. 17C is a circuit diagram of the driving unit for lighting the LEDs 1702*a* to 1702*f*.

In FIG. 17A, reference numeral 201 denotes a finger to be the object of the finger certification. Reference numeral 1702*a* to 1702*f* denote a LED as a light source. Reference numeral 204 denote a band-shaped second dimensional sensor with the number of pixels of the sub scan direction being about five to twenty, which is specifically a CMOS type image pick-up device.

Reference numeral 209 denotes a guide mechanism, which prevents an unintentional movement or a shift of the finger 201 in a direction vertical to the moving direction of the finger accompanied with the moving operation of the finger 201. Here, the optical member guiding an optical difference of the uneven pattern of the fingerprint to the image pick-up device 204 to be described later is omitted.

Here, the points A, B and C in FIG. 17B correspond to the position of each point of the same reference number shown in FIG. 17A, and FIG. 17B shows the luminance distribution in a direction (main scan direction of the sensor) from the point A to the point B by the light source (LEDs 1702*a* to 1702*f*).

In FIG. 17B, reference numeral 1701*a* to 1701*f* schematically show a center of the luminance distribution of each of the LEDs 1702*a* to 1702*f* shown in FIG. 17A. Here, to simply describe the operation for the external light environment, the description is made provided that there is no individual unevenness in the luminance of the LED. When all the LED is lighted with 100% luminance, the luminance distribution thereof is as shown by a broken line 1703.

The LEDs 1701*a* to 1701*f* are illustrated as a configuration for controlling the light volume by the same three systems as the first embodiment. Here, in the present embodiment, as shown below by the operation of the three systems of the present embodiment, at least two groups arranged at both sides with the main scan direction as a center are independently controlled according to the incident direction of the external light, so that the dynamic range for incidence of the external light from an oblique direction is changed for the better. Further, the group arranged at the center side in the main scan direction and at least two groups of the groups at both end sides are independently controlled according to the ratio of the external light, so that the dynamic range is changed for the better according to the change of the external light state.

FIG. 17C is a view showing a specific circuit example of the light source 103 and the LED driving unit 108 shown in FIG. 15. As shown in FIG. 17C, the light source 103 is configured by a total three systems comprising one system for the LEDs 1702*a* and 1702*f* (hereinafter referred to as a first system), one system for the LEDs 1702*b* and 1702*c* (hereinafter referred to as a second system), and one system for the LEDs 1702*d* and 1702*e* (hereinafter referred to as a third system). The LED driving unit 108 light-controls these three systems by turning on/off the transistor 706. Reference numerals 701 to 703 of FIG. 17C denote an input terminal to be inputted with the LED control pulse which is a signal to control the lighting of the LED of three systems. As shown in FIG. 17C, the input terminal 701 is inputted with the LED control pulse for controlling the first system, and the input terminals 702 and 703 are similarly inputted with the LED control pulse for controlling the second and third systems. Reference numerals 704 and 705 show resistance elements, reference numeral 706 a transistor, reference numeral 707 a power supply, and reference numeral 708 a GND (ground).

As shown in FIG. 17C, in the LED driving unit 108, the collector terminal of the transistor 706 in which the input terminal 701 is connected to the base terminal through the resistance element 704 is connected to the LEDs 1702*a* and 1702*f* of the first system through the resistance element 705 and a signal line 112*b*.

The collector terminal of the transistor 706 in which the input terminal 702 is connected to base terminal through the resistance element 704 is connected to the LEDs 1072*b* and 1702*c* of the second system through the resistance element 705 and the signal line 112*b*. The collector terminal of the transistor 706 in which the input terminal 703 is connected to the base terminal through the resistance element 704 is connected to the LEDs 1702*d* and 1702*e* of the third system through the resistance element 705 and the signal line 112*b*. Further, the emitter terminal of each transistor 706 is connected to GND 708.

In the light source 103, between the power supply 707 and the signal line 112*b* (line for transmitting the signal from the input terminal 701), the LEDs 1702*a* and 1702*f* as the first system are connected in series so as to emit a light when the current flows to the signal line 112*b*. Similarly, the LEDs 1702*b* and 1702*c* as the second system are connected between the power supply 707 and the signal line 112*b* (line for transmitting the signal from the input terminal 702), and the LEDs 1702*d* and 1702*e* as the third system are connected in series between the power supply 707 and the signal line 112*b* (line for transmitting the signal from the input terminal 703).

By the configuration as shown above, the LED driving unit 108 pulse-width-controls the on/off time of each transistor 706 according to the LED control pulse inputted to the input terminals 701 to 703, so that the driving pulse is outputted to the three signal lines 112*b* connected to each of the LEDs of the three systems, respectively. In this way, according to the driving pulse inputted to the LEDs of the three systems from the three signal lines 112*b*, a ratio of flashing on and off of each LED is adjusted, and the luminance of the three systems are controlled.

The circuit of the control pulse preparation circuit for preparing the LED control pulse to be inputted to the input terminals 701 to 703 as shown in FIG. 17C is prepared, similarly to the first embodiment, by the circuit shown in FIG. 8.

Figure 18A:
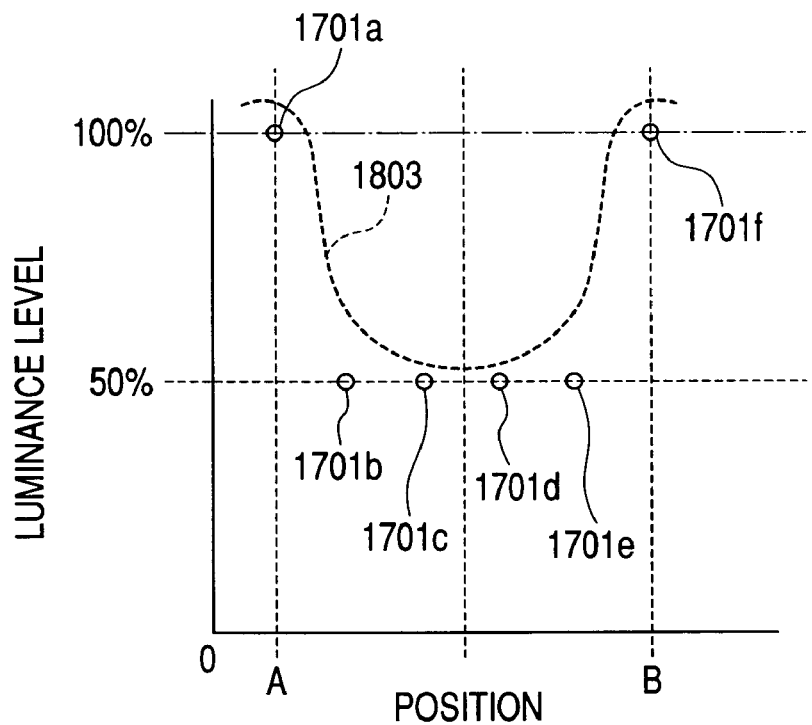
FIGS. 18A and 18B are explanatory drawings of a light volume correction within a plane at the time of being indoors in the third embodiment of the present invention.

Here, in the case of the room interior and the nighttime or the like shown in 16A, the external light estimating unit estimates the state thereof, and as shown in FIG. 18A, controls the luminance of six LEDs in such a way that the whole luminance distribution becomes as shown by a broken line 1803 with the first system (LEDs 1702*a* and 1702*f*) taken as 100%, the second system (LEDs 1702*b* and 1702*c*) and the third system (LEDs 1702*d* and 1702*e*) taken as 50%.

Figure 18B:
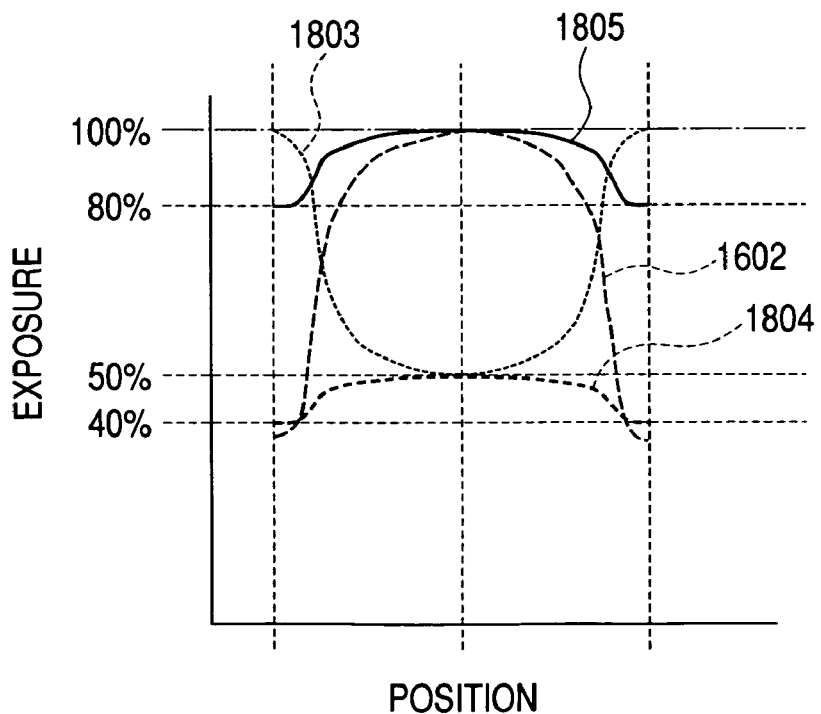

As a result, the exposure in the image pick-up device unit, as shown in FIG. 18B, becomes 1804 which is the synthesis of the exposure distribution 1602 in case all the three systems are lighted 100% and the exposure distribution 1803 of the LED in case the three systems are controlled. However, in this case, since the LED luminance in the center region is lowered, despite of the exposure difference between both end region and the center region becoming small, the synthesized exposure ends up being lowered as a whole. Hence, the external light estimating unit controls not only the luminance of the LED but also the image pick-up device, thereby making the accumulation time double.

In this way, a total exposure, as shown by the solid line 1805, becomes 80% at both end region as against 100% of the exposure at the center region, and the exposure difference at both end region and the center region are reduced while securing the exposure more than constant so that an uniform fingerprint image is derived in the whole imaging plane.

Figure 19A:
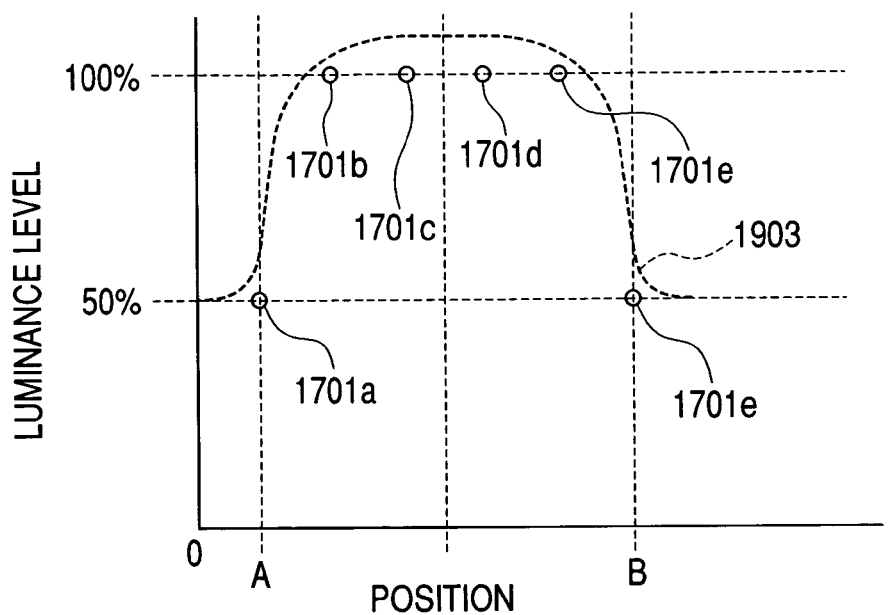
FIGS. 19A and 19B are explanatory drawings of a light volume correction within the plane at the time of being outdoors in the third embodiment of the present invention.

Further, in case of being under the external light outside the room as shown in FIG. 16B, the external light estimating unit estimates the state thereof, and as shown in FIG. 19A, controls the whole luminance distribution to become as shown by a broken line 1903 with the first system (LEDs 1702a and 1702f) taken as 50% and the second system (LEDs 1702b and 1702c) and the third system (LEDs 1702d and 1702e) taken as 100%.

Figure 19B:
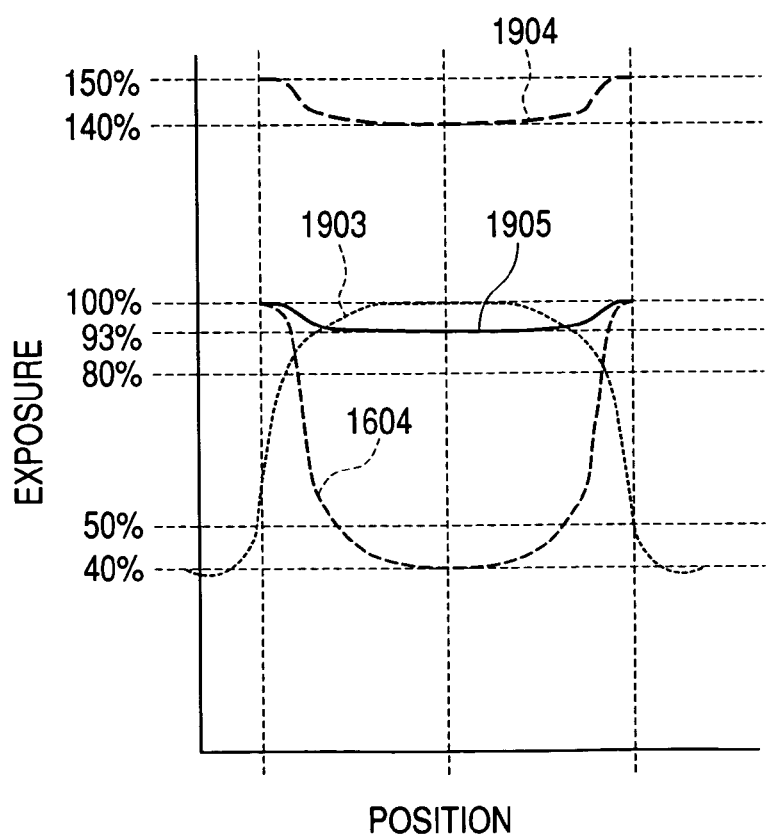

As a result, the exposure in the image pickup device unit, as shown in FIG. 19B, becomes the exposure distribution 1604 in case all three systems are not lighted, and becomes 1904, which is a synthesis of the luminance distribution 1903 of the LED controlling the three systems.

However, in this case, since the LED luminance in the center region is increased, despite of the exposure difference between both end region and the center region being reduced, the synthesized exposure ends up exceeding 100%. Although the exposure is shown 100% or more schematically in 1904, actually it is saturated and speckled white. Hence, the external light estimating unit controls not only the luminance of the LED, but also the image pick-up device unit, and multiplies the accumulation time by two thirds. In this way, the total exposure, as shown by a broken line 1905, becomes 93% at both end region as against 100% at the center region, and while maintaining the exposure so as not to be saturated, the exposure difference between both end region and the center region is reduced, thereby deriving a uniform fingerprint image in the whole imaging plane.

In this way, by changing the lighting state of the light source and the accumulation condition of the image pick-up device according to the state of the detected external light, the uniformity of the exposure distribution within the imaging place is enhanced and, at the same time, an adequate exposure is maintained, so that the area of the fingerprint image to de derived is enlarged and the gradation property of the signal component is enhanced, thereby realizing to secure the certification accuracy.

At this time, from among the light sources which are grouped together according to a plurality of arrangements, at least two groups which are arranged at the center side and at both ends in the main scan direction are independently controlled according to the ratio of the external light, so that the securing of the dynamic range and matching accuracy can be realized accompanied with both of the case of being indoors and at night where the external light condition sharply changes and the case of being under sunlight outside the room.

Further, in the case of the optical sensor, the problem that still must be solved is the case where a strong light such as sunshine enters obliquely. In case the external light enters obliquely, there emerge an area where a strong external light contributes as an impinging light and an area where there is a shadow zone or a place difficult for the light to reach, and therefore, the exposure changes sharply within the plane.

In the present embodiment, even in such a case, by changing the lighting state of the light source and the accumulation condition of the image pick up device, a wide dynamic range and a high matching accuracy can be obtained. FIG. 20 shows a schematic illustration of the external light impinging the object and the exposure state at that time in case a strong external light such as sunshine and the like enters obliquely. Such a state occurs in case the sensor is impinged by the setting sun outside the room or in case the sun's rays enter indoors from the window.

Here, FIG. 20 is a schematic illustration of the finger at its cross section similarly to FIG. 2D, and reference numeral 201 denotes a finger, reference numeral 204 an image pick-up device, and reference numeral 209 a guide mechanism. Even here, an optical member 203 on the image pick-up device 204 is omitted from the illustration. Arrow marks 2003a and 2003b show an external light impinging the finger obliquely from above the right side in the arrow direction as the external light.

A dotted line 2004 shows the exposure distribution of the image pick-up device 204 at that time, and an axis of abscissas shows a position of the finger according to its cross section, and an axis of ordinates shows the exposure amount.

As shown in FIG. 20, while the light at the arrow mark 2003a side effectively impinges the finger up to the vicinity of the region close to the image pick-up device, the light at 2004b side does not transmit sufficiently due to the thickness of the finger, and moreover, the shadow of the finger itself ends up being generated. In this way, the exposure at the image pick-up device 204 is high in a direction where the light enters as shown by a dotted line 2004, while the exposure is lowered at the opposite side (here, the exposure at the left side region is illustrated as 25%, while the exposure at the right side region is illustrated as 100%).

Figure 21A:
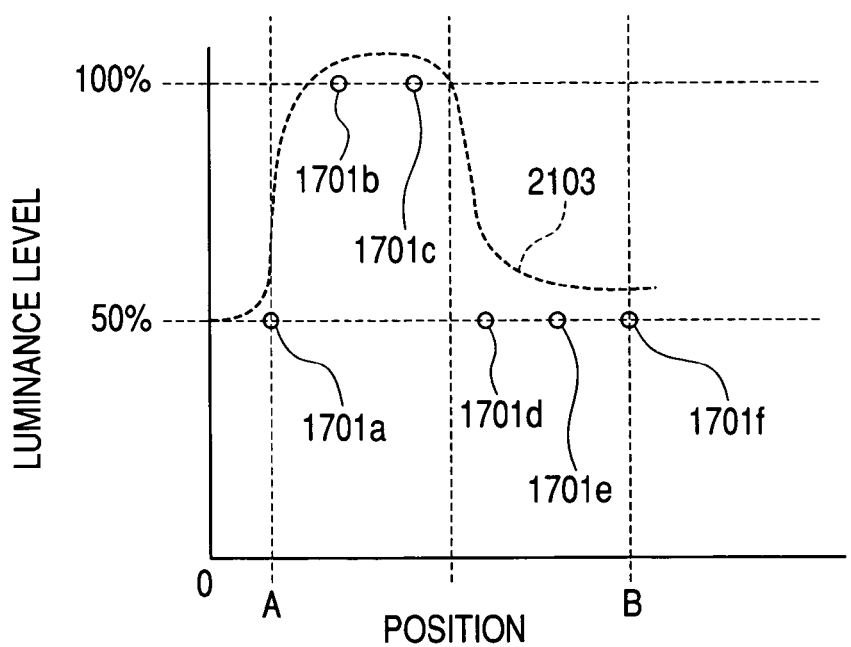
FIGS. 21A and 21B are explanatory drawings of the light volume correction within the plane in case the external light enters obliquely in the third embodiment of the present invention.

In such a case of the oblique incidence of the external light, the external light estimating unit estimates its state, and, as shown in FIG. 21A, controls the luminance of six LEDs so that the whole luminance distribution becomes as shown by a dotted line 2103 with the luminance of the first system (the LEDs 1702a and 1702f) taken as 50%, the luminance of the second system (the LEDs 1702b and 1702c) taken as 100%, and the luminance of the third system (the LEDs 1702d and 1702e) taken as 50%.

Figure 21B:
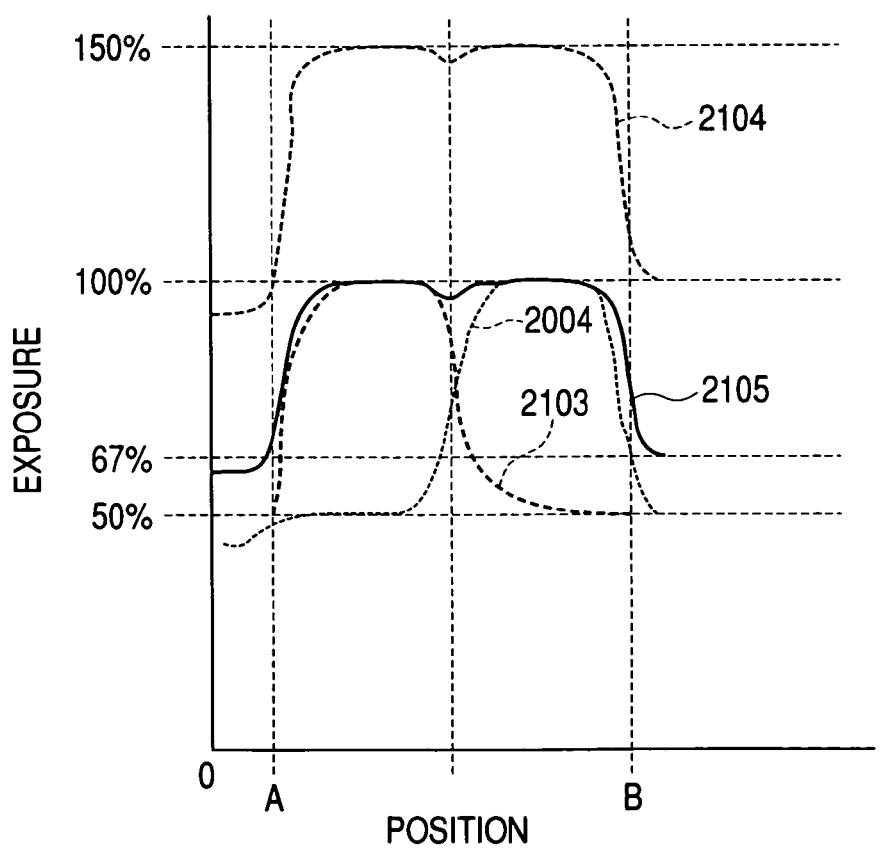

As a result, the exposure at the image pick-up device, as shown in FIG. 21B, becomes a synthesis 2104 of an exposure distribution 2004 in case the whole three systems are not lighted and an luminance distribution 2103 of the LEDs controlling the three systems.

However, in this case, since the LED luminance at the left side region is increased, despite of the reduced exposure difference between the right side-region and the left side region, the synthesized exposure exceeds 100%. Although the dotted line 2104 schematically shows the exposure to be 100% or more, actually the exposure is saturated and speckled white. Hence, the external light estimating unit controls not only the luminance of the LED, but also the image pick-up device unit so as to multiply the accumulation time by two thirds.

In this way, the total exposure as shown by the dotted line 2105 is such that the exposure at the right side region becomes 100%, while the exposure at the left side becomes 83%, and the exposure difference between the right side region and the left side region is reduced while the exposure is maintained not to be saturated, so that a uniform fingerprint image is derived in the whole imaging plane.

In this way, by changing the lighting state of the light source and the accumulation condition of the image pick-up device according to the state of the detected external light, the uniformity of the exposure distribution in the imaging plane is enhanced and, at the same time, an adequate exposure is maintained, so that the area of the derivable fingerprint image is enlarged and the gradation property of the signal component is enhanced, thereby improving the certification accuracy.

At this time, from among the light sources which are grouped together according to a plurality of arrangements, at least two groups which are arranged right and left are controlled independently according to the incident direction and the ratio of the external light, so that the impinging light amount difference within the plane caused by the light entering obliquely is corrected, thereby realizing to secure the dynamic range and matching accuracy.

Figures 22, 22A:
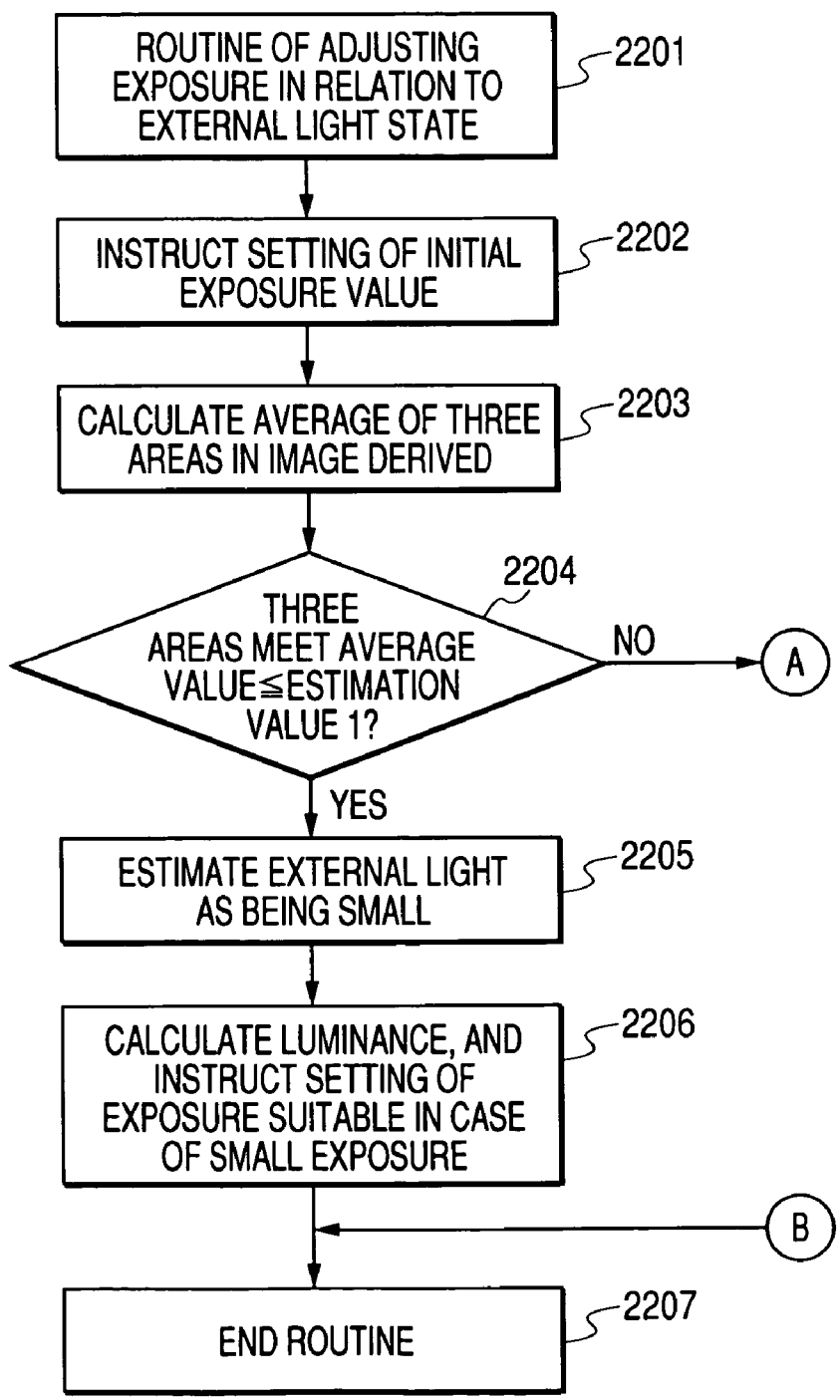
FIG. 22 is comprised of FIGS. 22A and 22B showing flow charts of an exposure control routine according to the outside state in the third embodiment of the present invention.
Figure 22B:
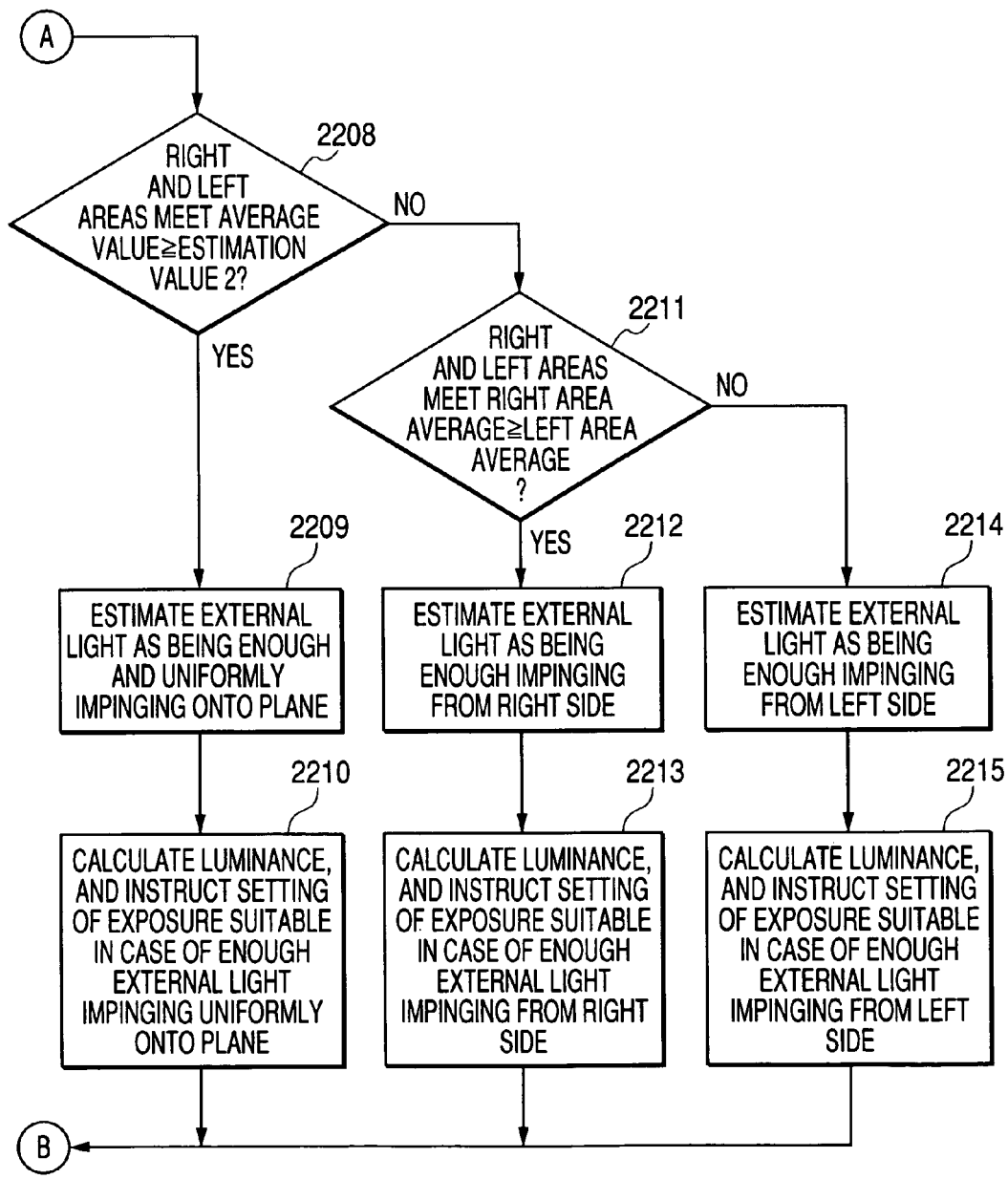

In FIGS. 22A and 22B, the operation of the external light state estimating unit 138 of FIG. 15 in the present embodiment is shown by a flowchart.

The control of the exposure according to the external light state as described in the present embodiment is, for example, performed at the stage starting to slide the finger on the sensor of the sweep type or in the midst of sliding the finger. In such an exposure adjustment routine according to the external light state, when the routine starts at step 2201, the external light state estimating unit 138 first issues an instruction to the control unit 123a to the effect that the exposure is set to an initial value to measure the external light state at step 2202.

Here, the LED is turned off and the exposure is performed by the external light only. Next, at step 2203, the external light state estimating unit 138 obtains the derived image data obtained under the exposure condition of the initial set value from the image synthesizing unit 135, and calculates various data for estimating the external light state. Here, the various data are take as each average luminance data of the three areas of the left side, the center, and the right side for the main scan direction.

In step 2204, it is estimated whether or not each average value of the three areas of the left side, the center and the right side is all below a constant value (estimated value 1) in the main scan direction. If it is below the estimated value, at step 2205, it is estimated that the external light is little. In this case, the routine advances to step 2206, where the external light state estimating unit 138 calculates the luminance of the external light and, at the same time, and moreover, issues an instruction to the control unit 123a to the effect that the LED three systems are lighted as shown in FIG. 18A, and that the accumulation time of the image pick-up device is adjusted so as to be able to effectively use the ultimate dynamic range. In this way, the exposure adjustment is performed as shown by the solid line 1805 in FIG. 18B. At step 2207, the exposure adjustment routine is completed.

When the average value exceeds a constant value, at step 2208, it is estimated whether or not both of each average value of the two regions at the left and right sides in the main scan direction are a constant value (estimated value 2). When both are above the estimated value, at step 2209, it is estimated that the light uniformly impinges the plane. This is applicable to the case where a direct sunlight impinges the plane direct from the above.

In this case, the routine advances to step 2210, and the external light state estimating unit 138 calculates the external light luminance and, at the same time, lights the LED three systems as shown in FIG. 19A, and moreover, issues an instruction to the control unit 123a to the effect that the accumulation time of the image pick-up device is adjusted so that the ultimate exposure can effectively use the dynamic range. In this way, the exposure adjustment is performed as shown in FIG. 19B by a broken line 1905. At step 2207, the exposure adjustment routine is completed.

At step 2208, when the average value is below a constant value, at step 2211, it is estimated whether or not the average value of the right side region is more than the left side in the main scan direction. When the right side is more than the left side value, at step 2212, it is estimated that the external light is impinged from the right side.

In this case, the routine advances to step 2213, where the external light state estimating unit 138 calculates the external light luminance and, at the same time, lights the LED three systems as shown in FIG. 21A, and moreover, issues an instruction to the control unit 123a to the effect that the accumulation time of the image pick-up device is adjusted so that the ultimate exposure can effectively use the dynamic range. In this way, the exposure adjustment is performed as shown by a solid line 2105 in FIG. 21B. At step 2207, the exposure adjustment routine is completed.

At step 2211, in case the average value of the right side region is lower than the left side value in the main scan direction, at the step 2214, it is estimated that the external light is impinged from the left side. In this case, the routine advances to step 2215, where the external light state estimating unit 138 calculates the luminance of the external light and, at the same time, adjusts the luminance of the LED of the three LED systems so that the luminance of the right side is increased contrary to FIG. 21A, and moreover, issues an instruction to the control unit 123a to the effect that the accumulation time of the image pick-up device is adjusted so that the ultimate exposure can effectively use the dynamic range. In this way, the exposure adjustment is performed, and at step 2207, the exposure adjustment routine is completed.

In this way, the external light state estimating unit estimates the distribution state and exposure within the plane of the external light, and the control unit of the exposure controls the luminance of the light source and the accumulation amount of the image pick-up device, so that an optical sensor compatible with a wide dynamic range and a high matching accuracy can be realized, which is not affected by the external light environment.

While the embodiments of the present invention have been described with reference to the drawings, specific configurations are not limited to the present embodiments, and the design and the like without deviating from the spirit of the present invention are also included.

This application claims priority from Japanese Patent Application No. 2003-388416 filed Nov. 18, 2003, which is hereby incorporated by reference herein.

What is claimed is:

1. An image pick-up apparatus, comprising: image pick-up means for imaging an object; a light irradiation unit comprising first and second groups of light emitting elements arranged at opposed sides with regard to a center of a side of an image plane along a main scan direction, and a third group of light emitting elements arranged at opposed outermost sides from the center line for irradiating said object with light, wherein each of the groups includes at least two light emitting elements;

estimating means for estimating a state of external light reaching said object from an environment outside of the image pick-up apparatus; and exposure control means for controlling exposure of said object to said irradiating light in the image plane in said image pick-up means according to the external light state estimated by said estimating means, by controlling independently the light irradiation of at least the first and second groups of light emitting elements according to an incident direction of the external light, wherein said exposure control means comprises luminance control means for controlling the luminance of said light irradiation means, and an accumulation period control means for controlling an electrical charge accumulation period of said image pick-up means, and wherein said exposure control means controls both of said luminance control means and said accumulation period control means according to the external light state estimated by said estimating means, and wherein the estimating means and the exposure control means estimate the state of external light and control exposure to said irradiating light by:

deriving image data under a condition of an exposure to the external light only by extinguishing all of the light emitting elements of the light irradiation unit, and calculating an average luminance data from the image data of three regions including a center region and both side regions along the main scanning region of the image plane;

determining whether or not each of the average luminance data from the image data of three regions is larger than a predetermined first reference value;

determining whether or not both of the average luminance data derived from both side regions are smaller than a predetermined second reference value, when all of the average luminance data derived from the three regions are larger than the predetermined first reference value;

determining which one of the average luminance data derived from one of the side regions is larger than the other of the average luminance data derived from the other of the side regions, when at least one of the average luminance data derived from both side regions is smaller than the predetermined second reference value;

controlling the light emitting elements to emit light such that a light emitting luminance of the light emitting elements of the group arranged in a region of both side regions from which the smaller average luminance data is derived is larger than a light emitting luminance of the light emitting elements of the group arranged in a region of both side regions from which the larger average luminance data is derived; and adjusting an accumulation period of the image pick-up means so as to effectively use a dynamic range in evaluating an exposure quantity finally derived.

2. The image pick-up apparatus according to claim 1, comprising partial image control means which outputs a plurality of partial images of said object and controls the exposure within said partial image plane in said image pick-up means according to the external light state estimated by said estimating means when said object and said image pick-up means relatively move.

3. A biological certification apparatus, comprising the image pick-up apparatus according to claim 1.

4. The image pick-up apparatus according to claim 1, wherein the exposure control means controls the exposure of said object to said irradiating light in the image plane in said image pick-up means according to the external light state estimated by said estimating means, and further by controlling independently at least one of the first and second groups and the third group according to a ratio of the light irradiation and the external light.

* * * * *